(12) United States Patent
Barbieru et al.

(10) Patent No.: US 9,650,516 B2
(45) Date of Patent: May 16, 2017

(54) ACID DYES, PROCESS FOR THE PRODUCTION THEREOF AND THEIR USE

(71) Applicant: DyStar Colours Distribution GmbH, Raunheim (DE)

(72) Inventors: Roxana Barbieru, Singapore (SG); Vajiravelu Sivamurugan, Singapore (SG); Wei Tian Loh, Singapore (SG)

(73) Assignee: DyStar Colours Distribution GmbH (DE)

( * ) Notice: Subject to any disclaimer, the term of this patent is extended or adjusted under 35 U.S.C. 154(b) by 0 days.

(21) Appl. No.: 15/032,802

(22) PCT Filed: Oct. 22, 2014

(86) PCT No.: PCT/EP2014/072629
§ 371 (c)(1),
(2) Date: Apr. 28, 2016

(87) PCT Pub. No.: WO2015/062928
PCT Pub. Date: May 7, 2015

(65) Prior Publication Data
US 2016/0257816 A1    Sep. 8, 2016

(30) Foreign Application Priority Data
Oct. 29, 2013 (EP) .................................... 13190652

(51) Int. Cl.
| C09B 35/56 | (2006.01) |
| C09D 11/328 | (2014.01) |
| D21H 21/28 | (2006.01) |
| D06P 1/39 | (2006.01) |
| D06P 5/30 | (2006.01) |

(52) U.S. Cl.
CPC ............ C09B 35/56 (2013.01); C09D 11/328 (2013.01); D06P 1/39 (2013.01); D06P 5/30 (2013.01); D21H 21/28 (2013.01)

(58) Field of Classification Search
CPC ...... C09B 35/56; C09D 11/328; D21H 21/28; D06P 1/39; D06P 5/30
See application file for complete search history.

(56) References Cited

U.S. PATENT DOCUMENTS

| 3,956,294 | A | 5/1976 | Eleckenstein et al. |
| 3,959,250 | A | 5/1976 | Heinrich et al. |
| 3,960,480 | A | 6/1976 | Heinrich et al. |
| 3,979,378 | A | 9/1976 | Gnad et al. |
| 4,668,774 | A | 5/1987 | Loeffler et al. |
| 4,801,694 | A | 1/1989 | Scheibli et al. |
| 5,468,848 | A | 11/1995 | Hassenrück et al. |
| 5,543,259 | A | 8/1996 | Schwarz et al. |
| 5,728,874 | A | 3/1998 | Mullins et al. |
| 2004/0006234 | A1 | 1/2004 | Mayo et al. |

(Continued)

FOREIGN PATENT DOCUMENTS

| CN | 101337925 A | 1/2009 |
| DE | 061174 C | 2/1892 |
| DE | 072665 C | 11/1893 |

(Continued)

OTHER PUBLICATIONS

Derwent 2002-397653, 2002.*
International Search Report for PCT/EP2014/072629 mailed Feb. 6, 2015.
Transmittal and International Search Report with Written Opinion of International Searching Authority for PCT/EP2014/072629 mailed Feb. 6, 2015.

(Continued)

Primary Examiner — Amina Khan
(74) Attorney, Agent, or Firm — Drinker Biddle & Reath LLP

(57) ABSTRACT

Dyes of formula (1)

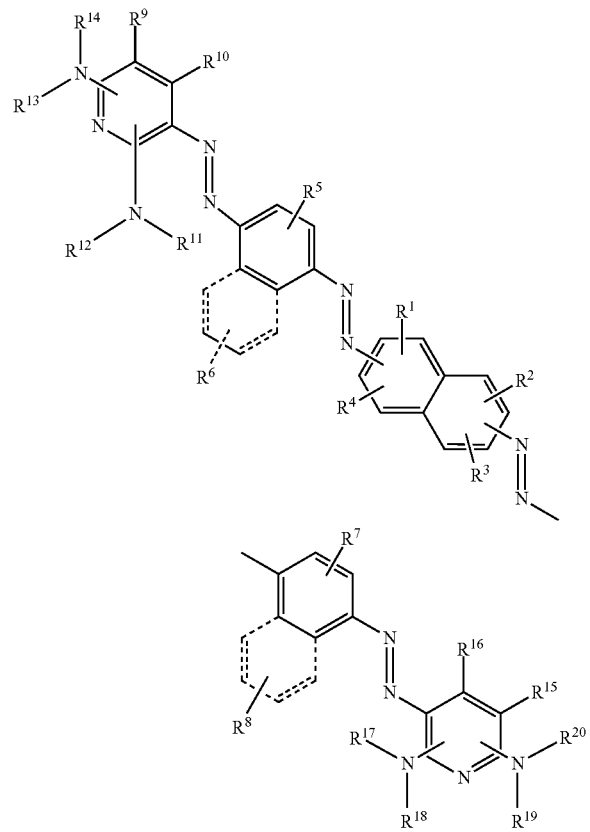

a process for their production and their use are described.

16 Claims, No Drawings

(56) References Cited

U.S. PATENT DOCUMENTS

2009/0207287 A1    8/2009 Miya et al.

FOREIGN PATENT DOCUMENTS

| | | |
|---|---|---|
| DE | 079780 C | 2/1895 |
| DE | 172106 C | 6/1906 |
| DE | 2230392 A1 | 1/1974 |
| DE | 34 16 327 A1 | 11/1985 |
| EP | 0085465 A1 | 8/1983 |
| EP | 0632104 A1 | 1/1995 |
| EP | 2457956 A1 | 5/2012 |
| FR | 2217384 A1 | 9/1974 |
| GB | 1331445 A | 9/1973 |
| GB | 2337053 A | 11/1999 |
| JP | H01197578 A | 8/1989 |
| JP | H04212968 A | 8/1992 |
| JP | 6-228476 * | 8/1994 |
| JP | 2002-3740 * | 1/2002 |
| WO | WO-2007/045825 A2 | 4/2007 |
| WO | WO-2010/000780 A1 | 1/2010 |

OTHER PUBLICATIONS

U.S. Appl. No. 15/032,832, filed Apr. 28, 2016, Barbieru et al.
U.S. Appl. No. 15/032,704, filed Apr. 28, 2016, Barbieru et al.
U.S. Appl. No. 15/032,724, filed Apr. 28, 2016, Vajiravelu et al.

* cited by examiner

ACID DYES, PROCESS FOR THE PRODUCTION THEREOF AND THEIR USE

CROSS-REFERENCE TO RELATED APPLICATIONS

This application is a national stage application (under 35 U.S.C. §371) of PCT/EP2014/072629, filed Oct. 22, 2014, which claims benefit of European Application No. 13190652.1, filed Oct. 29, 2013, both of which are incorporated herein by reference in their entirety.

The present invention relates to the technical field of dyestuffs for dyeing and printing of hydroxyl- and/or carboxamido-containing material.

Acid dyes with pyridine couplers are known from prior art and can be used as colorants in different applications, see for example U.S. Pat. No. 3,959,250 A1, U.S. Pat. No. 5,468,848 A1, JP 1 197578 A and WO 2007/045825 A2.

However, in the context of the dyeing and printing of hydroxyl- and/or carboxamido-containing material the known dyes have a number of technical disadvantages, which require improvement.

One such disadvantage is, that many of them are comprising heavy metals such as Cu, Cr or Ni. Such heavy metals are critical from a toxicological as well as an environmental point of view and shall thus be excluded.

Surprisingly, it has now been found that the dyes of formula (1) as described below show highly advantageous properties over the known dyes. These include high tinctorial strength with high brilliancy as well as high fastness properties such as wash, contact and light fastness on the materials mentioned above, on blends containing them as well as on microfibres. Most importantly, dyes of formula (1) are substantially heavy metal free and provide dyeings that are levelled. Metals may only be present as counter ions and are selected from the groups of alkali and earth alkali metals, which do not have such effects as heavy metals.

If heavy metals are present at all in the dyes of the present invention they do not result from being integral part of the dye but are coursed by the production process in general. Reasons in general for these impurities can be impurities resulting from educts and catalysts being used in the respective reactions—the levels of such impurities can be managed and be kept well below those recommended e.g. by ETAD® and would thus be below 100 ppm for Cr, below 250 ppm for Cu and below 200 ppm for Ni just to mention the values for the metals mentioned above. This is a significant improvement as compared to dyes where such metals are present at molar levels.

The present invention refers to dyes of the formula (1) and mixtures thereof

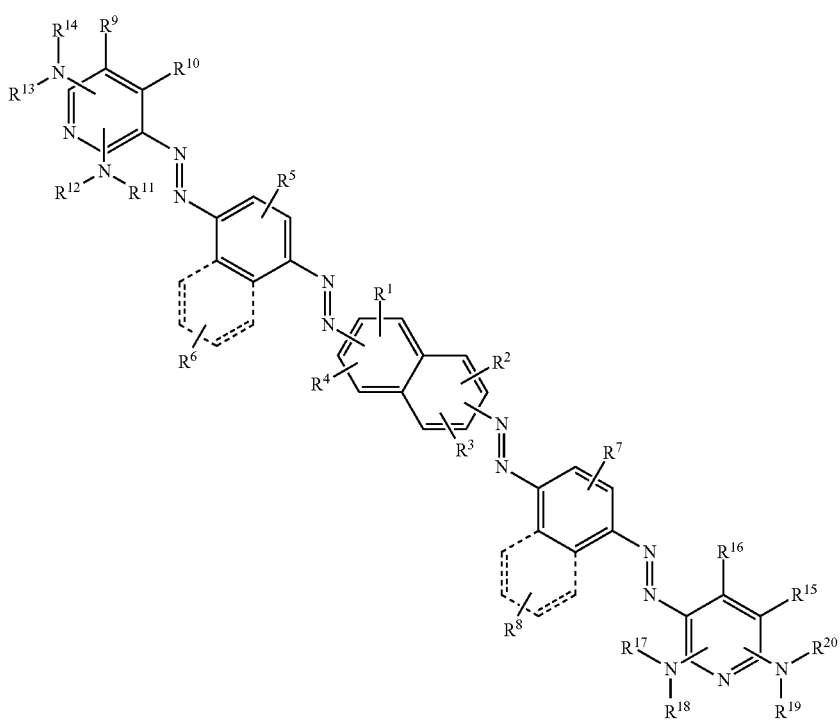

(1)

wherein $R^1$, $R^2$, $R^3$ and $R^4$ independent of each other is hydrogen, alkyl, alkoxy, halogen, trifluoromethyl or $SO_3M$ whereby at least two of them are $SO_3M$, $R^5$, $R^6$, $R^7$ and $R^8$ independent of each other is hydrogen, alkyl, substituted alkyl, alkyl chain interrupted by one or two heteroatoms, alkoxy, substituted alkoxy, halogen, trifluoromethyl, cycloalkyl, heterocycloalkyl, cyano, acyloxy, alkylcarbonyl, acylamino, alkylsulfonylamino, amino, monoalkyl-amino, monocycloalkyl-amino, dialkyl-amino, di(cyclo)alkyl-amino, alkylthio, alkylsulfonyl, alkoxycarbonyl, carbamoyl, sulfamoyl, ureido, —$SO_3M$ or alkylureido, $R^9$ and $R^{15}$ independent of each other is cyano, carbamoyl, carbamoyl substituted, alkoxycarbonyl, trifluoromethyl, carbonyltrifluoromethyl or halogen, $R^{10}$ and $R^{16}$ independent of each other is hydrogen, alkyl, cycloalkyl, trifluoromethyl, alkoxy, cyano, carbamoyl, alkoxycarbonyl, COOM, amino, hydroxyl, monocycloalkyl-amino, monoalkyl-amino, di(cyclo)alkyl-amino, dialkyl-amino, monoaryl-amino, diaryl-amino, monocycloalkylmonoarylamino, monoalkyl monoaryl amino, alkylthio, arylthio or is alkyl substituted by one or more substituents selected from the group consisting of hydroxy, cycloalkyl, heteroaryl, heterocycloalkyl, aryl, aryloxy, alkoxy, alkylthio, arylthio, halogen, cyano, COOM, alkoxycarbonyl, acyloxy, carbamoyl, nitro, amino, acylamino, arylcarbonylamino, alkylsulfonylamino, arylsulfonylamino, ureido, alkylureido and phenylureido, $R^{11}$, $R^{12}$, $R^{13}$, $R^{14}$, $R^{17}$, $R^{18}$, $R^{19}$, $R^{20}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxyalkyl, alkoxyalkylaminoalkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, heterocycloalkylalkyl or alkyl interrupted by one or more heteroatoms selected from the group consisting of oxygen and sulfur or alkyl substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$ or alkyl interrupted by one or more heteroatoms selected from the group consisting of oxygen and sulfur and substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$, M is hydrogen, an alkali metal, ammonium, one equivalent of an alkali earth metal or a monovalent organic cation, the dyes of formula (1) have two to six sulfonic acid groups and whereby the bonds with unfixed attachment points on the pyridine couplers mean that the amino rests bearing the substituents $R^{11}$, $R^{12}$, $R^{13}$ and $R^{14}$, respectively can be positioned ortho or para to $R^9$, meaning that when the amino rest bearing the substituents $R^{11}$ and $R^{12}$ is positioned ortho to $R^9$, the amino rest bearing the substituents $R^{13}$ and $R^{14}$ is positioned para to $R^9$, and vice versa;

and the same applies to the amino rests bearing the substituents $R^{17}$, $R^{18}$, $R^{19}$ and $R^{20}$, respectively that can be positioned ortho or para to $R^{15}$, meaning that when the amino rest bearing the substituents $R^{17}$ and $R^{18}$ is positioned ortho to $R^{15}$, the amino rest bearing the substituents $R^{19}$ and $R^{20}$ is positioned para to $R^{15}$, and vice versa.

This invention refers to all tautomeric and geometric isomers of the dyes of formula (1) and mixtures thereof.

Alkyl groups appearing in this invention may be straight-chain or branched and are $(C_1-C_{12})$-alkyl groups, preferably $(C_1-C_8)$-alkyl groups, for example n-butyl, isobutyl, n-pentyl, isopentyl, n-hexyl, 2-ethylhexyl, sec-butyl, tert-butyl and methylbutyl.

The same applies to alkoxy groups which accordingly are preferably $(C_1-C_8)$-alkoxy, for example methoxy and ethoxy, to thioalkoxy groups, which are preferably $(C_1-C_8)$-thioalkoxy, for example —$SCH_3$ or —$SC_2H_5$.

Cycloalkyl groups are preferably $(C_3-C_8)$-cycloalkyl and especially preferably cyclopentyl and cyclohexyl. The term cyloalkyl comprises for the purpose of the present invention substituted cycloalkyl groups and unsaturated cycloalkyl groups as well. A preferred group of this type is cyclopentenyl. Preferred substituents are alkyl, hydroxyalkyl, halogen, hydroxyl, alkoxy, acyl, cyano, nitro, amino, monoalkylamino, dialkylamino, mono(hydroxyalkyl)amino, bis-(hydroxyalkyl)amino, monoalkyl-mono(hydroxyalkyl)amino, carbamoyl, sulfamoyl, acylamino, ureido, aminosulfonylamino, alkoxycarbonyl and acyloxy.

Alkenyl groups may be straight-chain or branched and are preferably $(C_2-C_6)$-groups for example vinyl and allyl. The term alkenyl comprises for the purpose of the present invention alkynyl groups as well, for example ethynyl and propargyl.

Aryl groups appearing in this invention are preferably phenyl or naphthyl. The terms phenyl and naphthyl comprise unsubstituted as well as substituted phenyl and naphthyl. Preferred substituents are alkyl, cycloalkyl, heterocycloalkyl, hydroxyalkyl, halogen, hydroxyl, alkoxy, alkylthio, acyl, nitro, cyano, amino, monoalkylamino, dialkylamino, mono(hydroxyalkyl)amino, bis-(hydroxyalkyl) amino, monoalkyl-mono(hydroxyalkyl)amino, carbamoyl, sulfamoyl, acylamino, ureido, aminosulfonylamino, alkoxycarbonyl and acyloxy.

Heteroaryl groups appearing in this invention are preferably pyridine, pyrimidine, pyridazine, pyrazine, pyrrole, imidazole, pyrazole, 1,2,4-thiadiazole, 1,2,4-triazole, tetrazole, thiophene, thiazole, isothiazole, benzothiazole, benzoisothiazole, 1,3,4-thiadiazole, furane, oxazole, benzoxazole or isoxazole. The terms heteroaryl comprises the above groups in unsubstituted as well as in substituted form. Preferred substituents are alkyl, hydroxyalkyl, halogen, hydroxyl, alkoxy, alkylthio, acyl, nitro, cyano, amino, monoalkylamino, dialkylamino, mono(hydroxyalkyl)amino, bis(hydroxyalkyl)amino, monoalkyl-mono(hydroxyalkyl) amino, carbamoyl, sulfamoyl, acylamino, ureido, aminosulfonylamino, alkoxycarbonyl and acyloxy.

Heterocycloalkyl groups are preferably pyrrolidine, piperidine, morpholine, tetrahydrofuran or piperazine. The term heterocycloalkyl comprises the above groups in unsubstituted as well as in substituted form. Preferred substituents are alkyl, hydroxyalkyl, halogen, hydroxyl, alkoxy, alkylthio, acyl, nitro, cyano, amino, monoalkylamino, dialkylamino, mono(hydroxyalkyl)amino, bis (hydroxyalky) amino, monoalkyl-mono(hydroxyalkyl)amino, carbamoyl, sulfamoyl, acylamino, aminocarbonylamino, aminosulfonylamino, alkoxycarbonyl and acyloxy.

Halogen is preferably chlorine, bromine or fluorine.

M is preferably hydrogen, lithium, sodium, potassium or mono-, di-, tri- or tetra-$(C_1-C_4)$-alkylammonium.

Particularly preferred embodiments of the present invention are dyes of formula (1a) and mixtures thereof alkylaminoalkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, heterocycloalkylalkyl or alkyl interrupted by one or more heteroatoms selected from the group consisting of oxygen and sulfur or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl,

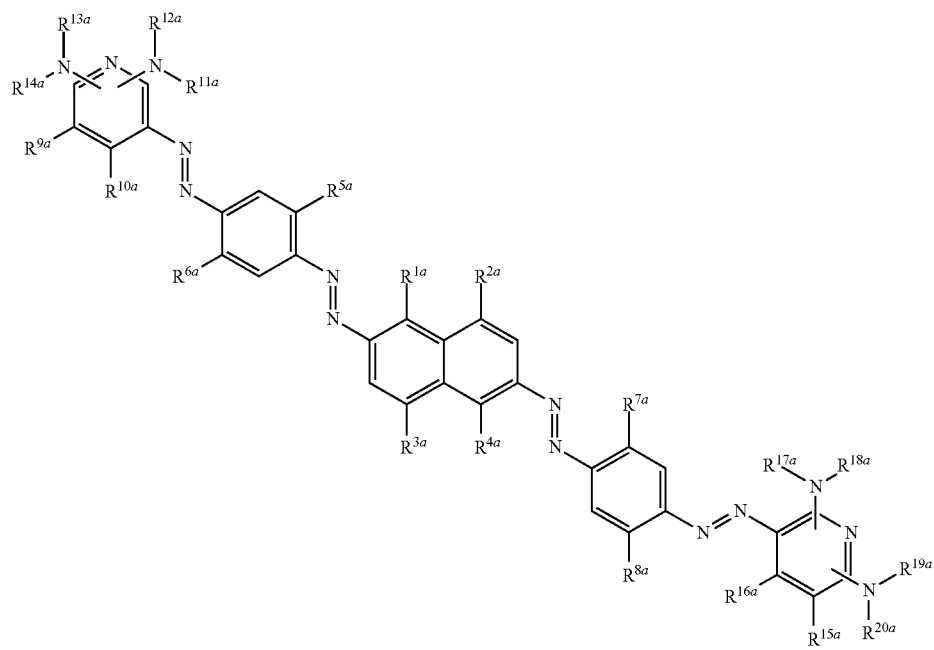

(1a)

wherein $R^{1a}$, $R^{2a}$, $R^{3a}$ and $R^{4a}$ independent of each other is hydrogen, alkyl, alkoxy, halogen, trifluoromethyl or $SO_3M$, whereby at least two of them are $SO_3M$, $R^{5a}$, $R^{6a}$, $R^{7a}$ and $R^{8a}$ independent of each other is hydrogen, $(C_1-C_4)$-alkyl, $(C_1-C_4)$-alkoxy, halogen, trifluoromethyl, —$SO_3M$ or $(C_1-C_4)$-acylamino, $R^{9a}$ and $R^{15a}$ independent of each other is cyano, carbamoyl, substituted carbamoyl, sulfonylalkyl or alkoxycarbonyl, $R^{10a}$ and $R^{16a}$ independent of one another is unsubstituted, linear or branched $(C_1-C_4)$-alkyl, unsubstituted $(C_5-C_7)$-cycloalkyl or substituted $(C_5-C_7)$-cycloalkyl with one or more substituents such as methyl, ethyl, isobutyl, sec-butyl, tert-butyl or methylbutyl, $R^{11a}$, $R^{12a}$ $R^{13a}$, $R^{14a}$, $R^{17a}$, $R^{18a}$, $R^{19a}$ and $R^{20a}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxy-aryloyl, trifluoromethyl, heteroaryl, heterocycloalkyl, alkoxycarbonyl, acyloxy, aryloyloxy, carbamoyl, sulfamoyl and $SO_3M$ or alkyl interrupted by one or more heteroatoms selected from the group consisting of oxygen and sulfur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ and M is hydrogen, an alkali metal, ammonium, one equivalent of an alkali earth metal or a monovalent organic cation.

In particularly preferred dyes of formula (1a):

$R^{1a}$, $R^{2a}$, $R^{3a}$ and $R^{4a}$ independent of each other is $SO_3M$, hydrogen, alkyl, alkoxy or halogen—whereby at least two of them are $SO_3M$, $R^{5a}$, $R^{6a}$, $R^{7a}$ and $R^{8a}$ independent of each other is hydrogen, methyl, halogen, —$SO_3M$ or acetylamino, $R^{9a}$ and $R^{15a}$ independent of each other is cyano or carbamoyl, $R^{10a}$ and $R^{16a}$ is methyl, $R^{11a}$, $R^{12a}$, $R^{13a}$, $R^{14a}$, $R^{17a}$, $R^{18a}$, $R^{19a}$ and $R^{20a}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, allyl, 2-methoxyethyl, 3-methoxypropyl, 2-cyanoethyl, 2-(methylthio)ethyl, 2-fluoroethyl, 2-chloroethyl, 3-chloropropyl, tetrahydrofurfuryl, 2-furan-2-yl-ethyl, 4-(2-hydroxy-ethanesulfonyl)-phenyl, 2-(2-tertbutylsulfanylethanesulfonyl)-ethyl, 2-(2-hydroxyethoxypropyl), 2-(2-hydroxy-ethoxy)ethyl, 3-(4-hydroxyethoxy)propyl, 3-(2-phenoxy-ethoxy)-propyl, 3-isopropoxy-propyl, 3-ethoxy-propyl or 3-ethoxybutyl and M is hydrogen, sodium, potassium, lithium or ammonium.

Examples of particularly preferred dyes of the formula (1a) are the compounds of formulae ($1a^1$ to $1a^{462}$) and mixtures thereof:

| Structure | $R^{1a}$ | $R^{2a}$ | $R^{3a}$ | $R^{4a}$ | $R^{5a}/R^{7a}$ | $R^{6a}/R^{8a}$ | $R^{9a}/R^{16a}$ | $R^{11a}/R^{17a}$ | $R^{12a}/R^{18a}$ | $R^{13a}/R^{19a}$ | $R^{14a}/R^{20a}$ |
|---|---|---|---|---|---|---|---|---|---|---|---|
| $1a^1$ | $SO_3H$ | $SO_3H$ | H | H | Methyl | Methyl | CN | Methyl | H | Methyl | H |
| $1a^2$ | $SO_3H$ | H | H | $SO_3H$ | | | | | | | |
| $1a^3$ | $SO_3H$ | $SO_3H$ | H | H | Methyl | Methyl | CN | Ethyl | H | Ethyl | H |
| $1a^4$ | $SO_3H$ | H | H | $SO_3H$ | | | | | | | |
| $1a^5$ | $SO_3H$ | $SO_3H$ | H | H | Methyl | Methyl | CN | Propyl | H | Propyl | H |
| $1a^6$ | $SO_3H$ | H | H | $SO_3H$ | | | | | | | |
| $1a^7$ | $SO_3H$ | $SO_3H$ | H | H | Methyl | Methyl | CN | Butyl | H | Butyl | H |
| $1a^8$ | $SO_3H$ | H | H | $SO_3H$ | | | | | | | |
| $1a^9$ | $SO_3H$ | $SO_3H$ | H | H | Methyl | Methyl | CN | Pentyl | H | Pentyl | H |
| $1a^{10}$ | $SO_3H$ | H | H | $SO_3H$ | | | | | | | |
| $1a^{11}$ | $SO_3H$ | $SO_3H$ | H | H | Methyl | Methyl | CN | Hexyl | H | Hexyl | H |
| $1a^{12}$ | $SO_3H$ | H | H | $SO_3H$ | | | | | | | |
| $1a^{13}$ | $SO_3H$ | $SO_3H$ | H | H | Methyl | Methyl | CN | Cyclobutyl | H | Cyclobutyl | H |
| $1a^{14}$ | $SO_3H$ | H | H | $SO_3H$ | | | | | | | |
| $1a^{15}$ | $SO_3H$ | $SO_3H$ | H | H | Methyl | Methyl | CN | Cyclopentyl | H | Cyclopentyl | H |
| $1a^{16}$ | $SO_3H$ | H | H | $SO_3H$ | | | | | | | |
| $1a^{17}$ | $SO_3H$ | $SO_3H$ | H | H | Methyl | Methyl | CN | Cyclohexyl | H | Cyclohexyl | H |
| $1a^{18}$ | $SO_3H$ | H | H | $SO_3H$ | | | | | | | |
| $1a^{19}$ | $SO_3H$ | $SO_3H$ | H | H | Methyl | Methyl | CN | 2-Methyl cyclohexyl | H | 2-Methyl cyclohexyl | H |
| $1a^{20}$ | $SO_3H$ | H | H | $SO_3H$ | | | | | | | |
| $1a^{21}$ | $SO_3H$ | $SO_3H$ | H | H | Methyl | Methyl | CN | 3-Methyl cyclohexyl | H | 3-Methyl cyclohexyl | H |
| $1a^{22}$ | $SO_3H$ | H | H | $SO_3H$ | | | | | | | |
| $1a^{23}$ | $SO_3H$ | $SO_3H$ | H | H | Methyl | Methyl | CN | Isopropyl | H | Isopropyl | H |
| $1a^{24}$ | $SO_3H$ | H | H | $SO_3H$ | | | | | | | |
| $1a^{25}$ | $SO_3H$ | $SO_3H$ | H | H | Methyl | Methyl | CN | Sec-butyl | H | Sec-butyl | H |
| $1a^{26}$ | $SO_3H$ | H | H | $SO_3H$ | | | | | | | |
| $1a^{27}$ | $SO_3H$ | $SO_3H$ | H | H | Methyl | Methyl | CN | 2-Methylbutyl | H | 2-Methylbutyl | H |
| $1a^{28}$ | $SO_3H$ | H | H | $SO_3H$ | | | | | | | |
| $1a^{29}$ | $SO_3H$ | $SO_3H$ | H | H | Methyl | Methyl | CN | 1-Ethylpropyl | H | 1-Ethylpropyl | H |
| $1a^{30}$ | $SO_3H$ | H | H | $SO_3H$ | | | | | | | |
| $1a^{31}$ | $SO_3H$ | $SO_3H$ | H | H | Methyl | Methyl | CN | 1,2-Dimethyl propyl | H | 1,2-Dimethyl propyl | H |
| $1a^{32}$ | $SO_3H$ | H | H | $SO_3H$ | | | | | | | |
| $1a^{33}$ | $SO_3H$ | $SO_3H$ | H | H | Methyl | Methyl | CN | Tert-butyl | H | Tert-butyl | H |
| $1a^{34}$ | $SO_3H$ | H | H | $SO_3H$ | | | | | | | |
| $1a^{35}$ | $SO_3H$ | $SO_3H$ | H | H | Methyl | Methyl | CN | 3-Methyl butyl | H | 3-Methyl butyl | H |
| $1a^{36}$ | $SO_3H$ | H | H | $SO_3H$ | | | | | | | |
| $1a^{37}$ | $SO_3H$ | $SO_3H$ | H | H | Methyl | Methyl | CN | Pentan-2-yl | H | Pentan-2-yl | H |
| $1a^{38}$ | $SO_3H$ | H | H | $SO_3H$ | | | | | | | |
| $1a^{39}$ | $SO_3H$ | $SO_3H$ | H | H | Methyl | Methyl | CN | 2-Ethylhexyl | H | 2-Ethylhexyl | H |
| $1a^{40}$ | $SO_3H$ | H | H | $SO_3H$ | | | | | | | |
| $1a^{41}$ | $SO_3H$ | $SO_3H$ | H | H | Methyl | Methyl | CN | 2,2-Dimethyl propyl | H | 2,2-Dimethyl propyl | H |
| $1a^{42}$ | $SO_3H$ | H | H | $SO_3H$ | | | | | | | |
| $1a^{43}$ | $SO_3H$ | $SO_3H$ | H | H | Methyl | Methyl | CN | Phenyl | H | Phenyl | H |
| $1a^{44}$ | $SO_3H$ | H | H | $SO_3H$ | | | | | | | |
| $1a^{45}$ | $SO_3H$ | $SO_3H$ | H | H | Methyl | Methyl | CN | Benzyl | H | Benzyl | H |
| $1a^{46}$ | $SO_3H$ | H | H | $SO_3H$ | | | | | | | |
| $1a^{47}$ | $SO_3H$ | $SO_3H$ | H | H | Methyl | Methyl | CN | Allyl | H | Allyl | H |
| $1a^{48}$ | $SO_3H$ | H | H | $SO_3H$ | | | | | | | |
| $1a^{49}$ | $SO_3H$ | $SO_3H$ | H | H | Methyl | Methyl | CN | 2-Methoxy ethyl | H | Butyl | H |
| $1a^{50}$ | $SO_3H$ | H | H | $SO_3H$ | | | | | | | |
| $1a^{51}$ | $SO_3H$ | $SO_3H$ | H | H | Methyl | Methyl | CN | 3-Methoxy propyl | H | 3-Methoxy propyl | H |
| $1a^{52}$ | $SO_3H$ | H | H | $SO_3H$ | | | | | | | |
| $1a^{53}$ | $SO_3H$ | $SO_3H$ | H | H | Methyl | Methyl | CN | 3-Methoxy propyl | H | Butyl | H |
| $1a^{54}$ | $SO_3H$ | H | H | $SO_3H$ | | | | | | | |
| $1a^{55}$ | $SO_3H$ | $SO_3H$ | H | H | Methyl | Methyl | CN | 2-Methyl thioethyl | H | Sec-butyl | H |
| $1a^{56}$ | $SO_3H$ | H | H | $SO_3H$ | | | | | | | |
| $1a^{57}$ | $SO_3H$ | $SO_3H$ | H | H | Methyl | Methyl | CN | 2-Methyl thioethyl | H | 2-Hydroxyethyl | H |
| $1a^{58}$ | $SO_3H$ | H | H | $SO_3H$ | | | | | | | |

-continued

| Structure | $R^{1a}$ | $R^{2a}$ | $R^{3a}$ | $R^{4a}$ | $R^{5a}/R^{7a}$ | $R^{6a}/R^{8a}$ | $R^{9a}/R^{16a}$ | $R^{11a}/R^{17a}$ | $R^{12a}/R^{18a}$ | $R^{13a}/R^{19a}$ | $R^{14a}/R^{20a}$ |
|---|---|---|---|---|---|---|---|---|---|---|---|
| $1a^{59}$ | SO$_3$H | SO$_3$H | H | H | Methyl | Methyl | CN | Butyl | Butyl | 2-Hydroxyethyl | H |
| $1a^{60}$ | SO$_3$H | H | H | SO$_3$H | | | | | | | |
| $1a^{61}$ | SO$_3$H | SO$_3$H | H | H | Methyl | Methyl | CN | Isopropyl | Isopropyl | 2-Hydroxyethyl | H |
| $1a^{62}$ | SO$_3$H | H | H | SO$_3$H | | | | | | | |
| $1a^{63}$ | SO$_3$H | SO$_3$H | H | H | Methyl | Methyl | CN | 2-Fluoroethyl | H | Butyl | H |
| $1a^{64}$ | SO$_3$H | H | H | SO$_3$H | | | | | | | |
| $1a^{65}$ | SO$_3$H | SO$_3$H | H | H | Methyl | Methyl | CN | 2-Chloroethyl | H | 2-Ethylhexyl | H |
| $1a^{66}$ | SO$_3$H | H | H | SO$_3$H | | | | | | | |
| $1a^{67}$ | SO$_3$H | SO$_3$H | H | H | Methyl | Methyl | CN | 3-Chloro propyl | H | 2-Ethylhexyl | H |
| $1a^{68}$ | SO$_3$H | H | H | SO$_3$H | | | | | | | |
| $1a^{69}$ | SO$_3$H | SO$_3$H | H | H | Methyl | Methyl | CN | Tetrahydro furfuryl | H | Butyl | H |
| $1a^{70}$ | SO$_3$H | H | H | SO$_3$H | | | | | | | |
| $1a^{71}$ | SO$_3$H | SO$_3$H | H | H | Methyl | Methyl | CN | 2-Furan-2-yl-ethyl | H | Butyl | H |
| $1a^{72}$ | SO$_3$H | H | H | SO$_3$H | | | | | | | |
| $1a^{73}$ | SO$_3$H | SO$_3$H | H | H | Methyl | Methyl | CN | 2-(2-Hydroxy-ethylsulfanyl)-ethyl | H | Butyl | H |
| $1a^{74}$ | SO$_3$H | H | H | SO$_3$H | | | | | | | |
| $1a^{75}$ | SO$_3$H | SO$_3$H | H | H | Methyl | Methyl | CN | 2-(2-tert-Butyl sulfanyl-ethane sulfonyl)-ethyl | H | Butyl | H |
| $1a^{76}$ | SO$_3$H | H | H | SO$_3$H | | | | | | | |
| $1a^{77}$ | SO$_3$H | SO$_3$H | H | H | Methyl | Methyl | CN | 2-Hydroxy-ethoxy propyl | H | Butyl | H |
| $1a^{78}$ | SO$_3$H | H | H | SO$_3$H | | | | | | | |
| $1a^{79}$ | SO$_3$H | SO$_3$H | H | H | Methyl | Methyl | CN | 2(2-hydroxy ethoxy)ethyl | H | Butyl | H |
| $1a^{80}$ | SO$_3$H | H | H | SO$_3$H | | | | | | | |
| $1a^{81}$ | SO$_3$H | SO$_3$H | H | H | Methyl | Methyl | CN | H | H | 2-(2-Hydroxy ethoxy) propyl | H |
| $1a^{82}$ | SO$_3$H | H | H | SO$_3$H | | | | | | | |
| $1a^{83}$ | SO$_3$H | SO$_3$H | H | H | Methyl | Methyl | CN | H | H | 2-(2-Hydroxy ethoxy)ethyl | H |
| $1a^{84}$ | SO$_3$H | H | H | SO$_3$H | | | | | | | |
| $1a^{85}$ | SO$_3$H | SO$_3$H | H | H | Methyl | Methyl | CN | H | H | 3-(4-Hydroxy butoxy)propyl | H |
| $1a^{86}$ | SO$_3$H | H | H | SO$_3$H | | | | | | | |
| $1a^{87}$ | SO$_3$H | SO$_3$H | H | H | Methyl | Methyl | CN | 2-(2-Hydroxy ethoxy)ethyl | H | H | H |
| $1a^{88}$ | SO$_3$H | H | H | SO$_3$H | | | | | | | |
| $1a^{89}$ | SO$_3$H | SO$_3$H | H | H | Methyl | Methyl | CN | 3-(4-Hydroxy butoxy)propy | H | H | H |
| $1a^{90}$ | SO$_3$H | H | H | SO$_3$H | | | | | | | |
| $1a^{91}$ | SO$_3$H | SO$_3$H | H | H | Methyl | Methyl | CN | Phenyl | H | 2-(2-Hydroxy ethoxy)ethyl | H |
| $1a^{92}$ | SO$_3$H | H | H | SO$_3$H | | | | | | | |
| $1a^{93}$ | SO$_3$H | SO$_3$H | H | H | Methyl | Methyl | CN | 3-(2-Phenoxy ethoxy)-propyl | H | H | H |
| $1a^{94}$ | SO$_3$H | H | H | SO$_3$H | | | | | | | |
| $1a^{95}$ | SO$_3$H | SO$_3$H | H | H | Methyl | Methyl | CN | 3-Isopropoxy-propyl | H | 3-Isopropoxy-propyl | H |
| $1a^{96}$ | SO$_3$H | H | H | SO$_3$H | | | | | | | |
| $1a^{97}$ | SO$_3$H | SO$_3$H | H | H | Methyl | Methyl | CN | 3-Isopropoxy-propyl | H | H | H |
| $1a^{98}$ | SO$_3$H | H | H | SO$_3$H | | | | | | | |
| $1a^{99}$ | SO$_3$H | SO$_3$H | H | H | Methyl | Methyl | CN | 3-Isopropoxy-propyl | H | Phenyl | H |
| $1a^{100}$ | SO$_3$H | H | H | SO$_3$H | | | | | | | |
| $1a^{101}$ | SO$_3$H | SO$_3$H | H | H | Methyl | Methyl | CN | 3-Ethoxy-propyl | H | 3-Ethoxy-propyl | H |
| $1a^{102}$ | SO$_3$H | H | H | SO$_3$H | | | | | | | |
| $1a^{103}$ | SO$_3$H | SO$_3$H | H | H | Methyl | Methyl | CN | 3-Ethoxy-propyl | H | H | H |
| $1a^{104}$ | SO$_3$H | H | H | SO$_3$H | | | | | | | |
| $1a^{105}$ | SO$_3$H | SO$_3$H | H | H | Methyl | Methyl | CN | 3-Ethoxy-propyl | H | Phenyl | H |
| $1a^{106}$ | SO$_3$H | H | H | SO$_3$H | | | | | | | |
| $1a^{107}$ | SO$_3$H | SO$_3$H | H | H | Methyl | Methyl | CN | 3-Ethoxybutyl | H | 3-Ethoxybutyl | H |
| $1a^{108}$ | SO$_3$H | H | H | SO$_3$H | | | | | | | |
| $1a^{109}$ | SO$_3$H | SO$_3$H | H | H | Methyl | Methyl | CN | 3-Ethoxybutyl | H | H | H |
| $1a^{110}$ | SO$_3$H | H | H | SO$_3$H | | | | | | | |
| $1a^{111}$ | SO$_3$H | SO$_3$H | H | H | Methyl | Methyl | CN | 3-Ethoxybutyl | H | Phenyl | H |
| $1a^{112}$ | SO$_3$H | H | H | SO$_3$H | | | | | | | |
| $1a^{113}$ | SO$_3$H | SO$_3$H | H | H | Methyl | Methyl | CN | 4-(2-Hydroxy-ethanesulfonyl)-phenyl | H | H | H |
| $1a^{114}$ | SO$_3$H | H | H | SO$_3$H | | | | | | | |
| $1a^{115}$ | SO$_3$H | SO$_3$H | H | H | Methyl | F | CN | 2-Methoxy ethyl | H | Butyl | H |
| $1a^{116}$ | SO$_3$H | H | H | SO$_3$H | | | | | | | |
| $1a^{117}$ | SO$_3$H | SO$_3$H | H | H | Methyl | F | CN | 3-Methoxy propyl | H | Butyl | H |
| $1a^{118}$ | SO$_3$H | H | H | SO$_3$H | | | | | | | |
| $1a^{119}$ | SO$_3$H | SO$_3$H | H | H | Methyl | F | CN | Butyl | Butyl | 2-Hydroxyethyl | H |
| $1a^{120}$ | SO$_3$H | H | H | SO$_3$H | | | | | | | |
| $1a^{121}$ | SO$_3$H | SO$_3$H | H | H | Methyl | F | CN | Isopropyl | Isopropyl | 2-Hydroxyethyl | H |
| $1a^{122}$ | SO$_3$H | H | H | SO$_3$H | | | | | | | |
| $1a^{123}$ | SO$_3$H | SO$_3$H | H | H | Methyl | F | CN | 2-Fluoro ethyl | H | Butyl | H |
| $1a^{124}$ | SO$_3$H | H | H | SO$_3$H | | | | | | | |

-continued

| Structure | $R^{1a}$ | $R^{2a}$ | $R^{3a}$ | $R^{4a}$ | $R^{5a}/R^{7a}$ | $R^{6a}/R^{8a}$ | $R^{9a}/R^{16a}$ | $R^{11a}/R^{17a}$ | $R^{12a}/R^{18a}$ | $R^{13a}/R^{19a}$ | $R^{14a}/R^{20a}$ |
|---|---|---|---|---|---|---|---|---|---|---|---|
| 1a$^{125}$ | SO$_3$H | SO$_3$H | H | H | Methyl | F | CN | 2-Chloro ethyl | H | 2-Ethylhexyl | H |
| 1a$^{126}$ | SO$_3$H | H | H | SO$_3$H | | | | | | | |
| 1a$^{127}$ | SO$_3$H | SO$_3$H | H | H | Methyl | F | CN | 3-Chloro propyl | H | 2-Ethylhexyl | H |
| 1a$^{128}$ | SO$_3$H | H | H | SO$_3$H | | | | | | | |
| 1a$^{129}$ | SO$_3$H | SO$_3$H | H | H | Methyl | F | CN | 2-(2-Hydroxy-ethyl sulfanyl)-ethyl | H | Butyl | H |
| 1a$^{130}$ | SO$_3$H | H | H | SO$_3$H | | | | | | | |
| 1a$^{131}$ | SO$_3$H | SO$_3$H | H | H | Methyl | F | CN | 2-(2-tert-Butyl sulfanyl-ethane sulfonyl)-ethyl | H | Butyl | H |
| 1a$^{132}$ | SO$_3$H | H | H | SO$_3$H | | | | | | | |
| 1a$^{133}$ | SO$_3$H | SO$_3$H | H | H | Methyl | F | CN | 2-Hydroxy ethoxy propyl | H | Butyl | H |
| 1a$^{134}$ | SO$_3$H | H | H | SO$_3$H | | | | | | | |
| 1a$^{135}$ | SO$_3$H | SO$_3$H | H | H | Methyl | F | CN | 2-Hydroxy ethoxyethyl | H | Butyl | H |
| 1a$^{136}$ | SO$_3$H | H | H | SO$_3$H | | | | | | | |
| 1a$^{137}$ | SO$_3$H | SO$_3$H | H | H | Methyl | F | CN | 2-(Ethyl sulfonyl) ethanol | H | Butyl | H |
| 1a$^{138}$ | SO$_3$H | H | H | SO$_3$H | | | | | | | |
| 1a$^{139}$ | SO$_3$H | SO$_3$H | H | H | Methyl | F | CN | H | H | 2-(2-Hydroxy ethoxy)propyl | H |
| 1a$^{140}$ | SO$_3$H | H | H | SO$_3$H | | | | | | | |
| 1a$^{141}$ | SO$_3$H | SO$_3$H | H | H | Methyl | F | CN | H | H | 2-(2-Hydroxy ethoxy)ethyl | H |
| 1a$^{142}$ | SO$_3$H | H | H | SO$_3$H | | | | | | | |
| 1a$^{143}$ | SO$_3$H | SO$_3$H | H | H | Methyl | F | CN | H | H | 3-(4-Hydroxy butoxy)propyl | H |
| 1a$^{144}$ | SO$_3$H | H | H | SO$_3$H | | | | | | | |
| 1a$^{145}$ | SO$_3$H | SO$_3$H | H | H | Methyl | F | CN | 2-(2-Hydroxy ethoxy)ethyl | H | H | H |
| 1a$^{146}$ | SO$_3$H | H | H | SO$_3$H | | | | | | | |
| 1a$^{147}$ | SO$_3$H | SO$_3$H | H | H | Methyl | F | CN | 3-(4-Hydroxy butoxy)propyl | H | H | H |
| 1a$^{148}$ | SO$_3$H | H | H | SO$_3$H | | | | | | | |
| 1a$^{149}$ | SO$_3$H | SO$_3$H | H | H | Methyl | F | CN | Phenyl | H | (2-Hydroxy ethoxy)ethyl | H |
| 1a$^{150}$ | SO$_3$H | H | H | SO$_3$H | | | | | | | |
| 1a$^{151}$ | SO$_3$H | SO$_3$H | H | H | Methyl | F | CN | 3-(2-Phenoxy-ethoxy)-propyl | H | H | H |
| 1a$^{152}$ | SO$_3$H | H | H | SO$_3$H | | | | | | | |
| 1a$^{153}$ | SO$_3$H | SO$_3$H | H | H | Methyl | F | CN | 3-Isopropoxy-propyl | H | 3-Isopropoxy-propyl | H |
| 1a$^{154}$ | SO$_3$H | H | H | SO$_3$H | | | | | | | |
| 1a$^{155}$ | SO$_3$H | SO$_3$H | H | H | Methyl | F | CN | 3-Isopropoxy-propyl | H | H | H |
| 1a$^{156}$ | SO$_3$H | H | H | SO$_3$H | | | | | | | |
| 1a$^{157}$ | SO$_3$H | SO$_3$H | H | H | Methyl | F | CN | 3-Isopropoxy-propyl | H | Phenyl | H |
| 1a$^{158}$ | SO$_3$H | H | H | SO$_3$H | | | | | | | |
| 1a$^{159}$ | SO$_3$H | SO$_3$H | H | H | Methyl | F | CN | 3-Ethoxy-propyl | H | 3-Ethoxy-propyl | H |
| 1a$^{160}$ | SO$_3$H | H | H | SO$_3$H | | | | | | | |
| 1a$^{161}$ | SO$_3$H | SO$_3$H | H | H | Methyl | F | CN | 3-Ethoxy-propyl | H | H | H |
| 1a$^{162}$ | SO$_3$H | H | H | SO$_3$H | | | | | | | |
| 1a$^{163}$ | SO$_3$H | SO$_3$H | H | H | Methyl | F | CN | 3-Ethoxy-propyl | H | Phenyl | H |
| 1a$^{164}$ | SO$_3$H | H | H | SO$_3$H | | | | | | | |
| 1a$^{165}$ | SO$_3$H | SO$_3$H | H | H | Methyl | F | CN | 3-Ethoxybutyl | H | 3-Ethoxybutyl | H |
| 1a$^{166}$ | SO$_3$H | H | H | SO$_3$H | | | | | | | |
| 1a$^{167}$ | SO$_3$H | SO$_3$H | H | H | Methyl | F | CN | 3-Ethoxybutyl | H | H | H |
| 1a$^{168}$ | SO$_3$H | H | H | SO$_3$H | | | | | | | |
| 1a$^{169}$ | SO$_3$H | SO$_3$H | H | H | Methyl | F | CN | 3-Ethoxybutyl | H | Phenyl | H |
| 1a$^{170}$ | SO$_3$H | H | H | SO$_3$H | | | | | | | |
| 1a$^{171}$ | SO$_3$H | SO$_3$H | H | H | Methyl | F | CN | 4-(2-Hydroxy-ethanesulfonyl)-phenyl | H | H | H |
| 1a$^{172}$ | SO$_3$H | H | H | SO$_3$H | | | | | | | |
| 1a$^{173}$ | SO$_3$H | SO$_3$H | H | H | NHCOCH$_3$ | OMe | CN | 2-Methoxy ethyl | H | Butyl | H |
| 1a$^{174}$ | SO$_3$H | H | H | SO$_3$H | | | | | | | |
| 1a$^{175}$ | SO$_3$H | SO$_3$H | H | H | NHCOCH$_3$ | OMe | CN | 3-Methoxy propyl | H | Butyl | H |
| 1a$^{176}$ | SO$_3$H | H | H | SO$_3$H | | | | | | | |
| 1a$^{177}$ | SO$_3$H | H | H | SO$_3$H | | | | | | | |
| 1a$^{178}$ | SO$_3$H | SO$_3$H | H | H | NHCOCH$_3$ | OMe | CN | Butyl | Butyl | 2-Hydroxyethyl | H |
| 1a$^{179}$ | SO$_3$H | H | H | SO$_3$H | | | | | | | |
| 1a$^{180}$ | SO$_3$H | SO$_3$H | H | H | NHCOCH$_3$ | OMe | CN | Isopropyl | Iso-propyl | 2-Hydroxyethyl | H |
| 1a$^{181}$ | SO$_3$H | H | H | SO$_3$H | | | | | | | |
| 1a$^{182}$ | SO$_3$H | SO$_3$H | H | H | NHCOCH$_3$ | OMe | CN | 2-Fluoroethyl | H | Butyl | H |
| 1a$^{183}$ | SO$_3$H | H | H | SO$_3$H | | | | | | | |
| 1a$^{184}$ | SO$_3$H | SO$_3$H | H | H | NHCOCH$_3$ | OMe | CN | 2-Chloroethyl | H | 2-Ethylhexyl | H |
| 1a$^{185}$ | SO$_3$H | H | H | SO$_3$H | | | | | | | |
| 1a$^{186}$ | SO$_3$H | SO$_3$H | H | H | NHCOCH$_3$ | OMe | CN | 3-Chloropropyl | H | 2-Ethylhexyl | H |
| 1a$^{187}$ | SO$_3$H | H | H | SO$_3$H | | | | | | | |
| 1a$^{188}$ | SO$_3$H | SO$_3$H | H | H | NHCOCH$_3$ | OMe | CN | 2-(2-Hydroxy-ethyl sulfanyl)-ethyl] | H | Butyl | H |
| 1a$^{189}$ | SO$_3$H | H | H | SO$_3$H | | | | | | | |

-continued

| Structure | R$^{1a}$ | R$^{2a}$ | R$^{3a}$ | R$^{4a}$ | R$^{5a}$/R$^{7a}$ | R$^{6a}$/R$^{8a}$ | R$^{9a}$/R$^{16a}$ | R$^{11a}$/R$^{17a}$ | R$^{12a}$/R$^{18a}$ | R$^{13a}$/R$^{19a}$ | R$^{14a}$/R$^{20a}$ |
|---|---|---|---|---|---|---|---|---|---|---|---|
| 1a$^{190}$ | SO$_3$H | SO$_3$H | H | H | NHCOCH$_3$ | OMe | CN | 2-(2-tert-Butyl sulfanyl-ethane sulfonyl)-ethyl | H | Butyl | H |
| 1a$^{191}$ | SO$_3$H | H | H | SO$_3$H | | | | | | | |
| 1a$^{192}$ | SO$_3$H | SO$_3$H | H | H | NHCOCH$_3$ | OMe | CN | 2-Hydroxyethoxy propyl | H | Butyl | H |
| 1a$^{193}$ | SO$_3$H | H | H | SO$_3$H | | | | | | | |
| 1a$^{194}$ | SO$_3$H | SO$_3$H | H | H | NHCOCH$_3$ | OMe | CN | 2-Hydroxy ethoxyethyl | H | Butyl | H |
| 1a$^{195}$ | SO$_3$H | H | H | SO$_3$H | | | | | | | |
| 1a$^{196}$ | SO$_3$H | SO$_3$H | H | H | NHCOCH$_3$ | OMe | CN | H | H | 2-(2-Hydroxy ethoxy) propyl | H |
| 1a$^{197}$ | SO$_3$H | H | H | SO$_3$H | | | | | | | |
| 1a$^{198}$ | SO$_3$H | SO$_3$H | H | H | NHCOCH$_3$ | OMe | CN | H | H | 2-(2-Hydroxy ethoxy)ethyl | H |
| 1a$^{199}$ | SO$_3$H | H | H | SO$_3$H | | | | | | | |
| 1a$^{200}$ | SO$_3$H | SO$_3$H | H | H | NHCOCH$_3$ | OMe | CN | H | H | 3-(4-Hydroxy butoxy)propyl | H |
| 1a$^{201}$ | SO$_3$H | H | H | SO$_3$H | | | | | | | |
| 1a$^{202}$ | SO$_3$H | SO$_3$H | H | H | NHCOCH$_3$ | OMe | CN | 2-(2-Hydroxy ethoxy)ethyl | H | H | H |
| 1a$^{203}$ | SO$_3$H | H | H | SO$_3$H | | | | | | | |
| 1a$^{204}$ | SO$_3$H | SO$_3$H | H | H | NHCOCH$_3$ | OMe | CN | 3-(4-Hydroxy butoxy)propyl | H | H | H |
| 1a$^{205}$ | SO$_3$H | H | H | SO$_3$H | | | | | | | |
| 1a$^{206}$ | SO$_3$H | SO$_3$H | H | H | NHCOCH$_3$ | OMe | CN | H | H | 2-(2-Hydroxy ethoxy)ethyl | H |
| 1a$^{207}$ | SO$_3$H | H | H | SO$_3$H | | | | | | | |
| 1a$^{208}$ | SO$_3$H | SO$_3$H | H | H | NHCOCH$_3$ | OMe | CN | Phenyl | H | 2-(2-Hydroxy ethoxy)ethyl | H |
| 1a$^{209}$ | SO$_3$H | H | H | SO$_3$H | | | | | | | |
| 1a$^{210}$ | SO$_3$H | SO$_3$H | H | H | NHCOCH$_3$ | OMe | CN | 3-(2-Phenoxy-ethoxy)-propyl | H | H | H |
| 1a$^{211}$ | SO$_3$H | H | H | SO$_3$H | | | | | | | |
| 1a$^{212}$ | SO$_3$H | SO$_3$H | H | H | NHCOCH$_3$ | OMe | CN | 3-Isopropoxy-propyl | H | 3-Isopropoxy-propyl | H |
| 1a$^{213}$ | SO$_3$H | H | H | SO$_3$H | | | | | | | |
| 1a$^{214}$ | SO$_3$H | SO$_3$H | H | H | NHCOCH$_3$ | OMe | CN | 3-Isopropoxy-propyl | H | H | H |
| 1a$^{215}$ | SO$_3$H | H | H | SO$_3$H | | | | | | | |
| 1a$^{216}$ | SO$_3$H | SO$_3$H | H | H | NHCOCH$_3$ | OMe | CN | 3-Isopropoxy-propyl | H | Phenyl | H |
| 1a$^{217}$ | SO$_3$H | H | H | SO$_3$H | | | | | | | |
| 1a$^{218}$ | SO$_3$H | SO$_3$H | H | H | NHCOCH$_3$ | OMe | CN | 3-Ethoxy-propyl | H | 3-Ethoxy-propyl | H |
| 1a$^{219}$ | SO$_3$H | H | H | SO$_3$H | | | | | | | |
| 1a$^{220}$ | SO$_3$H | SO$_3$H | H | H | NHCOCH$_3$ | OMe | CN | 3-Ethoxy-propyl | H | H | H |
| 1a$^{221}$ | SO$_3$H | H | H | SO$_3$H | | | | | | | |
| 1a$^{222}$ | SO$_3$H | SO$_3$H | H | H | NHCOCH$_3$ | OMe | CN | 3-Ethoxy-propyl | H | Phenyl | H |
| 1a$^{223}$ | SO$_3$H | H | H | SO$_3$H | | | | | | | |
| 1a$^{224}$ | SO$_3$H | SO$_3$H | H | H | NHCOCH$_3$ | OMe | CN | 3-Ethoxybutyl | H | 3-Ethoxybutyl | H |
| 1a$^{225}$ | SO$_3$H | H | H | SO$_3$H | | | | | | | |
| 1a$^{226}$ | SO$_3$H | SO$_3$H | H | H | NHCOCH$_3$ | OMe | CN | 3-Ethoxybutyl | H | H | H |
| 1a$^{227}$ | SO$_3$H | H | H | SO$_3$H | | | | | | | |
| 1a$^{228}$ | SO$_3$H | SO$_3$H | H | H | NHCOCH$_3$ | OMe | CN | 3-Ethoxybutyl | H | Phenyl | H |
| 1a$^{229}$ | SO$_3$H | H | H | SO$_3$H | | | | | | | |
| 1a$^{230}$ | SO$_3$H | SO$_3$H | H | H | NHCOCH$_3$ | OMe | CN | 4-(2-Hydroxy-ethanesulfonyl)-phenyl | H | H | H |
| 1a$^{231}$ | SO$_3$H | H | H | SO$_3$H | | | | | | | |
| 1a$^{232}$ | SO$_3$H | SO$_3$H | H | H | Methyl | Methyl | CONH$_2$ | Methyl | H | Methyl | H |
| 1a$^{233}$ | SO$_3$H | H | H | SO$_3$H | | | | | | | |
| 1a$^{234}$ | SO$_3$H | SO$_3$H | H | H | Methyl | Methyl | CONH$_2$ | Ethyl | H | Ethyl | H |
| 1a$^{235}$ | SO$_3$H | H | H | SO$_3$H | | | | | | | |
| 1a$^{236}$ | SO$_3$H | SO$_3$H | H | H | Methyl | Methyl | CONH$_2$ | Propyl | H | Propyl | H |
| 1a$^{237}$ | SO$_3$H | H | H | SO$_3$H | | | | | | | |
| 1a$^{238}$ | SO$_3$H | SO$_3$H | H | H | Methyl | Methyl | CONH$_2$ | Butyl | H | Butyl | H |
| 1a$^{239}$ | SO$_3$H | H | H | SO$_3$H | | | | | | | |
| 1a$^{240}$ | SO$_3$H | SO$_3$H | H | H | Methyl | Methyl | CONH$_2$ | Pentyl | H | Pentyl | H |
| 1a$^{241}$ | SO$_3$H | H | H | SO$_3$H | | | | | | | |
| 1a$^{242}$ | SO$_3$H | SO$_3$H | H | H | Methyl | Methyl | CONH$_2$ | Hexyl | H | Hexyl | H |
| 1a$^{243}$ | SO$_3$H | H | H | SO$_3$H | | | | | | | |
| 1a$^{244}$ | SO$_3$H | SO$_3$H | H | H | Methyl | Methyl | CONH$_2$ | Cyclobutyl | H | Cyclobutyl | H |
| 1a$^{245}$ | SO$_3$H | H | H | SO$_3$H | | | | | | | |
| 1a$^{246}$ | SO$_3$H | SO$_3$H | H | H | Methyl | Methyl | CONH$_2$ | Cyclopentyl | H | Cyclopentyl | H |
| 1a$^{247}$ | SO$_3$H | H | H | SO$_3$H | | | | | | | |
| 1a$^{248}$ | SO$_3$H | SO$_3$H | H | H | Methyl | Methyl | CONH$_2$ | Cyclohexyl | H | Cyclohexyl | H |
| 1a$^{249}$ | SO$_3$H | H | H | SO$_3$H | | | | | | | |
| 1a$^{250}$ | SO$_3$H | SO$_3$H | H | H | Methyl | Methyl | CONH$_2$ | 2-Methyl cyclohexyl | H | 2-Methyl cyclohexyl | H |
| 1a$^{251}$ | SO$_3$H | H | H | SO$_3$H | | | | | | | |
| 1a$^{252}$ | SO$_3$H | SO$_3$H | H | H | Methyl | Methyl | CONH$_2$ | 2-Methyl cyclohexyl | H | 3-Methyl cyclohexyl | H |
| 1a$^{253}$ | SO$_3$H | H | H | SO$_3$H | | | | | | | |
| 1a$^{254}$ | SO$_3$H | SO$_3$H | H | H | Methyl | Methyl | CONH$_2$ | Isopropyl | H | Isopropyl | H |
| 1a$^{255}$ | SO$_3$H | H | H | SO$_3$H | | | | | | | |
| 1a$^{256}$ | SO$_3$H | SO$_3$H | H | H | Methyl | Methyl | CONH$_2$ | Sec-butyl | H | Sec-butyl | H |
| 1a$^{257}$ | SO$_3$H | H | H | SO$_3$H | | | | | | | |
| 1a$^{258}$ | SO$_3$H | SO$_3$H | H | H | Methyl | Methyl | CONH$_2$ | 2-Methylbutyl | H | 2-Methylbutyl | H |
| 1a$^{259}$ | SO$_3$H | H | H | SO$_3$H | | | | | | | |
| 1a$^{260}$ | SO$_3$H | SO$_3$H | H | H | Methyl | Methyl | CONH$_2$ | 1-Ethylpropyl | H | 1-Ethylpropyl | H |
| 1a$^{261}$ | SO$_3$H | H | H | SO$_3$H | | | | | | | |
| 1a$^{262}$ | SO$_3$H | SO$_3$H | H | H | Methyl | Methyl | CONH$_2$ | 1,2-Dimethyl propyl | H | 1,2-Dimethyl propyl | H |

-continued

| Structure | R¹ᵃ | R²ᵃ | R³ᵃ | R⁴ᵃ | R⁵ᵃ/R⁷ᵃ | R⁶ᵃ/R⁸ᵃ | R⁹ᵃ/R¹⁶ᵃ | R¹¹ᵃ/R¹⁷ᵃ | R¹²ᵃ/R¹⁸ᵃ | R¹³ᵃ/R¹⁹ᵃ | R¹⁴ᵃ/R²⁰ᵃ |
|---|---|---|---|---|---|---|---|---|---|---|---|
| 1a²⁶³ | SO₃H | H | H | SO₃H | | | | | | | |
| 1a²⁶⁴ | SO₃H | SO₃H | H | H | Methyl | Methyl | CONH₂ | Tert-butyl | H | Tert-butyl | H |
| 1a²⁶⁵ | SO₃H | H | H | SO₃H | | | | | | | |
| 1a²⁶⁶ | SO₃H | SO₃H | H | H | Methyl | Methyl | CONH₂ | 3-Methyl butyl | H | 3-Methyl butyl | H |
| 1a²⁶⁷ | SO₃H | H | H | SO₃H | | | | | | | |
| 1a²⁶⁸ | SO₃H | SO₃H | H | H | Methyl | Methyl | CONH₂ | Pentan-2-yl | H | Pentan-2-yl | H |
| 1a²⁶⁹ | SO₃H | H | H | SO₃H | | | | | | | |
| 1a²⁷⁰ | SO₃H | SO₃H | H | H | Methyl | Methyl | CONH₂ | 2-Ethylhexyl | H | 2-Ethylhexyl | H |
| 1a²⁷¹ | SO₃H | H | H | SO₃H | | | | | | | |
| 1a²⁷² | SO₃H | SO₃H | H | H | Methyl | Methyl | CONH₂ | 2,2-Dimethyl propyl | H | 2,2-Dimethyl propyl | H |
| 1a²⁷³ | SO₃H | H | H | SO₃H | | | | | | | |
| 1a²⁷⁴ | SO₃H | SO₃H | H | H | Methyl | Methyl | CONH₂ | Phenyl | H | Phenyl | H |
| 1a²⁷⁵ | SO₃H | H | H | SO₃H | | | | | | | |
| 1a²⁷⁶ | SO₃H | SO₃H | H | H | Methyl | Methyl | CONH₂ | Benzyl | H | Benzyl | H |
| 1a²⁷⁷ | SO₃H | H | H | SO₃H | | | | | | | |
| 1a²⁷⁸ | SO₃H | SO₃H | H | H | Methyl | Methyl | CONH₂ | Allyl | H | Allyl | H |
| 1a²⁷⁹ | SO₃H | H | H | SO₃H | | | | | | | |
| 1a²⁸⁰ | SO₃H | SO₃H | H | H | Methyl | Methyl | CONH₂ | 2-Methoxy ethyl | H | Butyl | H |
| 1a²⁸¹ | SO₃H | H | H | SO₃H | | | | | | | |
| 1a²⁸² | SO₃H | SO₃H | H | H | Methyl | Methyl | CONH₂ | 3-Methoxy propyl | H | 3-Methoxy propyl | H |
| 1a²⁸³ | SO₃H | H | H | SO₃H | | | | | | | |
| 1a²⁸⁴ | SO₃H | SO₃H | H | H | Methyl | Methyl | CONH₂ | 3-Methoxy propyl | H | Butyl | H |
| 1a²⁸⁵ | SO₃H | H | H | SO₃H | | | | | | | |
| 1a²⁸⁶ | SO₃H | SO₃H | H | H | Methyl | Methyl | CONH₂ | 2-Methyl thiothyl | H | Sec-butyl | H |
| 1a²⁸⁷ | SO₃H | H | H | SO₃H | | | | | | | |
| 1a²⁸⁸ | SO₃H | SO₃H | H | H | Methyl | Methyl | CONH₂ | 2-Methyl thiothyl | H | 2-Hydroxyethyl | H |
| 1a²⁸⁹ | SO₃H | H | H | SO₃H | | | | | | | |
| 1a²⁹⁰ | SO₃H | SO₃H | H | H | Methyl | Methyl | CONH₂ | Butyl | Butyl | 2-Hydroxyethyl | H |
| 1a²⁹¹ | SO₃H | H | H | SO₃H | | | | | | | |
| 1a²⁹² | SO₃H | SO₃H | H | H | Methyl | Methyl | CONH₂ | Isopropyl | Isopropyl | 2-Hydroxyethyl | H |
| 1a²⁹³ | SO₃H | H | H | SO₃H | | | | | | | |
| 1a²⁹⁴ | SO₃H | SO₃H | H | H | Methyl | Methyl | CONH₂ | 2-Fluoroethyl | H | Butyl | H |
| 1a²⁹⁵ | SO₃H | H | H | SO₃H | | | | | | | |
| 1a²⁹⁶ | SO₃H | SO₃H | H | H | Methyl | Methyl | CONH₂ | 2-Chloroethyl | H | 2-Ethylhexyl | H |
| 1a²⁹⁷ | SO₃H | H | H | SO₃H | | | | | | | |
| 1a²⁹⁸ | SO₃H | SO₃H | H | H | Methyl | Methyl | CONH₂ | 3-Chloro propyl | H | 2-Ethylhexyl | H |
| 1a²⁹⁹ | SO₃H | H | H | SO₃H | | | | | | | |
| 1a³⁰⁰ | SO₃H | SO₃H | H | H | Methyl | Methyl | CONH₂ | Tetrahydro furfuryl | H | Butyl | H |
| 1a³⁰¹ | SO₃H | H | H | SO₃H | | | | | | | |
| 1a³⁰² | SO₃H | SO₃H | H | H | Methyl | Methyl | CONH₂ | 2-Furan-2-yl-ethyl | H | Butyl | H |
| 1a³⁰³ | SO₃H | H | H | SO₃H | | | | | | | |
| 1a³⁰⁴ | SO₃H | SO₃H | H | H | Methyl | Methyl | CONH₂ | 2-(2-Hydroxy-ethyl sulfanyl)-ethyl | H | Butyl | H |
| 1a³⁰⁵ | SO₃H | H | H | SO₃H | | | | | | | |
| 1a³⁰⁶ | SO₃H | SO₃H | H | H | Methyl | Methyl | CONH₂ | 2-(2-tert-Butyl sulfanyl-ethane sylfonyl)-ethyl | H | Butyl | H |
| 1a³⁰⁷ | SO₃H | H | H | SO₃H | | | | | | | |
| 1a³⁰⁸ | SO₃H | SO₃H | H | H | Methyl | Methyl | CONH₂ | 2-Hydroxyethoxy propyl | H | Butyl | H |
| 1a³⁰⁹ | SO₃H | H | H | SO₃H | | | | | | | |
| 1a³¹⁰ | SO₃H | SO₃H | H | H | Methyl | Methyl | CONH₂ | 2-Hydroxy ethoxyethyl | H | Butyl | H |
| 1a³¹¹ | SO₃H | H | H | SO₃H | | | | | | | |
| 1a³¹² | SO₃H | SO₃H | H | H | Methyl | Methyl | CONH₂ | H | H | 2-(2-Hydroxy ethoxy)propyl | H |
| 1a³¹³ | SO₃H | H | H | SO₃H | | | | | | | |
| 1a³¹⁴ | SO₃H | SO₃H | H | H | Methyl | Methyl | CONH₂ | H | H | 2-(2-Hydroxy ethoxy)ethyl | H |
| 1a³¹⁵ | SO₃H | H | H | SO₃H | | | | | | | |
| 1a³¹⁶ | SO₃H | SO₃H | H | H | Methyl | Methyl | CONH₂ | H | H | 3-(4-Hydroxy butoxy)propyl | H |
| 1a³¹⁷ | SO₃H | H | H | SO₃H | | | | | | | |
| 1a³¹⁸ | SO₃H | SO₃H | H | H | Methyl | Methyl | CONH₂ | 2-(2-Hydroxy ethoxy)ethyl | H | H | H |
| 1a³¹⁹ | SO₃H | H | H | SO₃H | | | | | | | |
| 1a³²⁰ | SO₃H | SO₃H | H | H | Methyl | Methyl | CONH₂ | 3-(4-Hydroxy butoxy)propyl | H | H | H |
| 1a³²¹ | SO₃H | H | H | SO₃H | | | | | | | |
| 1a³²² | SO₃H | SO₃H | H | H | Methyl | Methyl | CONH₂ | Phenyl | H | 2-(2-Hydroxy ethoxy)ethyl | H |
| 1a³²³ | SO₃H | H | H | SO₃H | | | | | | | |
| 1a³²⁴ | SO₃H | SO₃H | H | H | Methyl | Methyl | CONH₂ | 3-(2-Phenoxy-ethoxy)-propyl | H | H | H |
| 1a³²⁵ | SO₃H | H | H | SO₃H | | | | | | | |
| 1a³²⁶ | SO₃H | SO₃H | H | H | Methyl | Methyl | CONH₂ | 3-Isopropoxy-propyl | H | 3-Isopropoxy-propyl | H |
| 1a³²⁷ | SO₃H | H | H | SO₃H | | | | | | | |
| 1a³²⁸ | SO₃H | SO₃H | H | H | Methyl | Methyl | CONH₂ | 3-Isopropoxy-propyl | H | H | H |
| 1a³²⁹ | SO₃H | H | H | SO₃H | | | | | | | |
| 1a³³⁰ | SO₃H | SO₃H | H | H | Methyl | Methyl | CONH₂ | 3-Isopropoxy-propyl | H | Phenyl | H |
| 1a³³¹ | SO₃H | H | H | SO₃H | | | | | | | |
| 1a³³² | SO₃H | SO₃H | H | H | Methyl | Methyl | CONH₂ | 3-Ethoxy-propyl | H | 3-Ethoxy-propyl | H |
| 1a³³³ | SO₃H | H | H | SO₃H | | | | | | | |
| 1a³³⁴ | SO₃H | SO₃H | H | H | Methyl | Methyl | CONH₂ | 3-Ethoxy-propyl | H | H | H |
| 1a³³⁵ | SO₃H | H | H | SO₃H | | | | | | | |

-continued

| Structure | $R^{1a}$ | $R^{2a}$ | $R^{3a}$ | $R^{4a}$ | $R^{5a}/R^{7a}$ | $R^{6a}/R^{8a}$ | $R^{9a}/R^{16a}$ | $R^{11a}/R^{17a}$ | $R^{12a}/R^{18a}$ | $R^{13a}/R^{19a}$ | $R^{14a}/R^{20a}$ |
|---|---|---|---|---|---|---|---|---|---|---|---|
| 1a³³⁶ | SO₃H | SO₃H | H | H | Methyl | Methyl | CONH₂ | 3-Ethoxy-propyl | H | Phenyl | H |
| 1a³³⁷ | SO₃H | H | H | SO₃H | | | | | | | |
| 1a³³⁸ | SO₃H | SO₃H | H | H | Methyl | Methyl | CONH₂ | 3-Ethoxybutyl | H | 3-Ethoxybutyl | H |
| 1a³³⁹ | SO₃H | H | H | SO₃H | | | | | | | |
| 1a³⁴⁰ | SO₃H | SO₃H | H | H | Methyl | Methyl | CONH₂ | 3-Ethoxybutyl | H | H | H |
| 1a³⁴¹ | SO₃H | H | H | SO₃H | | | | | | | |
| 1a³⁴² | SO₃H | SO₃H | H | H | Methyl | Methyl | CONH₂ | 3-Ethoxybutyl | H | Phenyl | H |
| 1a³⁴³ | SO₃H | H | H | SO₃H | | | | | | | |
| 1a³⁴⁴ | SO₃H | SO₃H | H | H | Methyl | Methyl | CONH₂ | 4-(2-Hydroxy-ethanesulfonyl)-phenyl | H | H | H |
| 1a³⁴⁵ | SO₃H | H | H | SO₃H | | | | | | | |
| 1a³⁴⁶ | SO₃H | SO₃H | H | H | Methyl | F | CONH₂ | 2-Methoxy ethyl | H | Butyl | H |
| 1a³⁴⁷ | SO₃H | H | H | SO₃H | | | | | | | |
| 1a³⁴⁸ | SO₃H | SO₃H | H | H | Methyl | F | CONH₂ | 2-Methoxy propyl | H | Butyl | H |
| 1a³⁴⁹ | SO₃H | H | H | SO₃H | | | | | | | |
| 1a³⁵⁰ | SO₃H | SO₃H | H | H | Methyl | F | CONH₂ | Butyl | Butyl | 2-Hydroxyethyl | H |
| 1a³⁵¹ | SO₃H | H | H | SO₃H | | | | | | | |
| 1a³⁵² | SO₃H | SO₃H | H | H | Methyl | F | CONH₂ | Isopropyl | Iso-propyl | 2-Hydrox-yethyl | H |
| 1a³⁵³ | SO₃H | H | H | SO₃H | | | | | | | |
| 1a³⁵⁴ | SO₃H | SO₃H | H | H | Methyl | F | CONH₂ | 2-Fluoro ethyl | H | Butyl | H |
| 1a³⁵⁵ | SO₃H | H | H | SO₃H | | | | | | | |
| 1a³⁵⁶ | SO₃H | SO₃H | H | H | Methyl | F | CONH₂ | 2-Chloro ethyl | H | 2-Ethylhexyl | H |
| 1a³⁵⁷ | SO₃H | H | H | SO₃H | | | | | | | |
| 1a³⁵⁸ | SO₃H | SO₃H | H | H | Methyl | F | CONH₂ | 3-Chloro propyl | H | 2-Ethylhexyl | H |
| 1a³⁵⁹ | SO₃H | H | H | SO₃H | | | | | | | |
| 1a³⁶⁰ | SO₃H | SO₃H | H | H | Methyl | F | CONH₂ | 2-(2-Hydroxy-ethyl sulfanyl)-ethyl | H | Butyl | H |
| 1a³⁶¹ | SO₃H | H | H | SO₃H | | | | | | | |
| 1a³⁶² | SO₃H | SO₃H | H | H | Methyl | F | CONH₂ | 2-(2-tert-Butyl sulfanyl-ethane sulfonyl)-ethyl | H | Butyl | H |
| 1a³⁶³ | SO₃H | H | H | SO₃H | | | | | | | |
| 1a³⁶⁴ | SO₃H | SO₃H | H | H | Methyl | F | CONH₂ | 2-Hydroxy ethoxy propyl | H | Butyl | H |
| 1a³⁶⁵ | SO₃H | H | H | SO₃H | | | | | | | |
| 1a³⁶⁶ | SO₃H | SO₃H | H | H | Methyl | F | CONH₂ | 2-Hydroxy ethoxyethyl | H | Butyl | H |
| 1a³⁶⁷ | SO₃H | H | H | SO₃H | | | | | | | |
| 1a³⁶⁸ | SO₃H | SO₃H | H | H | Methyl | F | CONH₂ | 2-(Ethyl sulfonyl) ethanol | H | Butyl | H |
| 1a³⁶⁹ | SO₃H | H | H | SO₃H | | | | | | | |
| 1a³⁷⁰ | SO₃H | SO₃H | H | H | Methyl | F | CONH₂ | H | H | 2-(2-Hydroxy ethoxy) propyl | H |
| 1a³⁷¹ | SO₃H | H | H | SO₃H | | | | | | | |
| 1a³⁷² | SO₃H | SO₃H | H | H | Methyl | F | CONH₂ | H | H | 2-(2-Hydroxy ethoxy)ethyl | H |
| 1a³⁷³ | SO₃H | H | H | SO₃H | | | | | | | |
| 1a³⁷⁴ | SO₃H | SO₃H | H | H | Methyl | F | CONH₂ | H | H | 3-(4-Hydroxy butoxy)propyl | H |
| 1a³⁷⁵ | SO₃H | H | H | SO₃H | | | | | | | |
| 1a³⁷⁶ | SO₃H | SO₃H | H | H | Methyl | F | CONH₂ | 2-(2-Hydroxy ethoxy)ethyl | H | H | H |
| 1a³⁷⁷ | SO₃H | H | H | SO₃H | | | | | | | |
| 1a³⁷⁸ | SO₃H | SO₃H | H | H | Methyl | F | CONH₂ | 3-(4-Hydroxy butoxy)propyl | H | H | H |
| 1a³⁷⁹ | SO₃H | H | H | SO₃H | | | | | | | |
| 1a³⁸⁰ | SO₃H | SO₃H | H | H | Methyl | F | CONH₂ | Phenyl | H | (2-Hydroxy ethoxy)ethyl | H |
| 1a³⁸¹ | SO₃H | H | H | SO₃H | | | | | | | |
| 1a³⁸² | SO₃H | SO₃H | H | H | Methyl | F | CONH₂ | 3-(2-Phenoxy-ethoxy)-propyl | H | H | H |
| 1a³⁸³ | SO₃H | H | H | SO₃H | | | | | | | |
| 1a³⁸⁴ | SO₃H | SO₃H | H | H | Methyl | F | CONH₂ | 3-Isopropoxy-propyl | H | 3-Isopropoxy-propyl | H |
| 1a³⁸⁵ | SO₃H | H | H | SO₃H | | | | | | | |
| 1a³⁸⁶ | SO₃H | SO₃H | H | H | Methyl | F | CONH₂ | 3-Isopropoxy-propyl | H | H | H |
| 1a³⁸⁷ | SO₃H | H | H | SO₃H | | | | | | | |
| 1a³⁸⁸ | SO₃H | SO₃H | H | H | Methyl | F | CONH₂ | 3-Isopropoxy-propyl | H | Phenyl | H |
| 1a³⁸⁹ | SO₃H | H | H | SO₃H | | | | | | | |
| 1a³⁹⁰ | SO₃H | SO₃H | H | H | Methyl | F | CONH₂ | 3-Ethoxy-propyl | H | 3-Ethoxy-propyl | H |
| 1a³⁹¹ | SO₃H | H | H | SO₃H | | | | | | | |
| 1a³⁹² | SO₃H | SO₃H | H | H | Methyl | F | CONH₂ | 3-Ethoxy-propyl | H | H | H |
| 1a³⁹³ | SO₃H | H | H | SO₃H | | | | | | | |
| 1a³⁹⁴ | SO₃H | SO₃H | H | H | Methyl | F | CONH₂ | 3-Ethoxy-propyl | H | Phenyl | H |
| 1a³⁹⁵ | SO₃H | H | H | SO₃H | | | | | | | |
| 1a³⁹⁶ | SO₃H | SO₃H | H | H | Methyl | F | CONH₂ | 3-Ethoxybutyl | H | 3-Ethoxybutyl | H |
| 1a³⁹⁷ | SO₃H | H | H | SO₃H | | | | | | | |
| 1a³⁹⁸ | SO₃H | SO₃H | H | H | Methyl | F | CONH₂ | 3-Ethoxybutyl | H | H | H |
| 1a³⁹⁹ | SO₃H | H | H | SO₃H | | | | | | | |
| 1a⁴⁰⁰ | SO₃H | SO₃H | H | H | Methyl | F | CONH₂ | 3-Ethoxybutyl | H | Phenyl | H |
| 1a⁴⁰¹ | SO₃H | H | H | SO₃H | | | | | | | |
| 1a⁴⁰² | SO₃H | SO₃H | H | H | Methyl | F | CONH₂ | 4-(2-Hydroxy-ethanesulfonyl)-phenyl | H | H | H |
| 1a⁴⁰³ | SO₃H | H | H | SO₃H | | | | | | | |

-continued

| Structure | $R^{1a}$ | $R^{2a}$ | $R^{3a}$ | $R^{4a}$ | $R^{5a}/R^{7a}$ | $R^{6a}/R^{8a}$ | $R^{9a}/R^{16a}$ | $R^{11a}/R^{17a}$ | $R^{12a}/R^{18a}$ | $R^{13a}/R^{19a}$ | $R^{14a}/R^{20a}$ |
|---|---|---|---|---|---|---|---|---|---|---|---|
| $1a^{404}$ | SO$_3$H | SO$_3$H | H | H | NHCOCH$_3$ | OMe | CONH$_2$ | 2-Methoxy ethyl | H | Butyl | H |
| $1a^{405}$ | SO$_3$H | H | H | SO$_3$H | | | | | | | |
| $1a^{406}$ | SO$_3$H | SO$_3$H | H | H | NHCOCH$_3$ | OMe | CONH$_2$ | 3-Methoxy propyl | H | Butyl | H |
| $1a^{407}$ | SO$_3$H | H | H | SO$_3$H | | | | | | | |
| $1a^{408}$ | SO$_3$H | H | H | SO$_3$H | | | | | | | |
| $1a^{409}$ | SO$_3$H | SO$_3$H | H | H | NHCOCH$_3$ | OMe | CONH$_2$ | Butyl | Butyl | 2-Hydroxyethyl | H |
| $1a^{410}$ | SO$_3$H | H | H | SO$_3$H | | | | | | | |
| $1a^{411}$ | SO$_3$H | SO$_3$H | H | H | NHCOCH$_3$ | OMe | CONH$_2$ | Isopropyl | Iso-propyl | 2-Hydroxyethyl | H |
| $1a^{412}$ | SO$_3$H | H | H | SO$_3$H | | | | | | | |
| $1a^{413}$ | SO$_3$H | SO$_3$H | H | H | NHCOCH$_3$ | OMe | CONH$_2$ | 2-Fluoroethyl | H | Butyl | H |
| $1a^{414}$ | SO$_3$H | H | H | SO$_3$H | | | | | | | |
| $1a^{415}$ | SO$_3$H | SO$_3$H | H | H | NHCOCH$_3$ | OMe | CONH$_2$ | 2-Chloroethyl | H | 2-Ethylhexyl | H |
| $1a^{416}$ | SO$_3$H | H | H | SO$_3$H | | | | | | | |
| $1a^{417}$ | SO$_3$H | SO$_3$H | H | H | NHCOCH$_3$ | OMe | CONH$_2$ | 3-Chloropropyl | H | 2-Ethylhexyl | H |
| $1a^{418}$ | SO$_3$H | H | H | SO$_3$H | | | | | | | |
| $1a^{419}$ | SO$_3$H | SO$_3$H | H | H | NHCOCH$_3$ | OMe | CONH$_2$ | 2-(2-Hydroxy-ethyl sulfanyl)-ethyl] | H | Butyl | H |
| $1a^{420}$ | SO$_3$H | H | H | SO$_3$H | | | | | | | |
| $1a^{421}$ | SO$_3$H | SO$_3$H | H | H | NHCOCH$_3$ | OMe | CONH$_2$ | 2-(2-tert-Butyl sulfanyl-ethane sulfonyl)-ethyl | H | Butyl | H |
| $1a^{422}$ | SO$_3$H | H | H | SO$_3$H | | | | | | | |
| $1a^{423}$ | SO$_3$H | SO$_3$H | H | H | NHCOCH$_3$ | OMe | CONH$_2$ | 2-Hydroxyethoxy propyl | H | Butyl | H |
| $1a^{424}$ | SO$_3$H | H | H | SO$_3$H | | | | | | | |
| $1a^{425}$ | SO$_3$H | SO$_3$H | H | H | NHCOCH$_3$ | OMe | CONH$_2$ | 2-Hydroxy ethoxyethyl | H | Butyl | H |
| $1a^{426}$ | SO$_3$H | H | H | SO$_3$H | | | | | | | |
| $1a^{427}$ | SO$_3$H | SO$_3$H | H | H | NHCOCH$_3$ | OMe | CONH$_2$ | H | H | 2-(2-Hydroxy ethoxy) propyl | H |
| $1a^{428}$ | SO$_3$H | H | H | SO$_3$H | | | | | | | |
| $1a^{429}$ | SO$_3$H | SO$_3$H | H | H | NHCOCH$_3$ | OMe | CONH$_2$ | H | H | 2-(2-Hydroxy ethoxy)ethyl | H |
| $1a^{430}$ | SO$_3$H | H | H | SO$_3$H | | | | | | | |
| $1a^{431}$ | SO$_3$H | SO$_3$H | H | H | NHCOCH$_3$ | OMe | CONH$_2$ | H | H | 3-(4-Hydroxy butoxy)propyl | H |
| $1a^{432}$ | SO$_3$H | H | H | SO$_3$H | | | | | | | |
| $1a^{433}$ | SO$_3$H | SO$_3$H | H | H | NHCOCH$_3$ | OMe | CONH$_2$ | 2-(2-Hydroxy ethoxy)ethyl | H | H | H |
| $1a^{434}$ | SO$_3$H | H | H | SO$_3$H | | | | | | | |
| $1a^{435}$ | SO$_3$H | SO$_3$H | H | H | NHCOCH$_3$ | OMe | CONH$_2$ | 3-(4-Hydroxy butoxy)-propyl | H | H | H |
| $1a^{436}$ | SO$_3$H | H | H | SO$_3$H | | | | | | | |
| $1a^{437}$ | SO$_3$H | SO$_3$H | H | H | NHCOCH$_3$ | OMe | CONH$_2$ | H | H | 2-(2-Hydroxy-ethoxy)ethyl | H |
| $1a^{438}$ | SO$_3$H | H | H | SO$_3$H | | | | | | | |
| $1a^{439}$ | SO$_3$H | SO$_3$H | H | H | NHCOCH$_3$ | OMe | CONH$_2$ | Phenyl | H | 2-(2-Hydroxy-ethoxy)ethyl | H |
| $1a^{440}$ | SO$_3$H | H | H | SO$_3$H | | | | | | | |
| $1a^{441}$ | SO$_3$H | SO$_3$H | H | H | NHCOCH$_3$ | OMe | CONH$_2$ | 3-(2-Phenoxy-ethoxy)-propyl | H | H | H |
| $1a^{442}$ | SO$_3$H | H | H | SO$_3$H | | | | | | | |
| $1a^{443}$ | SO$_3$H | SO$_3$H | H | H | NHCOCH$_3$ | OMe | CONH$_2$ | 3-Isopropoxy-propyl | H | 3-Isopropoxy-propyl | H |
| $1a^{444}$ | SO$_3$H | H | H | SO$_3$H | | | | | | | |
| $1a^{445}$ | SO$_3$H | SO$_3$H | H | H | NHCOCH$_3$ | OMe | CONH$_2$ | 3-Isopropoxy-propyl | H | H | H |
| $1a^{446}$ | SO$_3$H | H | H | SO$_3$H | | | | | | | |
| $1a^{447}$ | SO$_3$H | SO$_3$H | H | H | NHCOCH$_3$ | OMe | CONH$_2$ | 3-Isopropoxy-propyl | H | Phenyl | H |
| $1a^{448}$ | SO$_3$H | H | H | SO$_3$H | | | | | | | |
| $1a^{449}$ | SO$_3$H | SO$_3$H | H | H | NHCOCH$_3$ | OMe | CONH$_2$ | 3-Ethoxy-propyl | H | 3-Ethoxy-propyl | H |
| $1a^{450}$ | SO$_3$H | H | H | SO$_3$H | | | | | | | |
| $1a^{451}$ | SO$_3$H | SO$_3$H | H | H | NHCOCH$_3$ | OMe | CONH$_2$ | 3-Ethoxy-propyl | H | H | H |
| $1a^{452}$ | SO$_3$H | H | H | SO$_3$H | | | | | | | |
| $1a^{453}$ | SO$_3$H | SO$_3$H | H | H | NHCOCH$_3$ | OMe | CONH$_2$ | 3-Ethoxy-propyl | H | Phenyl | H |
| $1a^{454}$ | SO$_3$H | H | H | SO$_3$H | | | | | | | |
| $1a^{455}$ | SO$_3$H | SO$_3$H | H | H | NHCOCH$_3$ | OMe | CONH$_2$ | 3-Ethoxybutyl | H | 3-Ethoxybutyl | H |
| $1a^{456}$ | SO$_3$H | H | H | SO$_3$H | | | | | | | |
| $1a^{457}$ | SO$_3$H | SO$_3$H | H | H | NHCOCH$_3$ | OMe | CONH$_2$ | 3-Ethoxybutyl | H | H | H |
| $1a^{458}$ | SO$_3$H | H | H | SO$_3$H | | | | | | | |
| $1a^{459}$ | SO$_3$H | SO$_3$H | H | H | NHCOCH$_3$ | OMe | CONH$_2$ | 3-Ethoxybutyl | H | Phenyl | H |
| $1a^{460}$ | SO$_3$H | H | H | SO$_3$H | | | | | | | |
| $1a^{461}$ | SO$_3$H | SO$_3$H | H | H | NHCOCH$_3$ | OMe | CONH$_2$ | 4-(2-hydroxy-ethanesulfonyl)-phenyl | H | H | H |
| $1a^{462}$ | SO$_3$H | H | H | SO$_3$H | | | | | | | |

Further particularly preferred embodiments of the present invention are dyes of formula (1b) and mixtures thereof

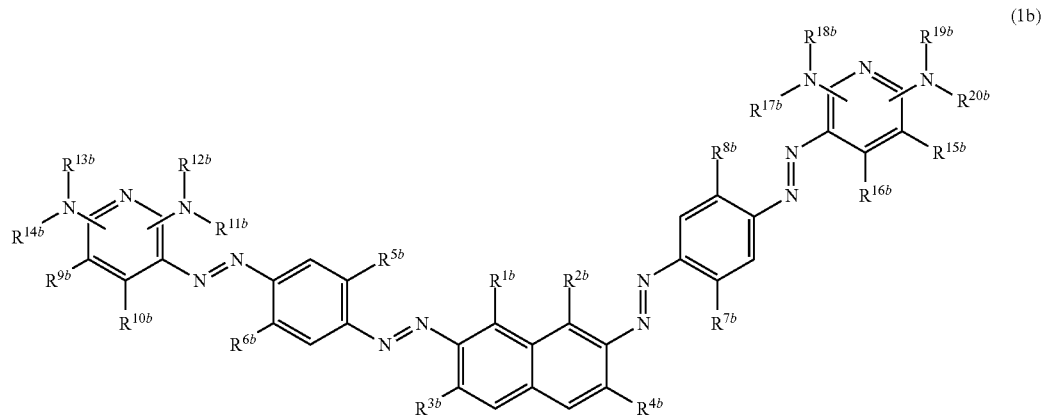

wherein
$R^{1b}$, $R^{2b}$, $R^{3b}$ and $R^{4b}$ independent of each other is hydrogen, alkyl, alkoxy, halogen, trifluoromethyl or $SO_3M$, whereby at least two of them are $SO_3M$, $R^{5b}$, $R^{6b}$, $R^{7b}$ and $R^{8b}$ independent of each other is hydrogen, $(C_1-C_4)$-alkyl, $(C_1-C_4)$-alkoxy, halogen, trifluoromethyl, —$SO_3M$ or $(C_1-C_4)$-acylamino, $R^{9b}$ and $R^{15b}$ independent of each other is cyano, carbamoyl, substituted carbamoyl, sulfonylalkyl or alkoxycarbonyl, $R^{10b}$ and $R^{16b}$ independent of each other is unsubstituted, linear or branched $(C_1-C_4)$-alkyl, unsubstiuted $(C_5-C_7)$-cycloalkyl or substituted $(C_5-C_7)$-cycloalkyl with one or more substituents such as methyl, ethyl, isobutyl, sec-butyl, tert-butyl or methylbutyl, $R^{11b}$, $R^{12b}$ $R^{13b}$, $R^{14b}$, $R^{17b}$, $R^{18b}$, $R^{19b}$ and $R^{20b}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxyalkyl, alkoxyalkylaminoalkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, heterocycloalkylalkyl or
alkyl interrupted by one or more heteroatoms selected from the group consisting of oxygen and sulfur or
alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ or
alkyl interrupted by one or more heteroatoms selected from the group consisting of oxygen and sulfur and substituted by one or more substituents selected from the group consisting of hydroxy, aryl, cycloalkyl, alkoxy, amino, N-monoalkyi-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyi-monocycloalkyl-amino, N,N-monoaryl-monocycloalkyl-amino, N-acylamino, N-alkylsuifonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ and
M is hydrogen, an alkali metal, ammonium, one equivalent of an alkali earth metal or a monovalent organic cation.

In particularly preferred dyes of formula (1b):

$R^{3b}$ and $R^{4b}$ is $SO_3M$, $R^{1b}$ and $R^{2b}$ is hydrogen, $R^{5b}$, $R^{6b}$, $R^{7b}$ and $R^{8b}$ independent of each other is hydrogen, methyl, halogen, —$SO_3M$ or acetylamino, $R^{9b}$ and $R^{15b}$ independent of each other is cyano or carbamoyl, $R^{1b}$ and $R^{16b}$ is methyl, $R^{11b}$, $R^{12b}$ $R^{13b}$, $R^{14b}$, $R^{17b}$, $R^{18b}$, $R^{19b}$ and $R^{20b}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, 2-methoxyethyl, 3-methoxypropyl, 2-fluoroethyl, 2-chloroethyl, 3-chloropropyl, 4-(2-hydroxy-ethanesulfonyl)-phenyl, 2-(2-tertbutylsulfanylethanesulfonyl)-ethyl, 2-(2-hydroxyethoxypropyl), 2-(2-hydroxy-ethoxy)ethyl, 3-(4-hydroxyethoxy)propyl, 3-(2-phenoxy-ethoxy)-propyl, 3-isopropoxy-propyl, 3-ethoxy-propyl or 3-ethoxybutyl and
M is hydrogen, sodium, potassium, lithium or ammonium.

Examples of such particularly preferred dyes of formula (1b) are the compounds of formulae (1b$^1$ to 1b$^{364}$) and mixtures thereof:

| Structure | $R^{5b}/R^{7b}$ | $R^{6b}/R^{8b}$ | $R^{9b}/R^{16b}$ | $R^{11b}/R^{17b}$ | $R^{12b}/R^{18b}$ | $R^{13b}/R^{19b}$ | $R^{14b}/R^{20b}$ |
|---|---|---|---|---|---|---|---|
| $1b^1$ | Methyl | Methyl | CN | Methyl | H | Methyl | H |
| $1b^2$ | Methyl | Methyl | CN | Ethyl | H | Ethyl | H |
| $1b^3$ | Methyl | Methyl | CN | Propyl | H | Propyl | H |
| $1b^4$ | Methyl | Methyl | CN | Butyl | H | Butyl | H |
| $1b^5$ | Methyl | Methyl | CN | Pentyl | H | Pentyl | H |
| $1b^6$ | Methyl | Methyl | CN | Hexyl | H | Hexyl | H |
| $1b^7$ | Methyl | Methyl | CN | Cyclobutyl | H | Cyclobutyl | H |
| $1b^8$ | Methyl | Methyl | CN | Cyclopentyl | H | Cyclopentyl | H |
| $1b^9$ | Methyl | Methyl | CN | Cyclohexyl | H | Cyclohexyl | H |
| $1b^{10}$ | Methyl | Methyl | CN | 2-Methylcyclohexyl | H | 2-Methylcyclohexyl | H |
| $1b^{11}$ | Methyl | Methyl | CN | 3-Methylcyclohexyl | H | 3-Methylcyclohexyl | H |
| $1b^{12}$ | Methyl | Methyl | CN | Isopropyl | H | Isopropyl | H |
| $1b^{13}$ | Methyl | Methyl | CN | Sec-butyl | H | Sec-butyl | H |
| $1b^{14}$ | Methyl | Methyl | CN | 2-Methylbutyl | H | 2-Methylbutyl | H |
| $1b^{15}$ | Methyl | Methyl | CN | 1-Ethylpropyl | H | 1-Ethylpropyl | H |
| $1b^{16}$ | Methyl | Methyl | CN | 1,2-Dimethylpropyl | H | 1,2-Dimethylpropyl | H |
| $1b^{17}$ | Methyl | Methyl | CN | Tert-butyl | H | Tert-butyl | H |
| $1b^{18}$ | Methyl | Methyl | CN | 3-Methylbutyl | H | 3-Methylbutyl | H |
| $1b^{19}$ | Methyl | Methyl | CN | Pentan-2-yl | H | Pentan-2-yl | H |
| $1b^{20}$ | Methyl | Methyl | CN | 2-Ethylhexyl | H | 2-Ethylhexyl | H |
| $1b^{21}$ | Methyl | Methyl | CN | 2,2-Dimethylpropyl | H | 2,2-Dimethylpropyl | H |
| $1b^{22}$ | Methyl | Methyl | CN | Phenyl | H | Phenyl | H |
| $1b^{23}$ | Methyl | Methyl | CN | Benzyl | H | Benzyl | H |
| $1b^{24}$ | Methyl | Methyl | $CONH_2$ | Methyl | H | Methyl | H |
| $1b^{25}$ | Methyl | Methyl | $CONH_2$ | Ethyl | H | Ethyl | H |
| $1b^{26}$ | Methyl | Methyl | $CONH_2$ | Propyl | H | Propyl | H |
| $1b^{27}$ | Methyl | Methyl | $CONH_2$ | Butyl | H | Butyl | H |
| $1b^{28}$ | Methyl | Methyl | $CONH_2$ | Pentyl | H | Pentyl | H |
| $1b^{29}$ | Methyl | Methyl | $CONH_2$ | Hexyl | H | Hexyl | H |
| $1b^{30}$ | Methyl | Methyl | $CONH_2$ | Cyclobutyl | H | Cyclobutyl | H |
| $1b^{31}$ | Methyl | Methyl | $CONH_2$ | Cyclopentyl | H | Cyclopentyl | H |
| $1b^{32}$ | Methyl | Methyl | $CONH_2$ | Cyclohexyl | H | Cyclohexyl | H |
| $1b^{33}$ | Methyl | Methyl | $CONH_2$ | 2-Methylcyclohexyl | H | 2-Methylcyclohexyl | H |
| $1b^{34}$ | Methyl | Methyl | $CONH_2$ | 3-Methylcyclohexyl | H | 3-Methylcyclohexyl | H |
| $1b^{35}$ | Methyl | Methyl | $CONH_2$ | Isopropyl | H | Isopropyl | H |
| $1b^{36}$ | Methyl | Methyl | $CONH_2$ | Sec-butyl | H | Sec-butyl | H |
| $1b^{37}$ | Methyl | Methyl | $CONH_2$ | 2-Methylbutyl | H | 2-Methylbutyl | H |
| $1b^{38}$ | Methyl | Methyl | $CONH_2$ | 1-Ethylpropyl | H | 1-Ethylpropyl | H |
| $1b^{39}$ | Methyl | Methyl | $CONH_2$ | 1,2-Dimethylpropyl | H | 1,2-Dimethylpropyl | H |
| $1b^{40}$ | Methyl | Methyl | $CONH_2$ | Tert-butyl | H | Tert-butyl | H |
| $1b^{41}$ | Methyl | Methyl | $CONH_2$ | 3-Methyl butyl | H | 3-Methyl butyl | H |
| $1b^{42}$ | Methyl | Methyl | $CONH_2$ | Pentan-2-yl | H | Pentan-2-yl | H |
| $1b^{43}$ | Methyl | Methyl | $CONH_2$ | 2-Ethylhexyl | H | 2-Ethylhexyl | H |
| $1b^{44}$ | Methyl | Methyl | $CONH_2$ | 2,2-Dimethyl propyl | H | 2,2-Dimethyl propyl | H |
| $1b^{45}$ | Methyl | Methyl | $CONH_2$ | Phenyl | H | Phenyl | H |
| $1b^{46}$ | Methyl | Methyl | $CONH_2$ | Benzyl | H | Benzyl | H |
| $1b^{47}$ | Methyl | F | CN | Methyl | H | Methyl | H |
| $1b^{48}$ | Methyl | F | CN | Ethyl | H | Ethyl | H |
| $1b^{49}$ | Methyl | F | CN | Propyl | H | Propyl | H |
| $1b^{50}$ | Methyl | F | CN | Butyl | H | Butyl | H |
| $1b^{51}$ | Methyl | F | CN | Pentyl | H | Pentyl | H |
| $1b^{52}$ | Methyl | F | CN | Hexyl | H | Hexyl | H |
| $1b^{53}$ | Methyl | F | CN | Cyclobutyl | H | Cyclobutyl | H |
| $1b^{54}$ | Methyl | F | CN | Cyclopentyl | H | Cyclopentyl | H |
| $1b^{55}$ | Methyl | F | CN | Cyclohexyl | H | Cyclohexyl | H |
| $1b^{56}$ | Methyl | F | CN | 2-Methyl cyclohexyl | H | 2-Methyl cyclohexyl | H |
| $1b^{57}$ | Methyl | F | CN | 3-Methyl cyclohexyl | H | 3-Methyl cyclohexyl | H |
| $1b^{58}$ | Methyl | F | CN | Isopropyl | H | Isopropyl | H |
| $1b^{59}$ | Methyl | F | CN | Sec-butyl | H | Sec-butyl | H |
| $1b^{60}$ | Methyl | F | CN | 2-Methyl butyl | H | 2-Methyl butyl | H |
| $1b^{61}$ | Methyl | F | CN | 1-Ethyl propyl | H | 1-Ethyl propyl | H |
| $1b^{62}$ | Methyl | F | CN | 1,2-Dimethyl propyl | H | 1,2-Dimethyl propyl | H |
| $1b^{63}$ | Methyl | F | CN | Tert-butyl | H | Tert-butyl | H |
| $1b^{64}$ | Methyl | F | CN | 3-Methyl butyl | H | 3-Methyl butyl | H |
| $1b^{65}$ | Methyl | F | CN | Pentan-2-yl | H | Pentan-2-yl | H |
| $1b^{66}$ | Methyl | F | CN | 2-Ethylhexyl | H | 2-Ethylhexyl | H |
| $1b^{67}$ | Methyl | F | CN | 2,2-Dimethyl propyl | H | 2,2-Dimethyl propyl | H |
| $1b^{68}$ | Methyl | F | CN | Phenyl | H | Phenyl | H |
| $1b^{69}$ | Methyl | F | CN | Benzyl | H | Benzyl | H |
| $1b^{70}$ | Methyl | F | $CONH_2$ | Methyl | H | Methyl | H |
| $1b^{71}$ | Methyl | F | $CONH_2$ | Ethyl | H | Ethyl | H |
| $1b^{72}$ | Methyl | F | $CONH_2$ | Propyl | H | Propyl | H |
| $1b^{73}$ | Methyl | F | $CONH_2$ | Butyl | H | Butyl | H |
| $1b^{74}$ | Methyl | F | $CONH_2$ | Pentyl | H | Pentyl | H |
| $1b^{75}$ | Methyl | F | $CONH_2$ | Hexyl | H | Hexyl | H |
| $1b^{76}$ | Methyl | F | $CONH_2$ | Cyclobutyl | H | Cyclobutyl | H |
| $1b^{77}$ | Methyl | F | $CONH_2$ | Cyclopentyl | H | Cyclopentyl | H |
| $1b^{78}$ | Methyl | F | $CONH_2$ | Cyclohexyl | H | Cyclohexyl | H |

-continued

| Structure | $R^{5b}/R^{7b}$ | $R^{6b}/R^{8b}$ | $R^{9b}/R^{16b}$ | $R^{11b}/R^{17b}$ | $R^{12b}/R^{18b}$ | $R^{13b}/R^{19b}$ | $R^{14b}/R^{20b}$ |
|---|---|---|---|---|---|---|---|
| $1b^{79}$ | Methyl | F | $CONH_2$ | 2-Methyl cyclohexyl | H | 2-Methyl cyclohexyl | H |
| $1b^{80}$ | Methyl | F | $CONH_2$ | 3-Methyl cyclohexyl | H | 3-Methyl cyclohexyl | H |
| $1b^{81}$ | Methyl | F | $CONH_2$ | Isopropyl | H | Isopropyl | H |
| $1b^{82}$ | Methyl | F | $CONH_2$ | Sec-butyl | H | Sec-butyl | H |
| $1b^{83}$ | Methyl | F | $CONH_2$ | 2-Methyl butyl | H | 2-Methyl butyl | H |
| $1b^{84}$ | Methyl | F | $CONH_2$ | 1-Ethyl propyl | H | 1-Ethyl propyl | H |
| $1b^{85}$ | Methyl | F | $CONH_2$ | 1,2-Dimethyl propyl | H | 1,2-Dimethyl propyl | H |
| $1b^{86}$ | Methyl | F | $CONH_2$ | Tert-butyl | H | Tert-butyl | H |
| $1b^{87}$ | Methyl | F | $CONH_2$ | 3-Methyl butyl | H | 3-Methyl butyl | H |
| $1b^{88}$ | Methyl | F | $CONH_2$ | Pentan-2-yl | H | Pentan-2-yl | H |
| $1b^{89}$ | Methyl | F | $CONH_2$ | 2-Ethylhexyl | H | 2-Ethylhexyl | H |
| $1b^{90}$ | Methyl | F | $CONH_2$ | 2,2-Dimethyl propyl | H | 2,2-Dimethyl propyl | H |
| $1b^{91}$ | Methyl | F | $CONH_2$ | Phenyl | H | Phenyl | H |
| $1b^{92}$ | Methyl | F | $CONH_2$ | Benzyl | H | Benzyl | H |
| $1b^{93}$ | $NHCOCH_3$ | OMe | CN | Methyl | H | Methyl | H |
| $1b^{94}$ | $NHCOCH_3$ | OMe | CN | Ethyl | H | Ethyl | H |
| $1b^{95}$ | $NHCOCH_3$ | OMe | CN | Propyl | H | Propyl | H |
| $1b^{96}$ | $NHCOCH_3$ | OMe | CN | Butyl | H | Butyl | H |
| $1b^{97}$ | $NHCOCH_3$ | OMe | CN | Pentyl | H | Pentyl | H |
| $1b^{98}$ | $NHCOCH_3$ | OMe | CN | Hexyl | H | Hexyl | H |
| $1b^{99}$ | $NHCOCH_3$ | OMe | CN | Cyclobutyl | H | Cyclobutyl | H |
| $1b^{100}$ | $NHCOCH_3$ | OMe | CN | Cyclopentyl | H | Cyclopentyl | H |
| $1b^{101}$ | $NHCOCH_3$ | OMe | CN | Cyclohexyl | H | Cyclohexyl | H |
| $1b^{102}$ | $NHCOCH_3$ | OMe | CN | 2-Methyl cyclohexyl | H | 2-Methyl cyclohexyl | H |
| $1b^{103}$ | $NHCOCH_3$ | OMe | CN | 3-Methyl cyclohexyl | H | 3-Methyl cyclohexyl | H |
| $1b^{104}$ | $NHCOCH_3$ | OMe | CN | Isopropyl | H | Isopropyl | H |
| $1b^{105}$ | $NHCOCH_3$ | OMe | CN | Sec-butyl | H | Sec-butyl | H |
| $1b^{106}$ | $NHCOCH_3$ | OMe | CN | 2-Methyl butyl | H | 2-Methyl butyl | H |
| $1b^{107}$ | $NHCOCH_3$ | OMe | CN | 1-Ethyl propyl | H | 1-Ethyl propyl | H |
| $1b^{108}$ | $NHCOCH_3$ | OMe | CN | 1,2-Dimethyl propyl | H | 1,2-Dimethyl propyl | H |
| $1b^{109}$ | $NHCOCH_3$ | OMe | CN | Tert-butyl | H | Tert-butyl | H |
| $1b^{110}$ | $NHCOCH_3$ | OMe | CN | 3-Methyl butyl | H | 3-Methyl butyl | H |
| $1b^{111}$ | $NHCOCH_3$ | OMe | CN | Pentan-2-yl | H | Pentan-2-yl | H |
| $1b^{112}$ | $NHCOCH_3$ | OMe | CN | 2-Ethylhexyl | H | 2-Ethylhexyl | H |
| $1b^{113}$ | $NHCOCH_3$ | OMe | CN | 2,2-Dimethyl propyl | H | 2,2-Dimethyl propyl | H |
| $1b^{114}$ | $NHCOCH_3$ | OMe | CN | Phenyl | H | Phenyl | H |
| $1b^{115}$ | $NHCOCH_3$ | OMe | CN | Benzyl | H | Benzyl | H |
| $1b^{116}$ | $NHCOCH_3$ | OMe | $CONH_2$ | Methyl | H | Methyl | H |
| $1b^{117}$ | $NHCOCH_3$ | OMe | $CONH_2$ | Ethyl | H | Ethyl | H |
| $1b^{118}$ | $NHCOCH_3$ | OMe | $CONH_2$ | Propyl | H | Propyl | H |
| $1b^{119}$ | $NHCOCH_3$ | OMe | $CONH_2$ | Butyl | H | Butyl | H |
| $1b^{120}$ | $NHCOCH_3$ | OMe | $CONH_2$ | Pentyl | H | Pentyl | H |
| $1b^{121}$ | $NHCOCH_3$ | OMe | $CONH_2$ | Hexyl | H | Hexyl | H |
| $1b^{122}$ | $NHCOCH_3$ | OMe | $CONH_2$ | Cyclobutyl | H | Cyclobutyl | H |
| $1b^{123}$ | $NHCOCH_3$ | OMe | $CONH_2$ | Cyclopentyl | H | Cyclopentyl | H |
| $1b^{124}$ | $NHCOCH_3$ | OMe | $CONH_2$ | Cyclohexyl | H | Cyclohexyl | H |
| $1b^{125}$ | $NHCOCH_3$ | OMe | $CONH_2$ | 2-Methyl cyclohexyl | H | 2-Methyl cyclohexyl | H |
| $1b^{126}$ | $NHCOCH_3$ | OMe | $CONH_2$ | 3-Methyl cyclohexyl | H | 3-Methyl cyclohexyl | H |
| $1b^{127}$ | $NHCOCH_3$ | OMe | $CONH_2$ | Isopropyl | H | Isopropyl | H |
| $1b^{128}$ | $NHCOCH_3$ | OMe | $CONH_2$ | Sec-butyl | H | Sec-butyl | H |
| $1b^{129}$ | $NHCOCH_3$ | OMe | $CONH_2$ | 2-Methyl butyl | H | 2-Methyl butyl | H |
| $1b^{130}$ | $NHCOCH_3$ | OMe | $CONH_2$ | 1-Ethyl propyl | H | 1-Ethyl propyl | H |
| $1b^{131}$ | $NHCOCH_3$ | OMe | $CONH_2$ | 1,2-Dimethyl propyl | H | 1,2-Dimethyl propyl | H |
| $1b^{132}$ | $NHCOCH_3$ | OMe | $CONH_2$ | Tert-butyl | H | Tert-butyl | H |
| $1b^{133}$ | $NHCOCH_3$ | OMe | $CONH_2$ | 3-Methyl butyl | H | 3-Methyl butyl | H |
| $1b^{134}$ | $NHCOCH_3$ | OMe | $CONH_2$ | Pentan-2-yl | H | Pentan-2-yl | H |
| $1b^{135}$ | $NHCOCH_3$ | OMe | $CONH_2$ | 2-Ethylhexyl | H | 2-Ethylhexyl | H |
| $1b^{136}$ | $NHCOCH_3$ | OMe | $CONH_2$ | 2,2-Dimethyl propyl | H | 2,2-Dimethyl propyl | H |
| $1b^{137}$ | $NHCOCH_3$ | OMe | $CONH_2$ | Phenyl | H | Phenyl | H |
| $1b^{138}$ | $NHCOCH_3$ | OMe | $CONH_2$ | Benzyl | H | Benzyl | H |
| $1b^{139}$ | Methyl | Methyl | CN | 2-Methoxyethyl | H | Butyl | H |
| $1b^{140}$ | Methyl | Methyl | CN | 3-Methoxy propyl | H | 3-Methoxy propyl | H |
| $1b^{141}$ | Methyl | Methyl | CN | 3-Methoxy propyl | H | Butyl | H |
| $1b^{142}$ | Methyl | Methyl | CN | Butyl | Butyl | 2-Hydroxyethyl | H |
| $1b^{143}$ | Methyl | Methyl | CN | Isopropyl | Isopropyl | 2-Hydroxyethyl | H |
| $1b^{144}$ | Methyl | Methyl | CN | 2-Fluoro ethyl | H | Butyl | H |
| $1b^{145}$ | Methyl | Methyl | CN | 2-Chloro ethyl | H | 2-Ethylhexyl | H |
| $1b^{146}$ | Methyl | Methyl | CN | 3-Chloro propyl | H | 2-Ethylhexyl | H |
| $1b^{147}$ | Methyl | Methyl | CN | 2-(2-Hydroxyethylsulfanyl)-ethyl | H | Butyl | H |
| $1b^{148}$ | Methyl | Methyl | CN | 2-(2-tert-Butyl sulfanyl-ethane sulfonyl)-ethyl | H | Butyl | H |

-continued

| Structure | $R^{5b}/R^{7b}$ | $R^{6b}/R^{8b}$ | $R^{9b}/R^{16b}$ | $R^{11b}/R^{17b}$ | $R^{12b}/R^{18b}$ | $R^{13b}/R^{19b}$ | $R^{14b}/R^{20b}$ |
|---|---|---|---|---|---|---|---|
| 1b$^{149}$ | Methyl | Methyl | CN | 2-(2-Hydroxy ethoxy) propyl | H | Butyl | H |
| 1b$^{150}$ | Methyl | Methyl | CN | 2-(2-Hydroxyethoxy)ethyl | H | Butyl | H |
| 1b$^{151}$ | Methyl | Methyl | CN | H | H | 2-(2-Hydroxy ethoxy) propyl | H |
| 1b$^{152}$ | Methyl | Methyl | CN | H | H | 2-(2-Hydroxy ethoxy)ethyl | H |
| 1b$^{153}$ | Methyl | Methyl | CN | H | H | 3-(2-Hydroxy ethoxy)propyl | H |
| 1b$^{154}$ | Methyl | Methyl | CN | 2-(2-Hydroxy ethoxy)ethyl | H | H | H |
| 1b$^{155}$ | Methyl | Methyl | CN | 3-(2-Hydroxy ethoxy)propyl | H | H | H |
| 1b$^{156}$ | Methyl | Methyl | CN | Phenyl | H | 2-(2-Hydroxy ethoxy)ethyl | H |
| 1b$^{157}$ | Methyl | Methyl | CN | 3-(2-Phenoxy-ethoxy)-propyl | H | H | H |
| 1b$^{158}$ | Methyl | Methyl | CN | 3-Isopropoxy-propyl | H | 3-Isopropoxy-propyl | H |
| 1b$^{159}$ | Methyl | Methyl | CN | 3-Isopropoxy-propyl | H | H | H |
| 1b$^{160}$ | Methyl | Methyl | CN | 3-Isopropoxy-propyl | H | Phenyl | H |
| 1b$^{161}$ | Methyl | Methyl | CN | 3-Ethoxy-propyl | H | 3-Ethoxy-propyl | H |
| 1b$^{162}$ | Methyl | Methyl | CN | 3-Ethoxy-propyl | H | H | H |
| 1b$^{163}$ | Methyl | Methyl | CN | 3-Ethoxy-propyl | H | Phenyl | H |
| 1b$^{164}$ | Methyl | Methyl | CN | 3-Ethoxybutyl | H | 3-Ethoxybutyl | H |
| 1b$^{165}$ | Methyl | Methyl | CN | 3-Ethoxybutyl | H | H | H |
| 1b$^{166}$ | Methyl | Methyl | CN | 3-Ethoxybutyl | H | Phenyl | H |
| 1b$^{167}$ | Methyl | Methyl | CN | 4-(2-Hydroxy-ethanesulfonyl)-phenyl | H | H | H |
| 1b$^{168}$ | Methyl | F | CN | 2-Methoxyethyl | H | Butyl | H |
| 1b$^{169}$ | Methyl | F | CN | 3-Methoxy propyl | H | 3-Methoxy propyl | H |
| 1b$^{170}$ | Methyl | F | CN | 3-Methoxy propyl | H | Butyl | H |
| 1b$^{171}$ | Methyl | F | CN | Butyl | Butyl | 2-Hydroxyethyl | H |
| 1b$^{172}$ | Methyl | F | CN | Isopropyl | Isopropyl | 2-Hydroxyethyl | H |
| 1b$^{173}$ | Methyl | F | CN | 2-Fluoro ethyl | H | Butyl | H |
| 1b$^{174}$ | Methyl | F | CN | 2-Chloro ethyl | H | 2-Ethylhexyl | H |
| 1b$^{175}$ | Methyl | F | CN | 3-Chloro propyl | H | 2-Ethylhexyl | H |
| 1b$^{176}$ | Methyl | F | CN | 2-(2-Hydroxyethylsulfanyl)-ethyl | H | Butyl | H |
| 1b$^{177}$ | Methyl | F | CN | 2-(2-tert-Butyl sulfanyl-ethane sulfonyl)-ethyl | H | Butyl | H |
| 1b$^{178}$ | Methyl | F | CN | 2-Hydroxy ethoxy propyl | H | Butyl | H |
| 1b$^{179}$ | Methyl | F | CN | 2-(2-Hydroxyethoxy)ethyl | H | Butyl | H |
| 1b$^{180}$ | Methyl | F | CN | H | H | 2-(2-Hydroxy ethoxy) propyl | H |
| 1b$^{181}$ | Methyl | F | CN | H | H | 2-(2-Hydroxy ethoxy)ethyl | H |
| 1b$^{182}$ | Methyl | F | CN | H | H | 3-(4-Hydroxy ethoxy)propyl | H |
| 1b$^{183}$ | Methyl | F | CN | 2-(2-Hydroxy ethoxy)ethyl | H | H | H |
| 1b$^{184}$ | Methyl | F | CN | 3-(4-Hydroxy ethoxy)propyl | H | H | H |
| 1b$^{185}$ | Methyl | F | CN | Phenyl | H | 2-(2-Hydroxy ethoxy)ethyl | H |
| 1b$^{186}$ | Methyl | F | CN | 3-(2-Phenoxy-ethoxy)-propyl | H | H | H |
| 1b$^{187}$ | Methyl | F | CN | 3-Isopropoxy-propyl | H | 3-Isopropoxy-propyl | H |
| 1b$^{188}$ | Methyl | F | CN | 3-Isopropoxy-propyl | H | H | H |
| 1b$^{189}$ | Methyl | F | CN | 3-Isopropoxy-propyl | H | Phenyl | H |
| 1b$^{190}$ | Methyl | F | CN | 3-Ethoxy-propyl | H | 3-Ethoxy-propyl | H |
| 1b$^{191}$ | Methyl | F | CN | 3-Ethoxy-propyl | H | H | H |
| 1b$^{192}$ | Methyl | F | CN | 3-Ethoxy-propyl | H | Phenyl | H |
| 1b$^{193}$ | Methyl | F | CN | 3-Ethoxybutyl | H | 3-Ethoxybutyl | H |
| 1b$^{194}$ | Methyl | F | CN | 3-Ethoxybutyl | H | H | H |
| 1b$^{195}$ | Methyl | F | CN | 3-Ethoxybutyl | H | Phenyl | H |
| 1b$^{196}$ | Methyl | F | CN | 4-(2-Hydroxy-ethanesulfonyl)-phenyl | H | H | H |
| 1b$^{197}$ | NHCOCH$_3$ | OMe | CN | 2-Methoxyethyl | H | Butyl | H |
| 1b$^{198}$ | NHCOCH$_3$ | OMe | CN | 3-Methoxy propyl | H | 3-Methoxy propyl | H |
| 1b$^{199}$ | NHCOCH$_3$ | OMe | CN | 3-Methoxy propyl | H | Butyl | H |
| 1b$^{200}$ | NHCOCH$_3$ | OMe | CN | Butyl | Butyl | 2-Hydroxyethyl | H |
| 1b$^{201}$ | NHCOCH$_3$ | OMe | CN | Isopropyl | Isopropyl | 2-Hydroxyethyl | H |
| 1b$^{202}$ | NHCOCH$_3$ | OMe | CN | 2-Fluoro ethyl | H | Butyl | H |
| 1b$^{203}$ | NHCOCH$_3$ | OMe | CN | 2-Chloro ethyl | H | 2-Ethylhexyl | H |
| 1b$^{204}$ | NHCOCH$_3$ | OMe | CN | 3-Chloro propyl | H | 2-Ethylhexyl | H |

| Structure | $R^{5b}/R^{7b}$ | $R^{6b}/R^{8b}$ | $R^{9b}/R^{16b}$ | $R^{11b}/R^{17b}$ | $R^{12b}/R^{18b}$ | $R^{13b}/R^{19b}$ | $R^{14b}/R^{20b}$ |
|---|---|---|---|---|---|---|---|
| 1b205 | NHCOCH3 | OMe | CN | 2-(2-Hydroxyethylsulfanyl)-ethyl | H | Butyl | H |
| 1b206 | NHCOCH3 | OMe | CN | 2-(2-tert-Butyl sulfanyl-ethane sulfonyl)-ethyl | H | Butyl | H |
| 1b207 | NHCOCH3 | OMe | CN | 2-Hydroxy ethoxy propyl | H | Butyl | H |
| 1b208 | NHCOCH3 | OMe | CN | 2-(2-Hydroxyethoxy)ethyl | H | Butyl | H |
| 1b209 | NHCOCH3 | OMe | CN | H | H | 2-(2-Hydroxy ethoxy) propyl | H |
| 1b210 | NHCOCH3 | OMe | CN | H | H | 2-(2-Hydroxy ethoxy)ethyl | H |
| 1b211 | NHCOCH3 | OMe | CN | H | H | 3-(4-Hydroxy ethoxy)propyl | H |
| 1b212 | NHCOCH3 | OMe | CN | 2-(2-Hydroxy ethoxy)ethyl | H | H | H |
| 1b213 | NHCOCH3 | OMe | CN | 3-(4-Hydroxy ethoxy)propyl | H | H | H |
| 1b214 | NHCOCH3 | OMe | CN | Phenyl | H | 2-(2-Hydroxy ethoxy)ethyl | H |
| 1b215 | NHCOCH3 | OMe | CN | 3-(2-Phenoxy-ethoxy)-propyl | H | H | H |
| 1b216 | NHCOCH3 | OMe | CN | 3-Isopropoxy-propyl | H | 3-Isopropoxy-propyl | H |
| 1b217 | NHCOCH3 | OMe | CN | 3-Isopropoxy-propyl | H | H | H |
| 1b218 | NHCOCH3 | OMe | CN | 3-Isopropoxy-propyl | H | Phenyl | H |
| 1b219 | NHCOCH3 | OMe | CN | 3-Ethoxy-propyl | H | 3-Ethoxy-propyl | H |
| 1b220 | NHCOCH3 | OMe | CN | 3-Ethoxy-propyl | H | H | H |
| 1b221 | NHCOCH3 | OMe | CN | 3-Ethoxy-propyl | H | Phenyl | H |
| 1b222 | NHCOCH3 | OMe | CN | 3-Ethoxybutyl | H | 3-Ethoxybutyl | H |
| 1b223 | NHCOCH3 | OMe | CN | 3-Ethoxybutyl | H | H | H |
| 1b224 | NHCOCH3 | OMe | CN | 3-Ethoxybutyl | H | Phenyl | H |
| 1b225 | NHCOCH3 | OMe | CN | 3-Methoxy propyl | H | Butyl | H |
| 1b226 | NHCOCH3 | OMe | CN | | Butyl | 2-Hydroxyethyl | H |
| 1b227 | NHCOCH3 | OMe | CN | Isopropyl | Isopropyl | 2-Hydroxyethyl | H |
| 1b228 | NHCOCH3 | OMe | CN | 2-Fluoro ethyl | H | Butyl | H |
| 1b229 | NHCOCH3 | OMe | CN | 2-Chloro ethyl | H | 2-Ethylhexyl | H |
| 1b230 | NHCOCH3 | OMe | CN | 3-Chloro propyl | H | 2-Ethylhexyl | H |
| 1b231 | NHCOCH3 | OMe | CN | 2-(2-Hydroxyethylsulfanyl)-ethyl | H | Butyl | H |
| 1b232 | NHCOCH3 | OMe | CN | 2-(2-tert-Butyl sulfanyl-ethane sulfonyl)-ethyl | H | Butyl | H |
| 1b233 | NHCOCH3 | OMe | CN | 2-Hydroxy ethoxy propyl | H | Butyl | H |
| 1b234 | NHCOCH3 | OMe | CN | 2-Hydroxy ethoxyethyl | H | Butyl | H |
| 1b235 | NHCOCH3 | OMe | CN | 2-(Ethyl sulfonyl) ethanol | H | Butyl | H |
| 1b236 | NHCOCH3 | OMe | CN | H | H | (2-Hydroxy ethoxy) propyl | H |
| 1b237 | NHCOCH3 | OMe | CN | H | H | 2-(2-Hydroxy ethoxy)ethyl | H |
| 1b238 | NHCOCH3 | OMe | CN | H | H | 3-(2-Hydroxy ethoxy)propyl | H |
| 1b239 | NHCOCH3 | OMe | CN | 2-(2-Hydroxy ethoxy)ethyl | H | H | H |
| 1b240 | NHCOCH3 | OMe | CN | 3-(4-Hydroxy ethoxy)propyl | H | H | H |
| 1b241 | NHCOCH3 | OMe | CN | H | H | (2-Hydroxy ethoxy)ethyl | H |
| 1b242 | NHCOCH3 | OMe | CN | Phenyl | H | (2-Hydroxy ethoxy)ethyl | H |
| 1b243 | NHCOCH3 | OMe | CN | 3-(2-Phenoxy-ethoxy)-propyl | H | H | H |
| 1b244 | NHCOCH3 | OMe | CN | 3-Isopropoxy-propyl | H | 3-Isopropoxy-propyl | H |
| 1b245 | NHCOCH3 | OMe | CN | 3-Isopropoxy-propyl | H | H | H |
| 1b246 | NHCOCH3 | OMe | CN | 3-Isopropoxy-propyl | H | Phenyl | H |
| 1b247 | NHCOCH3 | OMe | CN | 3-Ethoxy-propyl | H | 3-Ethoxy-propyl | H |
| 1b248 | NHCOCH3 | OMe | CN | 3-Ethoxy-propyl | H | H | H |
| 1b249 | NHCOCH3 | OMe | CN | 3-Ethoxy-propyl | H | Phenyl | H |
| 1b250 | NHCOCH3 | OMe | CN | 3-Ethoxybutyl | H | 3-Ethoxybutyl | H |
| 1b251 | NHCOCH3 | OMe | CN | 3-Ethoxybutyl | H | H | H |
| 1b252 | NHCOCH3 | OMe | CN | 3-Ethoxybutyl | H | Phenyl | H |
| 1b253 | NHCOCH3 | OMe | CN | 4-(2-Hydroxy-ethanesulfonyl)-phenyl | H | H | H |
| 1b254 | Methyl | Methyl | CONH2 | 2-Methoxyethyl | H | Butyl | H |
| 1b255 | Methyl | Methyl | CONH2 | 3-Methoxy propyl | H | 3-Methoxy propyl | H |
| 1b256 | Methyl | Methyl | CONH2 | 3-Methoxy propyl | H | Butyl | H |
| 1b257 | Methyl | Methyl | CONH2 | Butyl | Butyl | 2-Hydroxyethyl | H |

-continued

| Structure | $R^{5b}/R^{7b}$ | $R^{6b}/R^{8b}$ | $R^{9b}/R^{16b}$ | $R^{11b}/R^{17b}$ | $R^{12b}/R^{18b}$ | $R^{13b}/R^{19b}$ | $R^{14b}/R^{20b}$ |
|---|---|---|---|---|---|---|---|
| $1b^{258}$ | Methyl | Methyl | $CONH_2$ | Isopropyl | Isopropyl | 2-Hydroxyethyl | H |
| $1b^{259}$ | Methyl | Methyl | $CONH_2$ | 2-Fluoro ethyl | H | Butyl | H |
| $1b^{260}$ | Methyl | Methyl | $CONH_2$ | 2-Chloro ethyl | H | 2-Ethylhexyl | H |
| $1b^{261}$ | Methyl | Methyl | $CONH_2$ | 3-Chloro propyl | H | 2-Ethylhexyl | H |
| $1b^{262}$ | Methyl | Methyl | $CONH_2$ | 2-(2-Hydroxyethylsulfanyl)-ethyl | H | Butyl | H |
| $1b^{263}$ | Methyl | Methyl | $CONH_2$ | 2-(2-tert-Butyl sulfanyl-ethane sulfonyl)-ethyl | H | Butyl | H |
| $1b^{264}$ | Methyl | Methyl | $CONH_2$ | 2-Hydroxy ethoxy propyl | H | Butyl | H |
| $1b^{265}$ | Methyl | Methyl | $CONH_2$ | 2-(2-Hydroxyethoxy)ethyl | H | Butyl | H |
| $1b^{266}$ | Methyl | Methyl | $CONH_2$ | H | H | 2-(2-Hydroxy ethoxy) propyl | H |
| $1b^{267}$ | Methyl | Methyl | $CONH_2$ | H | H | 2-(2-Hydroxy ethoxy)ethyl | H |
| $1b^{268}$ | Methyl | Methyl | $CONH_2$ | H | H | 3-(4-Hydroxy ethoxy)propyl | H |
| $1b^{269}$ | Methyl | Methyl | $CONH_2$ | 2-(2-Hydroxy ethoxy)ethyl | H | H | H |
| $1b^{270}$ | Methyl | Methyl | $CONH_2$ | 3-(4-Hydroxy ethoxy)propyl | H | H | H |
| $1b^{271}$ | Methyl | Methyl | $CONH_2$ | Phenyl | H | 2-(2-Hydroxy ethoxy)ethyl | H |
| $1b^{272}$ | Methyl | Methyl | $CONH_2$ | 3-(2-Phenoxy-ethoxy)-propyl | H | H | H |
| $1b^{273}$ | Methyl | Methyl | $CONH_2$ | 3-Isopropoxy-propyl | H | 3-Isopropoxy-propyl | H |
| $1b^{274}$ | Methyl | Methyl | $CONH_2$ | 3-Isopropoxy-propyl | H | H | H |
| $1b^{275}$ | Methyl | Methyl | $CONH_2$ | 3-Isopropoxy-propyl | H | Phenyl | H |
| $1b^{276}$ | Methyl | Methyl | $CONH_2$ | 3-Ethoxy-propyl | H | 3-Ethoxy-propyl | H |
| $1b^{277}$ | Methyl | Methyl | $CONH_2$ | 3-Ethoxy-propyl | H | H | H |
| $1b^{278}$ | Methyl | Methyl | $CONH_2$ | 3-Ethoxy-propyl | H | Phenyl | H |
| $1b^{279}$ | Methyl | Methyl | $CONH_2$ | 3-Ethoxybutyl | H | 3-Ethoxy butyl | H |
| $1b^{280}$ | Methyl | Methyl | $CONH_2$ | 3-Ethoxybutyl | H | H | H |
| $1b^{281}$ | Methyl | Methyl | $CONH_2$ | 3-Ethoxybutyl | H | Phenyl | H |
| $1b^{282}$ | Methyl | Methyl | $CONH_2$ | 4-(2-Hydroxy-ethanesulfonyl)-phenyl | H | H | H |
| $1b^{283}$ | Methyl | F | $CONH_2$ | 2-Methoxyethyl | H | Butyl | H |
| $1b^{284}$ | Methyl | F | $CONH_2$ | 3-Methoxy propyl | H | 3-Methoxy propyl | H |
| $1b^{285}$ | Methyl | F | $CONH_2$ | 3-Methoxy propyl | H | Butyl | H |
| $1b^{286}$ | Methyl | F | $CONH_2$ | Butyl | Butyl | 2-Hydroxyethyl | H |
| $1b^{287}$ | Methyl | F | $CONH_2$ | Isopropyl | Isopropyl | 2-Hydroxyethyl | H |
| $1b^{288}$ | Methyl | F | $CONH_2$ | 2-Fluoro ethyl | H | Butyl | H |
| $1b^{289}$ | Methyl | F | $CONH_2$ | 2-Chloro ethyl | H | 2-Ethylhexyl | H |
| $1b^{290}$ | Methyl | F | $CONH_2$ | 2-Chloro propyl | H | 2-Ethylhexyl | H |
| $1b^{291}$ | Methyl | F | $CONH_2$ | 2-(2-Hydroxyethylsulfanyl)-ethyl | H | Butyl | H |
| $1b^{292}$ | Methyl | F | $CONH_2$ | 2-(2-tert-Butyl sulfanyl-ethane sulfonyl)-ethyl | H | Butyl | H |
| $1b^{293}$ | Methyl | F | $CONH_2$ | 2-Hydroxy ethoxy propyl | H | Butyl | H |
| $1b^{294}$ | Methyl | F | $CONH_2$ | 2-(2-Hydroxyethoxy)ethyl | H | Butyl | H |
| $1b^{295}$ | Methyl | F | $CONH_2$ | H | H | 2-(2-Hydroxy ethoxy) propyl | H |
| $1b^{296}$ | Methyl | F | $CONH_2$ | H | H | 2-(2-Hydroxy ethoxy)ethyl | H |
| $1b^{297}$ | Methyl | F | $CONH_2$ | H | H | 3-(2-Hydroxy ethoxy)ethyl | H |
| $1b^{298}$ | Methyl | F | $CONH_2$ | 2-(2-Hydroxy ethoxy)ethyl | H | H | H |
| $1b^{299}$ | Methyl | F | $CONH_2$ | 3-(4-Hydroxy ethoxy)propyl | H | H | H |
| $1b^{300}$ | Methyl | F | $CONH_2$ | Phenyl | H | 2-(2-Hydroxy ethoxy)ethyl | H |
| $1b^{301}$ | Methyl | F | $CONH_2$ | 3-(2-Phenoxy-ethoxy)-propyl | H | H | H |
| $1b^{302}$ | Methyl | F | $CONH_2$ | 3-Isopropoxy-propyl | H | 3-Isopropoxy-propyl | H |
| $1b^{303}$ | Methyl | F | $CONH_2$ | 3-Isopropoxy-propyl | H | H | H |
| $1b^{304}$ | Methyl | F | $CONH_2$ | 3-Isopropoxy-propyl | H | Phenyl | H |
| $1b^{305}$ | Methyl | F | $CONH_2$ | 3-Ethoxy-propyl | H | 3-Ethoxy-propyl | H |
| $1b^{306}$ | Methyl | F | $CONH_2$ | 3-Ethoxy-propyl | H | H | H |
| $1b^{307}$ | Methyl | F | $CONH_2$ | 3-Ethoxy-propyl | H | Phenyl | H |
| $1b^{308}$ | Methyl | F | $CONH_2$ | 3-Ethoxybutyl | H | 3-Ethoxybutyl | H |
| $1b^{309}$ | Methyl | F | $CONH_2$ | 3-Ethoxybutyl | H | H | H |
| $1b^{310}$ | Methyl | F | $CONH_2$ | 3-Ethoxybutyl | H | Phenyl | H |

| Structure | $R^{5b}/R^{7b}$ | $R^{6b}/R^{8b}$ | $R^{9b}/R^{16b}$ | $R^{11b}/R^{17b}$ | $R^{12b}/R^{18b}$ | $R^{13b}/R^{19b}$ | $R^{14b}/R^{20b}$ |
|---|---|---|---|---|---|---|---|
| $1b^{311}$ | Methyl | F | CONH$_2$ | 4-(2-Hydroxy-ethanesulfonyl)-phenyl | H | H | H |
| $1b^{312}$ | NHCOCH$_3$ | OMe | CONH$_2$ | 2-Methoxyethyl | H | Butyl | H |
| $1b^{313}$ | NHCOCH$_3$ | OMe | CONH$_2$ | 3-Methoxy propyl | H | 3-Methoxy propyl | H |
| $1b^{314}$ | NHCOCH$_3$ | OMe | CONH$_2$ | 3-Methoxy propyl | H | Butyl | H |
| $1b^{315}$ | NHCOCH$_3$ | OMe | CONH$_2$ | Butyl | Butyl | 2-Hydroxyethyl | H |
| $1b^{316}$ | NHCOCH$_3$ | OMe | CONH$_2$ | Isopropyl | Isopropyl | 2-Hydroxyethyl | H |
| $1b^{317}$ | NHCOCH$_3$ | OMe | CONH$_2$ | 2-Fluoro ethyl | H | Butyl | H |
| $1b^{318}$ | NHCOCH$_3$ | OMe | CONH$_2$ | 2-Chloro ethyl | H | 2-Ethylhexyl | H |
| $1b^{319}$ | NHCOCH$_3$ | OMe | CONH$_2$ | 2-Chloro propyl | H | 2-Ethylhexyl | H |
| $1b^{320}$ | NHCOCH$_3$ | OMe | CONH$_2$ | 2-(2-Hydroxyethylsulfanyl)-ethyl | H | Butyl | H |
| $1b^{321}$ | NHCOCH$_3$ | OMe | CONH$_2$ | 2-(2-tert-Butyl sulfanyl-ethane sulfonyl)-ethyl | H | Butyl | H |
| $1b^{322}$ | NHCOCH$_3$ | OMe | CONH$_2$ | 2-Hydroxy ethoxy propyl | H | Butyl | H |
| $1b^{323}$ | NHCOCH$_3$ | OMe | CONH$_2$ | 2-(2-Hydroxyethoxy)ethyl | H | Butyl | H |
| $1b^{324}$ | NHCOCH$_3$ | OMe | CONH$_2$ | H | H | 2-(2-Hydroxy ethoxy) propyl | H |
| $1b^{325}$ | NHCOCH$_3$ | OMe | CONH$_2$ | H | H | 2-(2-Hydroxy ethoxy)ethyl | H |
| $1b^{326}$ | NHCOCH$_3$ | OMe | CONH$_2$ | H | H | 3-(4-Hydroxy ethoxy)propyl | H |
| $1b^{327}$ | NHCOCH$_3$ | OMe | CONH$_2$ | 2-(2-Hydroxy ethoxy)ethyl | H | H | H |
| $1b^{328}$ | NHCOCH$_3$ | OMe | CONH$_2$ | 3-(4-Hydroxy ethoxy)propyl | H | H | H |
| $1b^{329}$ | NHCOCH$_3$ | OMe | CONH$_2$ | Phenyl | H | 2-(2-Hydroxy ethoxy)ethyl | H |
| $1b^{330}$ | NHCOCH$_3$ | OMe | CONH$_2$ | 3-(2-Phenoxy-ethoxy)-propyl | H | H | H |
| $1b^{331}$ | NHCOCH$_3$ | OMe | CONH$_2$ | 3-Isopropoxy-propyl | H | 3-Isopropoxy-propyl | H |
| $1b^{332}$ | NHCOCH$_3$ | OMe | CONH$_2$ | 3-Isopropoxy-propyl | H | H | H |
| $1b^{333}$ | NHCOCH$_3$ | OMe | CONH$_2$ | 3-Isopropoxy-propyl | H | Phenyl | H |
| $1b^{334}$ | NHCOCH$_3$ | OMe | CONH$_2$ | 3-Ethoxy-propyl | H | 3-Ethoxy-propyl | H |
| $1b^{335}$ | NHCOCH$_3$ | OMe | CONH$_2$ | 3-Ethoxy-propyl | H | H | H |
| $1b^{336}$ | NHCOCH$_3$ | OMe | CONH$_2$ | 3-Ethoxy-propyl | H | Phenyl | H |
| $1b^{337}$ | NHCOCH$_3$ | OMe | CONH$_2$ | 3-Ethoxy butyl | H | 3-Ethoxy butyl | H |
| $1b^{338}$ | NHCOCH$_3$ | OMe | CONH$_2$ | 3-Ethoxy butyl | H | H | H |
| $1b^{339}$ | NHCOCH$_3$ | OMe | CONH$_2$ | 3-Ethoxy butyl | H | Phenyl | H |
| $1b^{340}$ | NHCOCH$_3$ | OMe | CONH$_2$ | 3-Methoxy propyl | H | Butyl | H |
| $1b^{341}$ | NHCOCH$_3$ | OMe | CONH$_2$ | Butyl | Bu | 2-Hydroxy ethyl | H |
| $1b^{342}$ | NHCOCH$_3$ | OMe | CONH$_2$ | Isopropyl | Isopropyl | 2-Hydroxy ethyl | H |
| $1b^{343}$ | NHCOCH$_3$ | OMe | CONH$_2$ | 2-Fluoro ethyl | H | Butyl | H |
| $1b^{344}$ | NHCOCH$_3$ | OMe | CONH$_2$ | 2-Chloro ethyl | H | 2-Ethyl hexyl | H |
| $1b^{345}$ | NHCOCH$_3$ | OMe | CONH$_2$ | 3-Chloro propyl | H | 2-Ethyl hexyl | H |
| $1b^{346}$ | NHCOCH$_3$ | OMe | CONH$_2$ | 2-(2-Hydroxyethylsulfanyl)-ethyl | H | Butyl | H |
| $1b^{347}$ | NHCOCH$_3$ | OMe | CONH$_2$ | 2-(2-tert-Butyl sulfanyl-ethane sulfonyl)-ethyl | H | Butyl | H |
| $1b^{348}$ | NHCOCH$_3$ | OMe | CONH$_2$ | 2-Hydroxy ethoxy propyl | H | Butyl | H |
| $1b^{349}$ | NHCOCH$_3$ | OMe | CONH$_2$ | 2-Hydroxy ethoxyethyl | H | Butyl | H |
| $1b^{350}$ | NHCOCH$_3$ | OMe | CONH$_2$ | 2-(Ethyl sulfonyl) ethanol | H | Butyl | H |
| $1b^{351}$ | NHCOCH$_3$ | OMe | CONH$_2$ | H | H | 3-(2-Hydroxy ethoxy) propyl | H |
| $1b^{352}$ | NHCOCH$_3$ | OMe | CONH$_2$ | H | H | 2-(2-Hydroxy ethoxy)ethyl | H |
| $1b^{353}$ | NHCOCH$_3$ | OMe | CONH$_2$ | Phenyl | H | 2-(2-Hydroxy ethoxy)ethyl | H |
| $1b^{354}$ | NHCOCH$_3$ | OMe | CONH$_2$ | 3-(2-Phenoxy-ethoxy)-propyl | H | H | H |
| $1b^{355}$ | NHCOCH$_3$ | OMe | CONH$_2$ | 3-Isopropoxy-propyl | H | 3-Isopropoxy-propyl | H |
| $1b^{356}$ | NHCOCH$_3$ | OMe | CONH$_2$ | 3-Isopropoxy-propyl | H | H | H |
| $1b^{357}$ | NHCOCH$_3$ | OMe | CONH$_2$ | 3-Isopropoxy-propyl | H | Phenyl | H |
| $1b^{358}$ | NHCOCH$_3$ | OMe | CONH$_2$ | 3-Ethoxy-propyl | H | 3-Ethoxy-propyl | H |
| $1b^{359}$ | NHCOCH$_3$ | OMe | CONH$_2$ | 3-Ethoxy-propyl | H | H | H |
| $1b^{360}$ | NHCOCH$_3$ | OMe | CONH$_2$ | 3-Ethoxy-propyl | H | Phenyl | H |
| $1b^{361}$ | NHCOCH$_3$ | OMe | CONH$_2$ | 3-Ethoxybutyl | H | 3-Ethoxybutyl | H |
| $1b^{362}$ | NHCOCH$_3$ | OMe | CONH$_2$ | 3-Ethoxybutyl | H | H | H |
| $1b^{363}$ | NHCOCH$_3$ | OMe | CONH$_2$ | 3-Ethoxybutyl | H | Phenyl | H |
| $1b^{364}$ | NHCOCH$_3$ | OMe | CONH$_2$ | 4-(2-hydroxy-ethanesulfonyl)-phenyl | H | H | H |

Further particularly preferred embodiments of the present invention are dyes of formula (1c) and mixtures thereof:

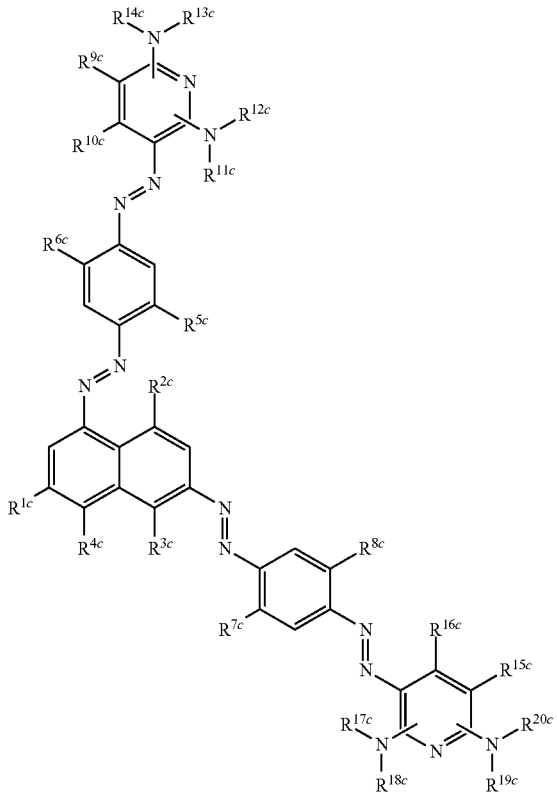

(1c)

wherein
$R^{1c}$, $R^{2c}$, $R^{3c}$ and $R^{4c}$ independent of each other is hydrogen, alkyl, alkoxy, halogen, trifluoromethyl or $SO_3M$, whereby at least two of them are $SO_3M$,
$R^{5c}$, $R^{6c}$, $R^{7c}$ and $R^{8c}$ independent of each other is hydrogen, $(C_1$-$C_4)$-alkyl, $(C_1$-$C_4)$-alkoxy, halogen, trifluoromethyl, —$SO_3M$ or $(C_1$-$C_4)$-acylamino,
$R^{9c}$ and $R^{15c}$ independent of each other is cyano, carbamoyl, substituted carbamoyl, sulfonylalkyl or alkoxycarbonyl,
$R^{10c}$ and $R^{16c}$ independent of each other is unsubstituted, linear or branched $(C_1$-$C_4)$-alkyl, unsubstiuted $(C_5$-$C_7)$-cycloalkyl or substituted $(C_5$-$C_7)$-cycloalkyl with one or more substituents such as methyl, ethyl, isobutyl, sec-butyl, tert-butyl or methylbutyl,
$R^{11c}$, $R^{12c}$ $R^{13c}$, $R^{14c}$, $R^{17c}$, $R^{18c}$, $R^{19c}$ and $R^{20c}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxyalkyl, alkoxyalkylaminoalkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, heterocycloalkylalkyl
or
alkyl interrupted by one or more heteroatoms selected from the group consisting of oxygen and sulfur
or
alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$
or alkyl interrupted by one or more heteroatoms selected from the group consisting of oxygen and sulfur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$
and
M is hydrogen, an alkali metal, ammonium, one equivalent of an alkali earth metal or a monovalent organic cation.
In the most preferred dyes of formula (1c):
$R^{2c}$ and $R^{4c}$ is $SO_3M$,
$R^{1c}$ and $R^{2c}$ is hydrogen,
$R^{5c}$, $R^{6c}$, $R^{7c}$ and $R^{8c}$ independent of each other is hydrogen, methyl, halogen, —$SO_3M$ or acetylamino,
$R^{9c}$ and $R^{15c}$ independent of each other is cyano or carbamoyl,
$R^{10c}$ and $F^{16c}$ is methyl,
$R^{11c}$, $R^{12c}$ $R^{13c}$, $R^{14c}$, $R^{17c}$, $R^{18c}$, $R^{19c}$ and $R^{20c}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, 2-methoxyethyl, 3-methoxypropyl, 2-fluoroethyl, 2-chloroethyl, 3-chloropropyl, 4-(2-hydroxy-ethanesulfonyl)-phenyl, 2-(2-tertbutylsulfanylethanesulfonyl)-ethyl, 2-(2-hydroxyethoxypropyl), 2-(2-hydroxy-ethoxy)ethyl, 3-(4-hydroxyethoxy)propyl, 3-(2-phenoxy-ethoxy)-propyl, 3-isopropoxy-propyl, 3-ethoxy-propyl or 3-ethoxybutyl
and
M is hydrogen, sodium, potassium, lithium or ammonium.
Examples of such preferred dyes of formula (1c) are the compounds of the formulae (1c$^1$ to 1c$^{364}$) and mixtures thereof:

| Structure | $R^{5c}/R^{7c}$ | $R^{6c}/R^{8c}$ | $R^{9c}/R^{16c}$ | $R^{11c}/R^{17c}$ | $R^{12c}/R^{18c}$ | $R^{13c}/R^{19c}$ | $R^{14c}/R^{20c}$ |
|---|---|---|---|---|---|---|---|
| 1c$^1$ | Methyl | Methyl | CN | Methyl | H | Methyl | H |
| 1c$^2$ | Methyl | Methyl | CN | Ethyl | H | Ethyl | H |
| 1c$^3$ | Methyl | Methyl | CN | Propyl | H | Propyl | H |

-continued

| Structure | $R^{5c}/R^{7c}$ | $R^{6c}/R^{8c}$ | $R^{9c}/R^{16c}$ | $R^{11c}/R^{17c}$ | $R^{12c}/R^{18c}$ | $R^{13c}/R^{19c}$ | $R^{14c}/R^{20c}$ |
|---|---|---|---|---|---|---|---|
| $1c^4$ | Methyl | Methyl | CN | Butyl | H | Butyl | H |
| $1c^5$ | Methyl | Methyl | CN | Pentyl | H | Pentyl | H |
| $1c^6$ | Methyl | Methyl | CN | Hexyl | H | Hexyl | H |
| $1c^7$ | Methyl | Methyl | CN | Cyclobutyl | H | Cyclobutyl | H |
| $1c^8$ | Methyl | Methyl | CN | Cyclopentyl | H | Cyclopentyl | H |
| $1c^9$ | Methyl | Methyl | CN | Cyclohexyl | H | Cyclohexyl | H |
| $1c^{10}$ | Methyl | Methyl | CN | 2-Methylcyclohexyl | H | 2-Methylcyclohexyl | H |
| $1c^{11}$ | Methyl | Methyl | CN | 3-Methylcyclohexyl | H | 3-Methylcyclohexyl | H |
| $1c^{12}$ | Methyl | Methyl | CN | Isopropyl | H | Isopropyl | H |
| $1c^{13}$ | Methyl | Methyl | CN | Sec-butyl | H | Sec-butyl | H |
| $1c^{14}$ | Methyl | Methyl | CN | 2-Methylbutyl | H | 2-Methylbutyl | H |
| $1c^{15}$ | Methyl | Methyl | CN | 1-Ethylpropyl | H | 1-Ethylpropyl | H |
| $1c^{16}$ | Methyl | Methyl | CN | 1,2-Dimethylpropyl | H | 1,2-Dimethylpropyl | H |
| $1c^{17}$ | Methyl | Methyl | CN | Tert-butyl | H | Tert-butyl | H |
| $1c^{18}$ | Methyl | Methyl | CN | 3-Methylbutyl | H | 3-Methylbutyl | H |
| $1c^{19}$ | Methyl | Methyl | CN | Pentan-2-yl | H | Pentan-2-yl | H |
| $1c^{20}$ | Methyl | Methyl | CN | 2-Ethylhexyl | H | 2-Ethylhexyl | H |
| $1c^{21}$ | Methyl | Methyl | CN | 2,2-Dimethylpropyl | H | 2,2-Dimethylpropyl | H |
| $1c^{22}$ | Methyl | Methyl | CN | Phenyl | H | Phenyl | H |
| $1c^{23}$ | Methyl | Methyl | CN | Benzyl | H | Benzyl | H |
| $1c^{24}$ | Methyl | Methyl | $CONH_2$ | Methyl | H | Methyl | H |
| $1c^{25}$ | Methyl | Methyl | $CONH_2$ | Ethyl | H | Ethyl | H |
| $1c^{26}$ | Methyl | Methyl | $CONH_2$ | Propyl | H | Propyl | H |
| $1c^{27}$ | Methyl | Methyl | $CONH_2$ | Butyl | H | Butyl | H |
| $1c^{28}$ | Methyl | Methyl | $CONH_2$ | Pentyl | H | Pentyl | H |
| $1c^{29}$ | Methyl | Methyl | $CONH_2$ | Hexyl | H | Hexyl | H |
| $1c^{30}$ | Methyl | Methyl | $CONH_2$ | Cyclobutyl | H | Cyclobutyl | H |
| $1c^{31}$ | Methyl | Methyl | $CONH_2$ | Cyclopentyl | H | Cyclopentyl | H |
| $1c^{32}$ | Methyl | Methyl | $CONH_2$ | Cyclohexyl | H | Cyclohexyl | H |
| $1c^{33}$ | Methyl | Methyl | $CONH_2$ | 2-Methylcyclohexyl | H | 2-Methylcyclohexyl | H |
| $1c^{34}$ | Methyl | Methyl | $CONH_2$ | 3-Methylcyclohexyl | H | 3-Methylcyclohexyl | H |
| $1c^{35}$ | Methyl | Methyl | $CONH_2$ | Isopropyl | H | Isopropyl | H |
| $1c^{36}$ | Methyl | Methyl | $CONH_2$ | Sec-butyl | H | Sec-butyl | H |
| $1c^{37}$ | Methyl | Methyl | $CONH_2$ | 2-Methylbutyl | H | 2-Methylbutyl | H |
| $1c^{38}$ | Methyl | Methyl | $CONH_2$ | 1-Ethylpropyl | H | 1-Ethylpropyl | H |
| $1c^{39}$ | Methyl | Methyl | $CONH_2$ | 1,2-Dimethylpropyl | H | 1,2-Dimethylpropyl | H |
| $1c^{40}$ | Methyl | Methyl | $CONH_2$ | Tert-butyl | H | Tert-butyl | H |
| $1c^{41}$ | Methyl | Methyl | $CONH_2$ | 3-Methyl butyl | H | 3-Methyl butyl | H |
| $1c^{42}$ | Methyl | Methyl | $CONH_2$ | Pentan-2-yl | H | Pentan-2-yl | H |
| $1c^{43}$ | Methyl | Methyl | $CONH_2$ | 2-Ethylhexyl | H | 2-Ethylhexyl | H |
| $1c^{44}$ | Methyl | Methyl | $CONH_2$ | 2,2-Dimethyl propyl | H | 2,2-Dimethyl propyl | H |
| $1c^{45}$ | Methyl | Methyl | $CONH_2$ | Phenyl | H | Phenyl | H |
| $1c^{46}$ | Methyl | Methyl | $CONH_2$ | Benzyl | H | Benzyl | H |
| $1c^{47}$ | Methyl | F | CN | Methyl | H | Methyl | H |
| $1c^{48}$ | Methyl | F | CN | Ethyl | H | Ethyl | H |
| $1c^{49}$ | Methyl | F | CN | Propyl | H | Propyl | H |
| $1c^{50}$ | Methyl | F | CN | Butyl | H | Butyl | H |
| $1c^{51}$ | Methyl | F | CN | Pentyl | H | Pentyl | H |
| $1c^{52}$ | Methyl | F | CN | Hexyl | H | Hexyl | H |
| $1c^{53}$ | Methyl | F | CN | Cyclobutyl | H | Cyclobutyl | H |
| $1c^{54}$ | Methyl | F | CN | Cyclopentyl | H | Cyclopentyl | H |
| $1c^{55}$ | Methyl | F | CN | Cyclohexyl | H | Cyclohexyl | H |
| $1c^{56}$ | Methyl | F | CN | 2-Methyl cyclohexyl | H | 2-Methyl cyclohexyl | H |
| $1c^{57}$ | Methyl | F | CN | 3-Methyl cyclohexyl | H | 3-Methyl cyclohexyl | H |
| $1c^{58}$ | Methyl | F | CN | Isopropyl | H | Isopropyl | H |
| $1c^{59}$ | Methyl | F | CN | Sec-butyl | H | Sec-butyl | H |
| $1c^{60}$ | Methyl | F | CN | 2-Methyl butyl | H | 2-Methyl butyl | H |
| $1c^{61}$ | Methyl | F | CN | 1-Ethyl propyl | H | 1-Ethyl propyl | H |
| $1c^{62}$ | Methyl | F | CN | 1,2-Dimethyl propyl | H | 1,2-Dimethyl propyl | H |
| $1c^{63}$ | Methyl | F | CN | Tert-butyl | H | Tert-butyl | H |
| $1c^{64}$ | Methyl | F | CN | 3-Methyl butyl | H | 3-Methyl butyl | H |
| $1c^{65}$ | Methyl | F | CN | Pentan-2-yl | H | Pentan-2-yl | H |
| $1c^{66}$ | Methyl | F | CN | 2-Ethylhexyl | H | 2-Ethylhexyl | H |
| $1c^{67}$ | Methyl | F | CN | 2,2-Dimethyl propyl | H | 2,2-Dimethyl propyl | H |
| $1c^{68}$ | Methyl | F | CN | Phenyl | H | Phenyl | H |
| $1c^{69}$ | Methyl | F | CN | Benzyl | H | Benzyl | H |
| $1c^{70}$ | Methyl | F | $CONH_2$ | Methyl | H | Methyl | H |
| $1c^{71}$ | Methyl | F | $CONH_2$ | Ethyl | H | Ethyl | H |
| $1c^{72}$ | Methyl | F | $CONH_2$ | Propyl | H | Propyl | H |
| $1c^{73}$ | Methyl | F | $CONH_2$ | Butyl | H | Butyl | H |
| $1c^{74}$ | Methyl | F | $CONH_2$ | Pentyl | H | Pentyl | H |
| $1c^{75}$ | Methyl | F | $CONH_2$ | Hexyl | H | Hexyl | H |
| $1c^{76}$ | Methyl | F | $CONH_2$ | Cyclobutyl | H | Cyclobutyl | H |
| $1c^{77}$ | Methyl | F | $CONH_2$ | Cyclopentyl | H | Cyclopentyl | H |
| $1c^{78}$ | Methyl | F | $CONH_2$ | Cyclohexyl | H | Cyclohexyl | H |
| $1c^{79}$ | Methyl | F | $CONH_2$ | 2-Methyl cyclohexyl | H | 2-Methyl cyclohexyl | H |

-continued

| Structure | $R^{5c}/R^{7c}$ | $R^{6c}/R^{8c}$ | $R^{9c}/R^{16c}$ | $R^{11c}/R^{17c}$ | $R^{12c}/R^{18c}$ | $R^{13c}/R^{19c}$ | $R^{14c}/R^{20c}$ |
|---|---|---|---|---|---|---|---|
| $1c^{80}$ | Methyl | F | $CONH_2$ | 3-Methyl cyclohexyl | H | 3-Methyl cyclohexyl | H |
| $1c^{81}$ | Methyl | F | $CONH_2$ | Isopropyl | H | Isopropyl | H |
| $1c^{82}$ | Methyl | F | $CONH_2$ | Sec-butyl | H | Sec-butyl | H |
| $1c^{83}$ | Methyl | F | $CONH_2$ | 2-Methyl butyl | H | 2-Methyl butyl | H |
| $1c^{84}$ | Methyl | F | $CONH_2$ | 1-Ethyl propyl | H | 1-Ethyl propyl | H |
| $1c^{85}$ | Methyl | F | $CONH_2$ | 1,2-Dimethyl propyl | H | 1,2-Dimethyl propyl | H |
| $1c^{86}$ | Methyl | F | $CONH_2$ | Tert-butyl | H | Tert-butyl | H |
| $1c^{87}$ | Methyl | F | $CONH_2$ | 3-Methyl butyl | H | 3-Methyl butyl | H |
| $1c^{88}$ | Methyl | F | $CONH_2$ | Pentan-2-yl | H | Pentan-2-yl | H |
| $1c^{89}$ | Methyl | F | $CONH_2$ | 2-Ethylhexyl | H | 2-Ethylhexyl | H |
| $1c^{90}$ | Methyl | F | $CONH_2$ | 2,2-Dimethyl propyl | H | 2,2-Dimethyl propyl | H |
| $1c^{91}$ | Methyl | F | $CONH_2$ | Phenyl | H | Phenyl | H |
| $1c^{92}$ | Methyl | F | $CONH_2$ | Benzyl | H | Benzyl | H |
| $1c^{93}$ | $NHCOCH_3$ | OMe | CN | Methyl | H | Methyl | H |
| $1c^{94}$ | $NHCOCH_3$ | OMe | CN | Ethyl | H | Ethyl | H |
| $1c^{95}$ | $NHCOCH_3$ | OMe | CN | Propyl | H | Propyl | H |
| $1c^{96}$ | $NHCOCH_3$ | OMe | CN | Butyl | H | Butyl | H |
| $1c^{97}$ | $NHCOCH_3$ | OMe | CN | Pentyl | H | Pentyl | H |
| $1c^{98}$ | $NHCOCH_3$ | OMe | CN | Hexyl | H | Hexyl | H |
| $1c^{99}$ | $NHCOCH_3$ | OMe | CN | Cyclobutyl | H | Cyclobutyl | H |
| $1c^{100}$ | $NHCOCH_3$ | OMe | CN | Cyclopentyl | H | Cyclopentyl | H |
| $1c^{101}$ | $NHCOCH_3$ | OMe | CN | Cyclohexyl | H | Cyclohexyl | H |
| $1c^{102}$ | $NHCOCH_3$ | OMe | CN | 2-Methyl cyclohexyl | H | 2-Methyl cyclohexyl | H |
| $1c^{103}$ | $NHCOCH_3$ | OMe | CN | 3-Methyl cyclohexyl | H | 3-Methyl cyclohexyl | H |
| $1c^{104}$ | $NHCOCH_3$ | OMe | CN | Isopropyl | H | Isopropyl | H |
| $1c^{105}$ | $NHCOCH_3$ | OMe | CN | Sec-butyl | H | Sec-butyl | H |
| $1c^{106}$ | $NHCOCH_3$ | OMe | CN | 2-Methyl butyl | H | 2-Methyl butyl | H |
| $1c^{107}$ | $NHCOCH_3$ | OMe | CN | 1-Ethyl propyl | H | 1-Ethyl propyl | H |
| $1c^{108}$ | $NHCOCH_3$ | OMe | CN | 1,2-Dimethyl propyl | H | 1,2-Dimethyl propyl | H |
| $1c^{109}$ | $NHCOCH_3$ | OMe | CN | Tert-butyl | H | Tert-butyl | H |
| $1c^{110}$ | $NHCOCH_3$ | OMe | CN | 3-Methyl butyl | H | 3-Methyl butyl | H |
| $1c^{111}$ | $NHCOCH_3$ | OMe | CN | Pentan-2-yl | H | Pentan-2-yl | H |
| $1c^{112}$ | $NHCOCH_3$ | OMe | CN | 2-Ethylhexyl | H | 2-Ethylhexyl | H |
| $1c^{113}$ | $NHCOCH_3$ | OMe | CN | 2,2-Dimethyl propyl | H | 2,2-Dimethyl propyl | H |
| $1c^{114}$ | $NHCOCH_3$ | OMe | CN | Phenyl | H | Phenyl | H |
| $1c^{115}$ | $NHCOCH_3$ | OMe | CN | Benzyl | H | Benzyl | H |
| $1c^{116}$ | $NHCOCH_3$ | OMe | $CONH_2$ | Methyl | H | Methyl | H |
| $1c^{117}$ | $NHCOCH_3$ | OMe | $CONH_2$ | Ethyl | H | Ethyl | H |
| $1c^{118}$ | $NHCOCH_3$ | OMe | $CONH_2$ | Propyl | H | Propyl | H |
| $1c^{119}$ | $NHCOCH_3$ | OMe | $CONH_2$ | Butyl | H | Butyl | H |
| $1c^{120}$ | $NHCOCH_3$ | OMe | $CONH_2$ | Pentyl | H | Pentyl | H |
| $1c^{121}$ | $NHCOCH_3$ | OMe | $CONH_2$ | Hexyl | H | Hexyl | H |
| $1c^{122}$ | $NHCOCH_3$ | OMe | $CONH_2$ | Cyclobutyl | H | Cyclobutyl | H |
| $1c^{123}$ | $NHCOCH_3$ | OMe | $CONH_2$ | Cyclopentyl | H | Cyclopentyl | H |
| $1c^{124}$ | $NHCOCH_3$ | OMe | $CONH_2$ | Cyclohexyl | H | Cyclohexyl | H |
| $1c^{125}$ | $NHCOCH_3$ | OMe | $CONH_2$ | 2-Methyl cyclohexyl | H | 2-Methyl cyclohexyl | H |
| $1c^{126}$ | $NHCOCH_3$ | OMe | $CONH_2$ | 3-Methyl cyclohexyl | H | 3-Methyl cyclohexyl | H |
| $1c^{127}$ | $NHCOCH_3$ | OMe | $CONH_2$ | Isopropyl | H | Isopropyl | H |
| $1c^{128}$ | $NHCOCH_3$ | OMe | $CONH_2$ | Sec-butyl | H | Sec-butyl | H |
| $1c^{129}$ | $NHCOCH_3$ | OMe | $CONH_2$ | 2-Methyl butyl | H | 2-Methyl butyl | H |
| $1c^{130}$ | $NHCOCH_3$ | OMe | $CONH_2$ | 1-Ethyl propyl | H | 1-Ethyl propyl | H |
| $1c^{131}$ | $NHCOCH_3$ | OMe | $CONH_2$ | 1,2-Dimethyl propyl | H | 1,2-Dimethyl propyl | H |
| $1c^{132}$ | $NHCOCH_3$ | OMe | $CONH_2$ | Tert-butyl | H | Tert-butyl | H |
| $1c^{133}$ | $NHCOCH_3$ | OMe | $CONH_2$ | 3-Methyl butyl | H | 3-Methyl butyl | H |
| $1c^{134}$ | $NHCOCH_3$ | OMe | $CONH_2$ | Pentan-2-yl | H | Pentan-2-yl | H |
| $1c^{135}$ | $NHCOCH_3$ | OMe | $CONH_2$ | 2-Ethylhexyl | H | 2-Ethylhexyl | H |
| $1c^{136}$ | $NHCOCH_3$ | OMe | $CONH_2$ | 2,2-Dimethyl propyl | H | 2,2-Dimethyl propyl | H |
| $1c^{137}$ | $NHCOCH_3$ | OMe | $CONH_2$ | Phenyl | H | Phenyl | H |
| $1c^{138}$ | $NHCOCH_3$ | OMe | $CONH_2$ | Benzyl | H | Benzyl | H |
| $1c^{139}$ | Methyl | Methyl | CN | 2-Methoxyethyl | H | Butyl | H |
| $1c^{140}$ | Methyl | Methyl | CN | 3-Methoxy propyl | H | 3-Methoxy propyl | H |
| $1c^{141}$ | Methyl | Methyl | CN | 3-Methoxy propyl | H | Butyl | H |
| $1c^{142}$ | Methyl | Methyl | CN | Butyl | Butyl | 2-Hydroyethyl | H |
| $1c^{143}$ | Methyl | Methyl | CN | Isopropyl | Isopropyl | 2-Hydroyethyl | H |
| $1c^{144}$ | Methyl | Methyl | CN | 2-Fluoro ethyl | H | Butyl | H |
| $1c^{145}$ | Methyl | Methyl | CN | 2-Chloro ethyl | H | 2-Ethylhexyl | H |
| $1c^{146}$ | Methyl | Methyl | CN | 3-Chloro propyl | H | 2-Ethylhexyl | H |
| $1c^{147}$ | Methyl | Methyl | CN | 2-(2-Hydroxyethylsulfanyl)-ethyl | H | Butyl | H |
| $1c^{148}$ | Methyl | Methyl | CN | 2-(2-tert-Butyl sulfanyl-ethane sulfonyl)-ethyl | H | Butyl | H |
| $1c^{149}$ | Methyl | Methyl | CN | 2-(2-Hydroxy ethoxy) propyl | H | Butyl | H |

-continued

| Structure | $R^{5c}/R^{7c}$ | $R^{6c}/R^{8c}$ | $R^{9c}/R^{16c}$ | $R^{11c}/R^{17c}$ | $R^{12c}/R^{18c}$ | $R^{13c}/R^{19c}$ | $R^{14c}/R^{20c}$ |
|---|---|---|---|---|---|---|---|
| 1c$^{150}$ | Methyl | Methyl | CN | 2-(2-Hydroxyethoxy)ethyl | H | Butyl | H |
| 1c$^{151}$ | Methyl | Methyl | CN | H | H | 2-(2-Hydroxy ethoxy) propyl | H |
| 1c$^{152}$ | Methyl | Methyl | CN | H | H | 2-(2-Hydroxy ethoxy)ethyl | H |
| 1c$^{153}$ | Methyl | Methyl | CN | H | H | 3-(4-Hydroxy ethoxy)propyl | H |
| 1c$^{154}$ | Methyl | Methyl | CN | 2-(2-Hydroxy ethoxy)ethyl | H | H | H |
| 1c$^{155}$ | Methyl | Methyl | CN | 3-(4-Hydroxy ethoxy)propyl | H | H | H |
| 1c$^{156}$ | Methyl | Methyl | CN | Phenyl | H | 2-(2-Hydroxy ethoxy)ethyl | H |
| 1c$^{157}$ | Methyl | Methyl | CN | 3-(2-Phenoxy-ethoxy)-propyl | H | H | H |
| 1c$^{158}$ | Methyl | Methyl | CN | 3-Isopropoxy-propyl | H | 3-Isopropoxy-propyl | H |
| 1c$^{159}$ | Methyl | Methyl | CN | 3-Isopropoxy-propyl | H | H | H |
| 1c$^{160}$ | Methyl | Methyl | CN | 3-Isopropoxy-propyl | H | Phenyl | H |
| 1c$^{161}$ | Methyl | Methyl | CN | 3-Ethoxy-propyl | H | 3-Ethoxy-propyl | H |
| 1c$^{162}$ | Methyl | Methyl | CN | 3-Ethoxy-propyl | H | H | H |
| 1c$^{163}$ | Methyl | Methyl | CN | 3-Ethoxy-propyl | H | Phenyl | H |
| 1c$^{164}$ | Methyl | Methyl | CN | 3-Ethoxybutyl | H | 3-Ethoxybutyl | H |
| 1c$^{165}$ | Methyl | Methyl | CN | 3-Ethoxybutyl | H | H | H |
| 1c$^{166}$ | Methyl | Methyl | CN | 3-Ethoxybutyl | H | Phenyl | H |
| 1c$^{167}$ | Methyl | Methyl | CN | 4-(2-Hydroxy-ethanesulfonyl)-phenyl | H | H | H |
| 1c$^{168}$ | Methyl | F | CN | 2-Methoxyethyl | H | Butyl | H |
| 1c$^{169}$ | Methyl | F | CN | 3-Methoxy propyl | H | 3-Methoxy propyl | H |
| 1c$^{170}$ | Methyl | F | CN | 3-Methoxy propyl | H | Butyl | H |
| 1c$^{171}$ | Methyl | F | CN | Butyl | Butyl | 2-Hydoxy ethyl | H |
| 1c$^{172}$ | Methyl | F | CN | Isopropyl | Isopropyl | 2-Hydoxy ethyl | H |
| 1c$^{173}$ | Methyl | F | CN | 2-Fluoro ethyl | H | Butyl | H |
| 1c$^{174}$ | Methyl | F | CN | 2-Chloro ethyl | H | 2-Ethyl hexyl | H |
| 1c$^{175}$ | Methyl | F | CN | 3-Chloro propyl | H | 2-Ethyl hexyl | H |
| 1c$^{176}$ | Methyl | F | CN | 2-(2-Hydroxyethylsulfanyl)-ethyl | H | Butyl | H |
| 1c$^{177}$ | Methyl | F | CN | 2-(2-tert-Butyl sulfanyl-ethane sulfonyl)-ethyl | H | Butyl | H |
| 1c$^{178}$ | Methyl | F | CN | 2-Hydroxy ethoxy propyl | H | Butyl | H |
| 1c$^{179}$ | Methyl | F | CN | 2-(2-Hydroxyethoxy)ethyl | H | Butyl | H |
| 1c$^{180}$ | Methyl | F | CN | H | H | 2-(2-Hydroxy ethoxy) propyl | H |
| 1c$^{181}$ | Methyl | F | CN | H | H | 2-(2-Hydroxy ethoxy)ethyl | H |
| 1c$^{182}$ | Methyl | F | CN | H | H | 3-(2-Hydroxy ethoxy)propyl | H |
| 1c$^{183}$ | Methyl | F | CN | 2-(2-Hydoxy ethoxy)ethyl | H | H | H |
| 1c$^{184}$ | Methyl | F | CN | 3-(2-Hydroxy ethoxy)propyl | H | H | H |
| 1c$^{185}$ | Methyl | F | CN | Phenyl | H | 2-(2-Hydroxy ethoxy)ethyl | H |
| 1c$^{186}$ | Methyl | F | CN | 3-(2-Phenoxy-ethoxy)-propyl | H | H | H |
| 1c$^{187}$ | Methyl | F | CN | 3-Isopropoxy-propyl | H | 3-Isopropoxy-propyl | H |
| 1c$^{188}$ | Methyl | F | CN | 3-Isopropoxy-propyl | H | H | H |
| 1c$^{189}$ | Methyl | F | CN | 3-Isopropoxy-propyl | H | Phenyl | H |
| 1c$^{190}$ | Methyl | F | CN | 3-Ethoxy-propyl | H | 3-Ethoxy-propyl | H |
| 1c$^{191}$ | Methyl | F | CN | 3-Ethoxy-propyl | H | H | H |
| 1c$^{192}$ | Methyl | F | CN | 3-Ethoxy-propyl | H | Phenyl | H |
| 1c$^{193}$ | Methyl | F | CN | 3-Ethoxybutyl | H | 3-Ethoxybutyl | H |
| 1c$^{194}$ | Methyl | F | CN | 3-Ethoxybutyl | H | H | H |
| 1c$^{195}$ | Methyl | F | CN | 3-Ethoxybutyl | H | Phenyl | H |
| 1c$^{196}$ | Methyl | F | CN | 4-(2-Hydroxy-ethanesulfonyl)-phenyl | H | H | H |
| 1c$^{197}$ | NHCOCH$_3$ | OMe | CN | 2-Methoxyethyl | H | Butyl | H |
| 1c$^{198}$ | NHCOCH$_3$ | OMe | CN | 3-Methoxy propyl | H | 3-Methoxy propyl | H |
| 1c$^{199}$ | NHCOCH$_3$ | OMe | CN | 3-Methoxy propyl | H | Butyl | H |
| 1c$^{200}$ | NHCOCH$_3$ | OMe | CN | Butyl | Butyl | 2-Hydroxyethyl | H |
| 1c$^{201}$ | NHCOCH$_3$ | OMe | CN | Isopropyl | Isopropyl | 2-Hydroxyethyl | H |
| 1c$^{202}$ | NHCOCH$_3$ | OMe | CN | 2-Fluoro ethyl | H | Butyl | H |
| 1c$^{203}$ | NHCOCH$_3$ | OMe | CN | 2-Chloro ethyl | H | 2-Ethylhexyl | H |
| 1c$^{204}$ | NHCOCH$_3$ | OMe | CN | 3-Chloro propyl | H | 2-Ethylhexyl | H |

-continued

| Structure | $R^{5c}/R^{7c}$ | $R^{6c}/R^{8c}$ | $R^{9c}/R^{16c}$ | $R^{11c}/R^{17c}$ | $R^{12c}/R^{18c}$ | $R^{13c}/R^{19c}$ | $R^{14c}/R^{20c}$ |
|---|---|---|---|---|---|---|---|
| $1c^{205}$ | NHCOCH$_3$ | OMe | CN | 2-(2-Hydroxyethylsulfanyl)-ethyl | H | Butyl | H |
| $1c^{206}$ | NHCOCH$_3$ | OMe | CN | 2-(2-tert-Butyl sulfanyl-ethane sulfonyl)-ethyl | H | Butyl | H |
| $1c^{207}$ | NHCOCH$_3$ | OMe | CN | 2-Hydroxy ethoxy propyl | H | Butyl | H |
| $1c^{208}$ | NHCOCH$_3$ | OMe | CN | 2-(2-Hydroxyethoxy)ethyl | H | Butyl | H |
| $1c^{209}$ | NHCOCH$_3$ | OMe | CN | H | H | 2-(2-Hydroxy ethoxy) propyl | H |
| $1c^{210}$ | NHCOCH$_3$ | OMe | CN | H | H | 2-(2-Hydroxy ethoxy)ethyl | H |
| $1c^{211}$ | NHCOCH$_3$ | OMe | CN | H | H | 3-(2-Hydroxy ethoxy)propyl | H |
| $1c^{212}$ | NHCOCH$_3$ | OMe | CN | 2-(2-Hydroxy ethoxy)ethyl | H | H | H |
| $1c^{213}$ | NHCOCH$_3$ | OMe | CN | 3-(2-Hydroxy ethoxy)propyl | H | H | H |
| $1c^{214}$ | NHCOCH$_3$ | OMe | CN | Phenyl | H | 2-(2-Hydroxy ethoxy)ethyl | H |
| $1c^{215}$ | NHCOCH$_3$ | OMe | CN | 3-(2-Phenoxy-ethoxy)-propyl | H | H | H |
| $1c^{216}$ | NHCOCH$_3$ | OMe | CN | 3-Isopropoxy-propyl | H | 3-Isopropoxy-propyl | H |
| $1c^{217}$ | NHCOCH$_3$ | OMe | CN | 3-Isopropoxy-propyl | H | H | H |
| $1c^{218}$ | NHCOCH$_3$ | OMe | CN | 3-Isopropoxy-propyl | H | Phenyl | H |
| $1c^{219}$ | NHCOCH$_3$ | OMe | CN | 3-Ethoxy-propyl | H | 3-Ethoxy-propyl | H |
| $1c^{220}$ | NHCOCH$_3$ | OMe | CN | 3-Ethoxy-propyl | H | H | H |
| $1c^{221}$ | NHCOCH$_3$ | OMe | CN | 3-Ethoxy-propyl | H | Phenyl | H |
| $1c^{222}$ | NHCOCH$_3$ | OMe | CN | 3-Ethoxybutyl | H | 3-Ethoxybutyl | H |
| $1c^{223}$ | NHCOCH$_3$ | OMe | CN | 3-Ethoxybutyl | H | H | H |
| $1c^{224}$ | NHCOCH$_3$ | OMe | CN | 3-Ethoxybutyl | H | Phenyl | H |
| $1c^{225}$ | NHCOCH$_3$ | OMe | CN | 3-Methoxy propyl | H | Butyl | H |
| $1c^{226}$ | NHCOCH$_3$ | OMe | CN | Butyl | Bu | 2-Hydroxyethyl | H |
| $1c^{227}$ | NHCOCH$_3$ | OMe | CN | Isopropyl | Isopropyl | 2-Hydroxyethyl | H |
| $1c^{228}$ | NHCOCH$_3$ | OMe | CN | 2-Fluoro ethyl | H | Butyl | H |
| $1c^{229}$ | NHCOCH$_3$ | OMe | CN | 2-Chloro ethyl | H | 2-Ethylhexyl | H |
| $1c^{230}$ | NHCOCH$_3$ | OMe | CN | 2-Chloro propyl | H | 2-Ethylhexyl | H |
| $1c^{231}$ | NHCOCH$_3$ | OMe | CN | 2-(2-Hydroxyethylsulfanyl)-ethyl | H | Butyl | H |
| $1c^{232}$ | NHCOCH$_3$ | OMe | CN | 2-(2-tert-Butyl sulfanyl-ethane sulfonyl)-ethyl | H | Butyl | H |
| $1c^{233}$ | NHCOCH$_3$ | OMe | CN | 2-Hydroxy ethoxy propyl | H | Butyl | H |
| $1c^{234}$ | NHCOCH$_3$ | OMe | CN | 2-Hydroxy ethoxyethyl | H | Butyl | H |
| $1c^{235}$ | NHCOCH$_3$ | OMe | CN | 2-(Ethyl sulfonyl) ethanol | H | Butyl | H |
| $1c^{236}$ | NHCOCH$_3$ | OMe | CN | H | H | (2-Hydroxy ethoxy) propyl | H |
| $1c^{237}$ | NHCOCH$_3$ | OMe | CN | H | H | 2-(2-Hydroxy ethoxy)ethyl | H |
| $1c^{238}$ | NHCOCH$_3$ | OMe | CN | H | H | 3-(2-Hydroxy ethoxy)propyl | H |
| $1c^{239}$ | NHCOCH$_3$ | OMe | CN | 2-(2-Hydroxy ethoxy)ethyl | H | H | H |
| $1c^{240}$ | NHCOCH$_3$ | OMe | CN | 3-(2-Hydroxy ethoxy)propyl | H | H | H |
| $1c^{241}$ | NHCOCH$_3$ | OMe | CN | H | H | (2-Hydroxy ethoxy)ethyl | H |
| $1c^{242}$ | NHCOCH$_3$ | OMe | CN | Phenyl | H | (2-Hydroxy ethoxy)ethyl | H |
| $1c^{243}$ | NHCOCH$_3$ | OMe | CN | 3-(2-Phenoxy-ethoxy)-propyl | H | H | H |
| $1c^{244}$ | NHCOCH$_3$ | OMe | CN | 3-Isopropoxy-propyl | H | 3-Isopropoxy-propyl | H |
| $1c^{245}$ | NHCOCH$_3$ | OMe | CN | 3-Isopropoxy-propyl | H | H | H |
| $1c^{246}$ | NHCOCH$_3$ | OMe | CN | 3-Isopropoxy-propyl | H | Phenyl | H |
| $1c^{247}$ | NHCOCH$_3$ | OMe | CN | 3-Ethoxy-propyl | H | 3-Ethoxy-propyl | H |
| $1c^{248}$ | NHCOCH$_3$ | OMe | CN | 3-Ethoxy-propyl | H | H | H |
| $1c^{249}$ | NHCOCH$_3$ | OMe | CN | 3-Ethoxy-propyl | H | Phenyl | H |
| $1c^{250}$ | NHCOCH$_3$ | OMe | CN | 3-Ethoxybutyl | H | 3-Ethoxybutyl | H |
| $1c^{251}$ | NHCOCH$_3$ | OMe | CN | 3-Ethoxybutyl | H | H | H |
| $1c^{252}$ | NHCOCH$_3$ | OMe | CN | 3-Ethoxybutyl | H | Phenyl | H |
| $1c^{253}$ | NHCOCH$_3$ | OMe | CN | 4-(2-Hydroxy-ethanesulfonyl)-phenyl | H | H | H |
| $1c^{254}$ | Methyl | Methyl | CONH$_2$ | 2-Methoxyethyl | H | Butyl | H |
| $1c^{255}$ | Methyl | Methyl | CONH$_2$ | 3-Methoxy propyl | H | 3-Methoxy propyl | H |
| $1c^{256}$ | Methyl | Methyl | CONH$_2$ | 3-Methoxy propyl | H | Butyl | H |
| $1c^{257}$ | Methyl | Methyl | CONH$_2$ | Butyl | Butyl | 2-Hydroxyethyl | H |

-continued

| Structure | $R^{5c}/R^{7c}$ | $R^{6c}/R^{8c}$ | $R^{9c}/R^{16c}$ | $R^{11c}/R^{17c}$ | $R^{12c}/R^{18c}$ | $R^{13c}/R^{19c}$ | $R^{14c}/R^{20c}$ |
|---|---|---|---|---|---|---|---|
| $1c^{258}$ | Methyl | Methyl | $CONH_2$ | Isopropyl | Isopropyl | 2-Hydroxyethyl | H |
| $1c^{259}$ | Methyl | Methyl | $CONH_2$ | 2-Fluoro ethyl | H | Butyl | H |
| $1c^{260}$ | Methyl | Methyl | $CONH_2$ | 2-Chloro ethyl | H | 2-Ethylhexyl | H |
| $1c^{261}$ | Methyl | Methyl | $CONH_2$ | 3-Chloro propyl | H | 2-Ethylhexyl | H |
| $1c^{262}$ | Methyl | Methyl | $CONH_2$ | 2-(2-Hydroxyethylsulfanyl)-ethyl | H | Butyl | H |
| $1c^{263}$ | Methyl | Methyl | $CONH_2$ | 2-(2-tert-Butyl sulfanyl-ethane sulfonyl)-ethyl | H | Butyl | H |
| $1c^{264}$ | Methyl | Methyl | $CONH_2$ | 2-Hydroxy ethoxy propyl | H | Butyl | H |
| $1c^{265}$ | Methyl | Methyl | $CONH_2$ | 2-(2-Hydroxyethoxy)ethyl | H | Butyl | H |
| $1c^{266}$ | Methyl | Methyl | $CONH_2$ | H | H | 2-(2-Hydroxy ethoxy) propyl | H |
| $1c^{267}$ | Methyl | Methyl | $CONH_2$ | H | H | 2-(2-Hydroxy ethoxy)ethyl | H |
| $1c^{268}$ | Methyl | Methyl | $CONH_2$ | H | H | 3-(2-Hydroxy ethoxy)propyl | H |
| $1c^{269}$ | Methyl | Methyl | $CONH_2$ | 2-(2-Hydroxy ethoxy)ethyl | H | H | H |
| $1c^{270}$ | Methyl | Methyl | $CONH_2$ | 3-(2-Hydroxy ethoxy)propyl | H | H | H |
| $1c^{271}$ | Methyl | Methyl | $CONH_2$ | Phenyl | H | 2-(2-Hydroxy ethoxy)ethyl | H |
| $1c^{272}$ | Methyl | Methyl | $CONH_2$ | 3-(2-Phenoxy-ethoxy)-propyl | H | H | H |
| $1c^{273}$ | Methyl | Methyl | $CONH_2$ | 3-Isopropoxy-propyl | H | 3-Isopropoxy-propyl | H |
| $1c^{274}$ | Methyl | Methyl | $CONH_2$ | 3-Isopropoxy-propyl | H | H | H |
| $1c^{275}$ | Methyl | Methyl | $CONH_2$ | 3-Isopropoxy-propyl | H | Phenyl | H |
| $1c^{276}$ | Methyl | Methyl | $CONH_2$ | 3-Ethoxy-propyl | H | 3-Ethoxy-propyl | H |
| $1c^{277}$ | Methyl | Methyl | $CONH_2$ | 3-Ethoxy-propyl | H | H | H |
| $1c^{278}$ | Methyl | Methyl | $CONH_2$ | 3-Ethoxy-propyl | H | Phenyl | H |
| $1c^{279}$ | Methyl | Methyl | $CONH_2$ | 3-Ethoxy butyl | H | 3-Ethoxy butyl | H |
| $1c^{280}$ | Methyl | Methyl | $CONH_2$ | 3-Ethoxy butyl | H | H | H |
| $1c^{281}$ | Methyl | Methyl | $CONH_2$ | 3-Ethoxy butyl | H | Phenyl | H |
| $1c^{282}$ | Methyl | Methyl | $CONH_2$ | 4-(2-Hydroxy-ethanesulfonyl)-phenyl | H | H | H |
| $1c^{283}$ | Methyl | F | $CONH_2$ | 2-Methoxyethyl | H | Butyl | H |
| $1c^{284}$ | Methyl | F | $CONH_2$ | 3-Methoxy propyl | H | 3-Methoxy propyl | H |
| $1c^{285}$ | Methyl | F | $CONH_2$ | 3-Methoxy propyl | H | Butyl | H |
| $1c^{286}$ | Methyl | F | $CONH_2$ | Butyl | Butyl | 2-Hydroxyethyl | H |
| $1c^{287}$ | Methyl | F | $CONH_2$ | Isopropyl | Isopropyl | 2-Hydroxyethyl | H |
| $1c^{288}$ | Methyl | F | $CONH_2$ | 2-Fluoro ethyl | H | Butyl | H |
| $1c^{289}$ | Methyl | F | $CONH_2$ | 2-Chloro ethyl | H | 2-Ethyl hexyl | H |
| $1c^{290}$ | Methyl | F | $CONH_2$ | 3-Chloro propyl | H | 2-Ethyl hexyl | H |
| $1c^{291}$ | Methyl | F | $CONH_2$ | 2-(2-Hydroxyethylsulfanyl)-ethyl | H | Butyl | H |
| $1c^{292}$ | Methyl | F | $CONH_2$ | 2-(2-tert-Butyl sulfanyl-ethane sulfonyl)-ethyl | H | Butyl | H |
| $1c^{293}$ | Methyl | F | $CONH_2$ | 2-Hydroxy ethoxy propyl | H | Butyl | H |
| $1c^{294}$ | Methyl | F | $CONH_2$ | 2-(2-Hydroxyethoxy)ethyl | H | Butyl | H |
| $1c^{295}$ | Methyl | F | $CONH_2$ | H | H | 2-(2-Hydroxy ethoxy) propyl | H |
| $1c^{296}$ | Methyl | F | $CONH_2$ | H | H | 2-(2-Hydroxy ethoxy)ethyl | H |
| $1c^{297}$ | Methyl | F | $CONH_2$ | H | H | 3-(2-Hydroxy ethoxy)ethyl | H |
| $1c^{298}$ | Methyl | F | $CONH_2$ | 2-(2-Hydroxy ethoxy)ethyl | H | H | H |
| $1c^{299}$ | Methyl | F | $CONH_2$ | 3-(2-Hydroxy ethoxy)ethyl | H | H | H |
| $1c^{300}$ | Methyl | F | $CONH_2$ | Phenyl | H | 2-(2-Hydroxy ethoxy)ethyl | H |
| $1c^{301}$ | Methyl | F | $CONH_2$ | 3-(2-Phenoxy-ethoxy)-propyl | H | H | H |
| $1c^{302}$ | Methyl | F | $CONH_2$ | 3-Isopropoxy-propyl | H | 3-Isopropoxy-propyl | H |
| $1c^{303}$ | Methyl | F | $CONH_2$ | 3-Isopropoxy-propyl | H | H | H |
| $1c^{304}$ | Methyl | F | $CONH_2$ | 3-Isopropoxy-propyl | H | Phenyl | H |
| $1c^{305}$ | Methyl | F | $CONH_2$ | 3-Ethoxy-propyl | H | 3-Ethoxy-propyl | H |
| $1c^{306}$ | Methyl | F | $CONH_2$ | 3-Ethoxy-propyl | H | H | H |
| $1c^{307}$ | Methyl | F | $CONH_2$ | 3-Ethoxy-propyl | H | Phenyl | H |
| $1c^{308}$ | Methyl | F | $CONH_2$ | 3-Ethoxy butyl | H | 3-Ethoxy butyl | H |
| $1c^{309}$ | Methyl | F | $CONH_2$ | 3-Ethoxy butyl | H | H | H |
| $1c^{310}$ | Methyl | F | $CONH_2$ | 3-Ethoxy butyl | H | Phenyl | H |
| $1c^{311}$ | Methyl | F | $CONH_2$ | 4-(2-Hydroxy-ethanesulfonyl)-phenyl | H | H | H |

-continued

| Structure | $R^{5c}/R^{7c}$ | $R^{6c}/R^{8c}$ | $R^{9c}/R^{16c}$ | $R^{11c}/R^{17c}$ | $R^{12c}/R^{18c}$ | $R^{13c}/R^{19c}$ | $R^{14c}/R^{20c}$ |
|---|---|---|---|---|---|---|---|
| $1c^{312}$ | NHCOCH$_3$ | OMe | CONH$_2$ | 2-Methoxyethyl | H | Butyl | H |
| $1c^{313}$ | NHCOCH$_3$ | OMe | CONH$_2$ | 3-Methoxy propyl | H | 3-Methoxy propyl | H |
| $1c^{314}$ | NHCOCH$_3$ | OMe | CONH$_2$ | 3-Methoxy propyl | H | Butyl | H |
| $1c^{315}$ | NHCOCH$_3$ | OMe | CONH$_2$ | Butyl | Butyl | 2-Hydroxyethyl | H |
| $1c^{316}$ | NHCOCH$_3$ | OMe | CONH$_2$ | Isopropyl | Isopropyl | 2-Hydroxyethyl | H |
| $1c^{317}$ | NHCOCH$_3$ | OMe | CONH$_2$ | 2-Fluoro ethyl | H | Butyl | H |
| $1c^{318}$ | NHCOCH$_3$ | OMe | CONH$_2$ | 2-Chloro ethyl | H | 2-Ethylhexyl | H |
| $1c^{319}$ | NHCOCH$_3$ | OMe | CONH$_2$ | 2-Chloro propyl | H | 2-Ethylhexyl | H |
| $1c^{320}$ | NHCOCH$_3$ | OMe | CONH$_2$ | 2-(2-Hydroxyethylsulfanyl)-ethyl | H | Butyl | H |
| $1c^{321}$ | NHCOCH$_3$ | OMe | CONH$_2$ | 2-(2-tert-Butyl sulfanyl-ethane sulfonyl)-ethyl | H | Butyl | H |
| $1c^{322}$ | NHCOCH$_3$ | OMe | CONH$_2$ | 2-Hydroxy ethoxy propyl | H | Butyl | H |
| $1c^{323}$ | NHCOCH$_3$ | OMe | CONH$_2$ | 2-(2-Hydroxyethoxy)ethyl | H | Butyl | H |
| $1c^{324}$ | NHCOCH$_3$ | OMe | CONH$_2$ | H | H | 2-(2-Hydroxy ethoxy) propyl | H |
| $1c^{325}$ | NHCOCH$_3$ | OMe | CONH$_2$ | H | H | 2-(2-Hydroxy-ethoxy)ethyl | H |
| $1c^{326}$ | NHCOCH$_3$ | OMe | CONH$_2$ | H | H | 3-(2-Hydroxy-ethoxy)propyl | H |
| $1c^{327}$ | NHCOCH$_3$ | OMe | CONH$_2$ | 2-(2-Hydroxy-ethoxy)ethyl | H | H | H |
| $1c^{328}$ | NHCOCH$_3$ | OMe | CONH$_2$ | 3-(2-Hydroxy-ethoxy)propyl | H | H | H |
| $1c^{329}$ | NHCOCH$_3$ | OMe | CONH$_2$ | Phenyl | H | 2-(2-Hydroxy-ethoxy)ethyl | H |
| $1c^{330}$ | NHCOCH$_3$ | OMe | CONH$_2$ | 3-(2-Phenoxy-ethoxy)-propyl | H | H | H |
| $1c^{331}$ | NHCOCH$_3$ | OMe | CONH$_2$ | 3-Isopropoxy-propyl | H | 3-Isopropoxy-propyl | H |
| $1c^{332}$ | NHCOCH$_3$ | OMe | CONH$_2$ | 3-Isopropoxy-propyl | H | H | H |
| $1c^{333}$ | NHCOCH$_3$ | OMe | CONH$_2$ | 3-Isopropoxy-propyl | H | Phenyl | H |
| $1c^{334}$ | NHCOCH$_3$ | OMe | CONH$_2$ | 3-Ethoxy-propyl | H | 3-Ethoxy-propyl | H |
| $1c^{335}$ | NHCOCH$_3$ | OMe | CONH$_2$ | 3-Ethoxy-propyl | H | H | H |
| $1c^{336}$ | NHCOCH$_3$ | OMe | CONH$_2$ | 3-Ethoxy-propyl | H | Phenyl | H |
| $1c^{337}$ | NHCOCH$_3$ | OMe | CONH$_2$ | 3-Ethoxy butyl | H | 3-Ethoxybutyl | H |
| $1c^{338}$ | NHCOCH$_3$ | OMe | CONH$_2$ | 3-Ethoxy butyl | H | H | H |
| $1c^{339}$ | NHCOCH$_3$ | OMe | CONH$_2$ | 3-Ethoxy butyl | H | Phenyl | H |
| $1c^{340}$ | NHCOCH$_3$ | OMe | CONH$_2$ | 3-Methoxy propyl | H | Butyl | H |
| $1c^{341}$ | NHCOCH$_3$ | OMe | CONH$_2$ | Butyl | Butyl | 2-Hydroxy ethyl | H |
| $1c^{342}$ | NHCOCH$_3$ | OMe | CONH$_2$ | Isopropyl | Isopropyl | 2-Hydroxy ethyl | H |
| $1c^{343}$ | NHCOCH$_3$ | OMe | CONH$_2$ | 2-Fluoro ethyl | H | Butyl | H |
| $1c^{344}$ | NHCOCH$_3$ | OMe | CONH$_2$ | 2-Chloro ethyl | H | 2-Ethylhexyl | H |
| $1c^{345}$ | NHCOCH$_3$ | OMe | CONH$_2$ | 3-Chloro propyl | H | 2-Ethylhexyl | H |
| $1c^{346}$ | NHCOCH$_3$ | OMe | CONH$_2$ | 2-(2-Hydroxyethylsulfanyl)-ethyl | H | Butyl | H |
| $1c^{347}$ | NHCOCH$_3$ | OMe | CONH$_2$ | 2-(2-tert-Butyl sulfanyl-ethane sulfonyl)-ethyl | H | Butyl | H |
| $1c^{348}$ | NHCOCH$_3$ | OMe | CONH$_2$ | 2-Hydroxy ethoxy propyl | H | Butyl | H |
| $1c^{349}$ | NHCOCH$_3$ | OMe | CONH$_2$ | 2-Hydroxy ethoxyethyl | H | Butyl | H |
| $1c^{350}$ | NHCOCH$_3$ | OMe | CONH$_2$ | 2-(Ethyl sulfonyl) ethanol | H | Butyl | H |
| $1c^{351}$ | NHCOCH$_3$ | OMe | CONH$_2$ | H | H | 3-(2-Hydroxy ethoxy) propyl | H |
| $1c^{352}$ | NHCOCH$_3$ | OMe | CONH$_2$ | H | H | 2-(2-Hydroxy-ethoxy)ethyl | H |
| $1c^{353}$ | NHCOCH$_3$ | OMe | CONH$_2$ | Phenyl | H | 2-(2-Hydroxy-ethoxy)ethyl | H |
| $1c^{354}$ | NHCOCH$_3$ | OMe | CONH$_2$ | 3-(2-Phenoxy-ethoxy)-propyl | H | H | H |
| $1c^{355}$ | NHCOCH$_3$ | OMe | CONH$_2$ | 3-Isopropoxy-propyl | H | 3-Isopropoxy-propyl | H |
| $1c^{356}$ | NHCOCH$_3$ | OMe | CONH$_2$ | 3-Isopropoxy-propyl | H | H | H |
| $1c^{357}$ | NHCOCH$_3$ | OMe | CONH$_2$ | 3-Isopropoxy-propyl | H | Phenyl | H |
| $1c^{358}$ | NHCOCH$_3$ | OMe | CONH$_2$ | 3-Ethoxy-propyl | H | 3-Ethoxy-propyl | H |
| $1c^{359}$ | NHCOCH$_3$ | OMe | CONH$_2$ | 3-Ethoxy-propyl | H | H | H |
| $1c^{360}$ | NHCOCH$_3$ | OMe | CONH$_2$ | 3-Ethoxy-propyl | H | Phenyl | H |
| $1c^{361}$ | NHCOCH$_3$ | OMe | CONH$_2$ | 3-Ethoxy butyl | H | 3-Ethoxy butyl | H |
| $1c^{362}$ | NHCOCH$_3$ | OMe | CONH$_2$ | 3-Ethoxy butyl | H | H | H |
| $1c^{363}$ | NHCOCH$_3$ | OMe | CONH$_2$ | 3-Ethoxy butyl | H | Phenyl | H |
| $1c^{364}$ | NHCOCH$_3$ | OMe | CONH$_2$ | 4-(2-Hydroxy-ethanesulfonyl)-phenyl | H | H | H |

Further particularly preferred embodiments of the present invention are dyes of formula (1d) and mixtures thereof

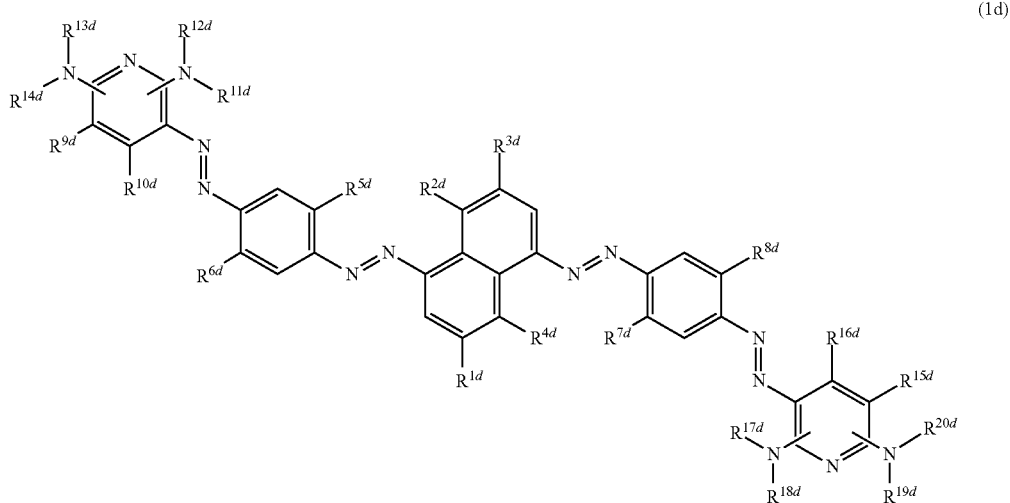

(1d)

wherein
$R^{1d}$, $R^{2d}$, $R^{3d}$ and $R^{4d}$ independent of each other is hydrogen, alkyl, alkoxy, halogen, trifluoromethyl or $SO_3M$ whereby at least two of them are $SO_3M$, $R^{5d}$, $R^{6d}$, $R^{7d}$ and $R^{8d}$ independent of each other is hydrogen, $(C_1\text{-}C_4)$-alkyl, $(C_1\text{-}C_4)$-alkoxy, halogen, trifluoromethyl, —$SO_3M$ or $(C_1\text{-}C_4)$-acylamino, $R^{9d}$ and $R^{15d}$ independent of each other is cyano, carbamoyl, substituted carbamoyl, sulfonylalkyl or alkoxycarbonyl, $R^{10d}$ and $R^{16d}$ independent of each other is unsubstituted, linear or branched $(C_1\text{-}C_4)$-alkyl, $(C_5\text{-}C_7)$-cycloalkyi or substituted $(C_5\text{-}C_7)$-cycloalkyl with one or more substituents such as methyl, ethyl, isobutyl, sec-butyl, Cert-butyl and methylbutyl, $R^{11d}$, $R^{12d}$ $R^{13d}$, $R^{14d}$, $R^{17d}$, $R^{18d}$, $R^{19d}$ and $R^{20d}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxyalkyl, alkoxyalkylaminoalkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, heterocycloalkylalkyl or alkyl interrupted by one or more heteroatoms selected from the group consisting of oxygen and sulfur, or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ or alkyl interrupted by one or more heteroatoms selected from the group consisting of oxygen and sulfur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ and M is hydrogen, an alkali metal, ammonium, one equivalent of an alkali earth metal or a monovalent organic cation.

In the most preferred dyes of formula (1d):
$R^{1d}$ and $R^{3d}$ is $SO_3M$,
$R^{2d}$ and $R^{4d}$ is hydrogen,
$R^{5d}$, $R^{6d}$, $R^{7d}$ and $R^{8d}$ independent of each other is hydrogen, methyl, halogen, —$SO_3M$ or acetylamino,
$R^{9d}$ and $R^{15d}$ independent of each other is cyano or carbamoyl,
$R^{10d}$ and $R^{16d}$ is methyl,
$R^{11d}$, $R^{12d}$ $R^{13d}$, $R^{14d}$, $R^{17d}$, $R^{16d}$, $R^{19d}$ and $R^{20d}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, 2-methoxyethyl, 3-methoxypropyl, 2-fluoroethyl, 2-chloroethyl, 3-chloropropyl, 4-(2-hydroxy-ethanesulfonyl)-phenyl, 2-(2-tertbutylsulfanylethanesulfonyl)-ethyl, 2-(2-hydroxyethoxypropyl), 2-(2-hydroxy-ethoxy)ethyl, 3-(4-hydroxyethoxy)propyl, 3-(2-phenoxy-ethoxy)-propyl, 3-isopropoxy-propyl, 3-ethoxy-propyl or 3-ethoxybutyl and M is hydrogen, sodium, potassium, lithium or ammonium.

Examples of preferred dyes of the formula (1d) are the compounds of formulae (1d$^1$ to 1 d$^{364}$) and mixtures thereof:

| Structure | $R^{5d}/R^{7d}$ | $R^{6d}/R^{8d}$ | $R^{9d}/R^{16d}$ | $R^{11d}/R^{17d}$ | $R^{12d}/R^{18d}$ | $R^{13d}/R^{19d}$ | $R^{14d}/R^{20d}$ |
|---|---|---|---|---|---|---|---|
| 1d$^1$ | Methyl | Methyl | CN | Methyl | H | Methyl | H |
| 1d$^2$ | Methyl | Methyl | CN | Ethyl | H | Ethyl | H |
| 1d$^3$ | Methyl | Methyl | CN | Propyl | H | Propyl | H |
| 1d$^4$ | Methyl | Methyl | CN | Butyl | H | Butyl | H |
| 1d$^5$ | Methyl | Methyl | CN | Pentyl | H | Pentyl | H |
| 1d$^6$ | Methyl | Methyl | CN | Hexyl | H | Hexyl | H |
| 1d$^7$ | Methyl | Methyl | CN | Cyclobutyl | H | Cyclobutyl | H |
| 1d$^8$ | Methyl | Methyl | CN | Cyclopentyl | H | Cyclopentyl | H |
| 1d$^9$ | Methyl | Methyl | CN | Cyclohexyl | H | Cyclohexyl | H |
| 1d$^{10}$ | Methyl | Methyl | CN | 2-Methylcyclohexyl | H | 2-Methylcyclohexyl | H |
| 1d$^{11}$ | Methyl | Methyl | CN | 3-Methylcyclohexyl | H | 3-Methylcyclohexyl | H |
| 1d$^{12}$ | Methyl | Methyl | CN | Isopropyl | H | Isopropyl | H |
| 1d$^{13}$ | Methyl | Methyl | CN | Sec-butyl | H | Sec-butyl | H |
| 1d$^{14}$ | Methyl | Methyl | CN | 2-Methylbutyl | H | 2-Methylbutyl | H |
| 1d$^{15}$ | Methyl | Methyl | CN | 1-Ethylpropyl | H | 1-Ethylpropyl | H |
| 1d$^{16}$ | Methyl | Methyl | CN | 1,2-Dimethylpropyl | H | 1,2-Dimethylpropyl | H |
| 1d$^{17}$ | Methyl | Methyl | CN | Tert-butyl | H | Tert-butyl | H |
| 1d$^{18}$ | Methyl | Methyl | CN | 3-Methylbutyl | H | 3-Methylbutyl | H |
| 1d$^{19}$ | Methyl | Methyl | CN | Pentan-2-yl | H | Pentan-2-yl | H |
| 1d$^{20}$ | Methyl | Methyl | CN | 2-Ethylhexyl | H | 2-Ethylhexyl | H |
| 1d$^{21}$ | Methyl | Methyl | CN | 2,2-Dimethylpropyl | H | 2,2-Dimethylpropyl | H |
| 1d$^{22}$ | Methyl | Methyl | CN | Phenyl | H | Phenyl | H |
| 1d$^{23}$ | Methyl | Methyl | CN | Benzyl | H | Benzyl | H |
| 1d$^{24}$ | Methyl | Methyl | CONH$_2$ | Methyl | H | Methyl | H |
| 1d$^{25}$ | Methyl | Methyl | CONH$_2$ | Ethyl | H | Ethyl | H |
| 1d$^{26}$ | Methyl | Methyl | CONH$_2$ | Propyl | H | Propyl | H |
| 1d$^{27}$ | Methyl | Methyl | CONH$_2$ | Butyl | H | Butyl | H |
| 1d$^{28}$ | Methyl | Methyl | CONH$_2$ | Pentyl | H | Pentyl | H |
| 1d$^{29}$ | Methyl | Methyl | CONH$_2$ | Hexyl | H | Hexyl | H |
| 1d$^{30}$ | Methyl | Methyl | CONH$_2$ | Cyclobutyl | H | Cyclobutyl | H |
| 1d$^{31}$ | Methyl | Methyl | CONH$_2$ | Cyclopentyl | H | Cyclopentyl | H |
| 1d$^{32}$ | Methyl | Methyl | CONH$_2$ | Cyclohexyl | H | Cyclohexyl | H |
| 1d$^{33}$ | Methyl | Methyl | CONH$_2$ | 2-Methylcyclohexyl | H | 2-Methylcyclohexyl | H |
| 1d$^{34}$ | Methyl | Methyl | CONH$_2$ | 3-Methylcyclohexyl | H | 3-Methylcyclohexyl | H |
| 1d$^{35}$ | Methyl | Methyl | CONH$_2$ | Isopropyl | H | Isopropyl | H |
| 1d$^{36}$ | Methyl | Methyl | CONH$_2$ | Sec-butyl | H | Sec-butyl | H |
| 1d$^{37}$ | Methyl | Methyl | CONH$_2$ | 2-Methylbutyl | H | 2-Methylbutyl | H |
| 1d$^{38}$ | Methyl | Methyl | CONH$_2$ | 1-Ethylpropyl | H | 1-Ethylpropyl | H |
| 1d$^{39}$ | Methyl | Methyl | CONH$_2$ | 1,2-Dimethylpropyl | H | 1,2-Dimethylpropyl | H |
| 1d$^{40}$ | Methyl | Methyl | CONH$_2$ | Tert-butyl | H | Tert-butyl | H |
| 1d$^{41}$ | Methyl | Methyl | CONH$_2$ | 3-Methyl butyl | H | 3-Methyl butyl | H |
| 1d$^{42}$ | Methyl | Methyl | CONH$_2$ | Pentan-2-yl | H | Pentan-2-yl | H |
| 1d$^{43}$ | Methyl | Methyl | CONH$_2$ | 2-Ethylhexyl | H | 2-Ethylhexyl | H |
| 1d$^{44}$ | Methyl | Methyl | CONH$_2$ | 2,2-Dimethyl propyl | H | 2,2-Dimethyl propyl | H |
| 1d$^{45}$ | Methyl | Methyl | CONH$_2$ | Phenyl | H | Phenyl | H |
| 1d$^{46}$ | Methyl | Methyl | CONH$_2$ | Benzyl | H | Benzyl | H |
| 1d$^{47}$ | Methyl | F | CN | Methyl | H | Methyl | H |
| 1d$^{48}$ | Methyl | F | CN | Ethyl | H | Ethyl | H |
| 1d$^{49}$ | Methyl | F | CN | Propyl | H | Propyl | H |
| 1d$^{50}$ | Methyl | F | CN | Butyl | H | Butyl | H |
| 1d$^{51}$ | Methyl | F | CN | Pentyl | H | Pentyl | H |
| 1d$^{52}$ | Methyl | F | CN | Hexyl | H | Hexyl | H |
| 1d$^{53}$ | Methyl | F | CN | Cyclobutyl | H | Cyclobutyl | H |
| 1d$^{54}$ | Methyl | F | CN | Cyclopentyl | H | Cyclopentyl | H |
| 1d$^{55}$ | Methyl | F | CN | Cyclohexyl | H | Cyclohexyl | H |
| 1d$^{56}$ | Methyl | F | CN | 2-Methyl cyclohexyl | H | 2-Methyl cyclohexyl | H |
| 1d$^{57}$ | Methyl | F | CN | 3-Methyl cyclohexyl | H | 3-Methyl cyclohexyl | H |
| 1d$^{58}$ | Methyl | F | CN | Isopropyl | H | Isopropyl | H |
| 1d$^{59}$ | Methyl | F | CN | Sec-butyl | H | Sec-butyl | H |
| 1d$^{60}$ | Methyl | F | CN | 2-Methyl butyl | H | 2-Methyl butyl | H |
| 1d$^{61}$ | Methyl | F | CN | 1-Ethyl propyl | H | 1-Ethyl propyl | H |
| 1d$^{62}$ | Methyl | F | CN | 1,2-Dimethyl propyl | H | 1,2-Dimethyl propyl | H |
| 1d$^{63}$ | Methyl | F | CN | Tert-butyl | H | Tert-butyl | H |
| 1d$^{64}$ | Methyl | F | CN | 3-Methyl butyl | H | 3-Methyl butyl | H |
| 1d$^{65}$ | Methyl | F | CN | Pentan-2-yl | H | Pentan-2-yl | H |
| 1d$^{66}$ | Methyl | F | CN | 2-Ethylhexyl | H | 2-Ethylhexyl | H |
| 1d$^{67}$ | Methyl | F | CN | 2,2-Dimethyl propyl | H | 2,2-Dimethyl propyl | H |
| 1d$^{68}$ | Methyl | F | CN | Phenyl | H | Phenyl | H |
| 1d$^{69}$ | Methyl | F | CN | Benzyl | H | Benzyl | H |
| 1d$^{70}$ | Methyl | F | CONH$_2$ | Methyl | H | Methyl | H |
| 1d$^{71}$ | Methyl | F | CONH$_2$ | Ethyl | H | Ethyl | H |
| 1d$^{72}$ | Methyl | F | CONH$_2$ | Propyl | H | Propyl | H |
| 1d$^{73}$ | Methyl | F | CONH$_2$ | Butyl | H | Butyl | H |
| 1d$^{74}$ | Methyl | F | CONH$_2$ | Pentyl | H | Pentyl | H |

-continued

| Structure | $R^{5d}/R^{7d}$ | $R^{6d}/R^{8d}$ | $R^{9d}/R^{16d}$ | $R^{11d}/R^{17d}$ | $R^{12d}/R^{18d}$ | $R^{13d}/R^{19d}$ | $R^{14d}/R^{20d}$ |
|---|---|---|---|---|---|---|---|
| $1d^{75}$ | Methyl | F | $CONH_2$ | Hexyl | H | Hexyl | H |
| $1d^{76}$ | Methyl | F | $CONH_2$ | Cyclobutyl | H | Cyclobutyl | H |
| $1d^{77}$ | Methyl | F | $CONH_2$ | Cyclopentyl | H | Cyclopentyl | H |
| $1d^{78}$ | Methyl | F | $CONH_2$ | Cyclohexyl | H | Cyclohexyl | H |
| $1d^{79}$ | Methyl | F | $CONH_2$ | 2-Methyl cyclohexyl | H | 2-Methyl cyclohexyl | H |
| $1d^{80}$ | Methyl | F | $CONH_2$ | 3-Methyl cyclohexyl | H | 3-Methyl cyclohexyl | H |
| $1d^{81}$ | Methyl | F | $CONH_2$ | Isopropyl | H | Isopropyl | H |
| $1d^{82}$ | Methyl | F | $CONH_2$ | Sec-butyl | H | Sec-butyl | H |
| $1d^{83}$ | Methyl | F | $CONH_2$ | 2-Methyl butyl | H | 2-Methyl butyl | H |
| $1d^{84}$ | Methyl | F | $CONH_2$ | 1-Ethyl propyl | H | 1-Ethyl propyl | H |
| $1d^{85}$ | Methyl | F | $CONH_2$ | 1,2-Dimethyl propyl | H | 1,2-Dimethyl propyl | H |
| $1d^{86}$ | Methyl | F | $CONH_2$ | Tert-butyl | H | Tert-butyl | H |
| $1d^{87}$ | Methyl | F | $CONH_2$ | 3-Methyl butyl | H | 3-Methyl butyl | H |
| $1d^{88}$ | Methyl | F | $CONH_2$ | Pentan-2-yl | H | Pentan-2-yl | H |
| $1d^{89}$ | Methyl | F | $CONH_2$ | 2-Ethylhexyl | H | 2-Ethylhexyl | H |
| $1d^{90}$ | Methyl | F | $CONH_2$ | 2,2-Dimethyl propyl | H | 2,2-Dimethyl propyl | H |
| $1d^{91}$ | Methyl | F | $CONH_2$ | Phenyl | H | Phenyl | H |
| $1d^{92}$ | Methyl | F | $CONH_2$ | Benzyl | H | Benzyl | H |
| $1d^{93}$ | $NHCOCH_3$ | OMe | CN | Methyl | H | Methyl | H |
| $1d^{94}$ | $NHCOCH_3$ | OMe | CN | Ethyl | H | Ethyl | H |
| $1d^{95}$ | $NHCOCH_3$ | OMe | CN | Propyl | H | Propyl | H |
| $1d^{96}$ | $NHCOCH_3$ | OMe | CN | Butyl | H | Butyl | H |
| $1d^{97}$ | $NHCOCH_3$ | OMe | CN | Pentyl | H | Pentyl | H |
| $1d^{98}$ | $NHCOCH_3$ | OMe | CN | Hexyl | H | Hexyl | H |
| $1d^{99}$ | $NHCOCH_3$ | OMe | CN | Cyclobutyl | H | Cyclobutyl | H |
| $1d^{100}$ | $NHCOCH_3$ | OMe | CN | Cyclopentyl | H | Cyclopentyl | H |
| $1d^{101}$ | $NHCOCH_3$ | OMe | CN | Cyclohexyl | H | Cyclohexyl | H |
| $1d^{102}$ | $NHCOCH_3$ | OMe | CN | 2-Methyl cyclohexyl | H | 2-Methyl cyclohexyl | H |
| $1d^{103}$ | $NHCOCH_3$ | OMe | CN | 3-Methyl cyclohexyl | H | 3-Methyl cyclohexyl | H |
| $1d^{104}$ | $NHCOCH_3$ | OMe | CN | Isopropyl | H | Isopropyl | H |
| $1d^{105}$ | $NHCOCH_3$ | OMe | CN | Sec-butyl | H | Sec-butyl | H |
| $1d^{106}$ | $NHCOCH_3$ | OMe | CN | 2-Methyl butyl | H | 2-Methyl butyl | H |
| $1d^{107}$ | $NHCOCH_3$ | OMe | CN | 1-Ethyl propyl | H | 1-Ethyl propyl | H |
| $1d^{108}$ | $NHCOCH_3$ | OMe | CN | 1,2-Dimethyl propyl | H | 1,2-Dimethyl propyl | H |
| $1d^{109}$ | $NHCOCH_3$ | OMe | CN | Tert-butyl | H | Tert-butyl | H |
| $1d^{110}$ | $NHCOCH_3$ | OMe | CN | 3-Methyl butyl | H | 3-Methyl butyl | H |
| $1d^{111}$ | $NHCOCH_3$ | OMe | CN | Pentan-2-yl | H | Pentan-2-yl | H |
| $1d^{112}$ | $NHCOCH_3$ | OMe | CN | 2-Ethylhexyl | H | 2-Ethylhexyl | H |
| $1d^{113}$ | $NHCOCH_3$ | OMe | CN | 2,2-Dimethyl propyl | H | 2,2-Dimethyl propyl | H |
| $1d^{114}$ | $NHCOCH_3$ | OMe | CN | Phenyl | H | Phenyl | H |
| $1d^{115}$ | $NHCOCH_3$ | OMe | CN | Benzyl | H | Benzyl | H |
| $1d^{116}$ | $NHCOCH_3$ | OMe | $CONH_2$ | Methyl | H | Methyl | H |
| $1d^{117}$ | $NHCOCH_3$ | OMe | $CONH_2$ | Ethyl | H | Ethyl | H |
| $1d^{118}$ | $NHCOCH_3$ | OMe | $CONH_2$ | Propyl | H | Propyl | H |
| $1d^{119}$ | $NHCOCH_3$ | OMe | $CONH_2$ | Butyl | H | Butyl | H |
| $1d^{120}$ | $NHCOCH_3$ | OMe | $CONH_2$ | Pentyl | H | Pentyl | H |
| $1d^{121}$ | $NHCOCH_3$ | OMe | $CONH_2$ | Hexyl | H | Hexyl | H |
| $1d^{122}$ | $NHCOCH_3$ | OMe | $CONH_2$ | Cyclobutyl | H | Cyclobutyl | H |
| $1d^{123}$ | $NHCOCH_3$ | OMe | $CONH_2$ | Cyclopentyl | H | Cyclopentyl | H |
| $1d^{124}$ | $NHCOCH_3$ | OMe | $CONH_2$ | Cyclohexyl | H | Cyclohexyl | H |
| $1d^{125}$ | $NHCOCH_3$ | OMe | $CONH_2$ | 2-Methyl cyclohexyl | H | 2-Methyl cyclohexyl | H |
| $1d^{126}$ | $NHCOCH_3$ | OMe | $CONH_2$ | 3-Methyl cyclohexyl | H | 3-Methyl cyclohexyl | H |
| $1d^{127}$ | $NHCOCH_3$ | OMe | $CONH_2$ | Isopropyl | H | Isopropyl | H |
| $1d^{128}$ | $NHCOCH_3$ | OMe | $CONH_2$ | Sec-butyl | H | Sec-butyl | H |
| $1d^{129}$ | $NHCOCH_3$ | OMe | $CONH_2$ | 2-Methyl butyl | H | 2-Methyl butyl | H |
| $1d^{130}$ | $NHCOCH_3$ | OMe | $CONH_2$ | 1-Ethyl propyl | H | 1-Ethyl propyl | H |
| $1d^{131}$ | $NHCOCH_3$ | OMe | $CONH_2$ | 1,2-Dimethyl propyl | H | 1,2-Dimethyl propyl | H |
| $1d^{132}$ | $NHCOCH_3$ | OMe | $CONH_2$ | Tert-butyl | H | Tert-butyl | H |
| $1d^{133}$ | $NHCOCH_3$ | OMe | $CONH_2$ | 3-Methyl butyl | H | 3-Methyl butyl | H |
| $1d^{134}$ | $NHCOCH_3$ | OMe | $CONH_2$ | Pentan-2-yl | H | Pentan-2-yl | H |
| $1d^{135}$ | $NHCOCH_3$ | OMe | $CONH_2$ | 2-Ethylhexyl | H | 2-Ethylhexyl | H |
| $1d^{136}$ | $NHCOCH_3$ | OMe | $CONH_2$ | 2,2-Dimethyl propyl | H | 2,2-Dimethyl propyl | H |
| $1d^{137}$ | $NHCOCH_3$ | OMe | $CONH_2$ | Phenyl | H | Phenyl | H |
| $1d^{138}$ | $NHCOCH_3$ | OMe | $CONH_2$ | Benzyl | H | Benzyl | H |
| $1d^{139}$ | Methyl | Methyl | CN | 2-Methoxyethyl | H | Butyl | H |
| $1d^{140}$ | Methyl | Methyl | CN | 3-Methoxy propyl | H | 3-Methoxy propyl | H |
| $1d^{141}$ | Methyl | Methyl | CN | 3-Methoxy propyl | H | Butyl | H |
| $1d^{142}$ | Methyl | Methyl | CN | Butyl | Butyl | 2-Hydroxyethyl | H |
| $1d^{143}$ | Methyl | Methyl | CN | Isopropyl | Isopropyl | 2-Hydroxyethyl | H |
| $1d^{144}$ | Methyl | Methyl | CN | 2-Fluoro ethyl | H | Butyl | H |
| $1d^{145}$ | Methyl | Methyl | CN | 2-Chloro ethyl | H | 2-Ethylhexyl | H |
| $1d^{146}$ | Methyl | Methyl | CN | 3-Chloro propyl | H | 2-Ethylhexyl | H |

-continued

| Structure | $R^{5d}/R^{7d}$ | $R^{6d}/R^{8d}$ | $R^{9d}/R^{16d}$ | $R^{11d}/R^{17d}$ | $R^{12d}/R^{18d}$ | $R^{13d}/R^{19d}$ | $R^{14d}/R^{20d}$ |
|---|---|---|---|---|---|---|---|
| 1d¹⁴⁷ | Methyl | Methyl | CN | 2-(2-Hydroxyethylsulfanyl)-ethyl | H | Butyl | H |
| 1d¹⁴⁸ | Methyl | Methyl | CN | 2-(2-tert-Butyl sulfanyl-ethane sulfonyl)-ethyl | H | Butyl | H |
| 1d¹⁴⁹ | Methyl | Methyl | CN | 2-(2-Hydroxy ethoxy) propyl | H | Butyl | H |
| 1d¹⁵⁰ | Methyl | Methyl | CN | 2-(2-Hydroxyethoxy)ethyl | H | Butyl | H |
| 1d¹⁵¹ | Methyl | Methyl | CN | H | H | 2-(2-Hydroxy ethoxy) propyl | H |
| 1d¹⁵² | Methyl | Methyl | CN | H | H | 2-(2-Hydroxy ethoxy)ethyl | H |
| 1d¹⁵³ | Methyl | Methyl | CN | H | H | 3-(2-Hydroxy ethoxy)ethyl | H |
| 1d¹⁵⁴ | Methyl | Methyl | CN | 2-(2-Hydroxy ethoxy)ethyl | H | H | H |
| 1d¹⁵⁵ | Methyl | Methyl | CN | 3-(2-Hydroxy ethoxy)ethyl | H | H | H |
| 1d¹⁵⁶ | Methyl | Methyl | CN | Phenyl | H | 2-(2-Hydroxy ethoxy)ethyl | H |
| 1d¹⁵⁷ | Methyl | Methyl | CN | 3-(2-Phenoxy-ethoxy)-propyl | H | H | H |
| 1d¹⁵⁸ | Methyl | Methyl | CN | 3-Isopropoxy-propyl | H | 3-Isopropoxy-propyl | H |
| 1d¹⁵⁹ | Methyl | Methyl | CN | 3-Isopropoxy-propyl | H | H | H |
| 1d¹⁶⁰ | Methyl | Methyl | CN | 3-Isopropoxy-propyl | H | Phenyl | H |
| 1d¹⁶¹ | Methyl | Methyl | CN | 3-Ethoxy-propyl | H | 3-Ethoxy-propyl | H |
| 1d¹⁶² | Methyl | Methyl | CN | 3-Ethoxy-propyl | H | H | H |
| 1d¹⁶³ | Methyl | Methyl | CN | 3-Ethoxy-propyl | H | Phenyl | H |
| 1d¹⁶⁴ | Methyl | Methyl | CN | 3-Ethoxy butyl | H | 3-Ethoxybutyl | H |
| 1d¹⁶⁵ | Methyl | Methyl | CN | 3-Ethoxy butyl | H | H | H |
| 1d¹⁶⁶ | Methyl | Methyl | CN | 3-Ethoxy butyl | H | Phenyl | H |
| 1d¹⁶⁷ | Methyl | Methyl | CN | 4-(2-Hydroxy-ethanesulfonyl)-phenyl | H | H | H |
| 1d¹⁶⁸ | Methyl | F | CN | 2-Methoxyethyl | H | Butyl | H |
| 1d¹⁶⁹ | Methyl | F | CN | 3-Methoxy propyl | H | 3-Methoxy propyl | H |
| 1d¹⁷⁰ | Methyl | F | CN | 3-Methoxy propyl | H | Butyl | H |
| 1d¹⁷¹ | Methyl | F | CN | Butyl | Butyl | 2-Hydroxy ethyl | H |
| 1d¹⁷² | Methyl | F | CN | Isopropyl | Isopropyl | 2-Hydroxy ethyl | H |
| 1d¹⁷³ | Methyl | F | CN | 2-Fluoro ethyl | H | Butyl | H |
| 1d¹⁷⁴ | Methyl | F | CN | 2-Chloro ethyl | H | 2-Ethyl hexyl | H |
| 1d¹⁷⁵ | Methyl | F | CN | 3-Chloro propyl | H | 2-Ethyl hexyl | H |
| 1d¹⁷⁶ | Methyl | F | CN | 2-(2-Hydroxyethylsulfanyl)-ethyl | H | Butyl | H |
| 1d¹⁷⁷ | Methyl | F | CN | 2-(2-tert-Butyl sulfanyl-ethane sulfonyl)-ethyl | H | Butyl | H |
| 1d¹⁷⁸ | Methyl | F | CN | 2-Hydroxy ethoxy propyl | H | Butyl | H |
| 1d¹⁷⁹ | Methyl | F | CN | 2-(2-Hydroxyethoxy)ethyl | H | Butyl | H |
| 1d¹⁸⁰ | Methyl | F | CN | H | H | 2-(2-Hydroxy ethoxy) propyl | H |
| 1d¹⁸¹ | Methyl | F | CN | H | H | 2-(2-Hydroxy ethoxy)ethyl | H |
| 1d¹⁸² | Methyl | F | CN | H | H | 3-(2-Hydroxy ethoxy)propyl | H |
| 1d¹⁸³ | Methyl | F | CN | 2-(2-Hydroxy ethoxy)ethyl | H | H | H |
| 1d¹⁸⁴ | Methyl | F | CN | 3-(2-Hydroxy ethoxy)propyl | H | H | H |
| 1d¹⁸⁵ | Methyl | F | CN | Phenyl | H | 2-(2-Hydroxy ethoxy)ethyl | H |
| 1d¹⁸⁶ | Methyl | F | CN | 3-(2-Phenoxy-ethoxy)-propyl | H | H | H |
| 1d¹⁸⁷ | Methyl | F | CN | 3-Isopropoxy-propyl | H | 3-Isopropoxy-propyl | H |
| 1d¹⁸⁸ | Methyl | F | CN | 3-Isopropoxy-propyl | H | H | H |
| 1d¹⁸⁹ | Methyl | F | CN | 3-Isopropoxy-propyl | H | Phenyl | H |
| 1d¹⁹⁰ | Methyl | F | CN | 3-Ethoxy-propyl | H | 3-Ethoxy-propyl | H |
| 1d¹⁹¹ | Methyl | F | CN | 3-Ethoxy-propyl | H | H | H |
| 1d¹⁹² | Methyl | F | CN | 3-Ethoxy-propyl | H | Phenyl | H |
| 1d¹⁹³ | Methyl | F | CN | 3-Ethoxy butyl | H | 3-Ethoxy butyl | H |
| 1d¹⁹⁴ | Methyl | F | CN | 3-Ethoxy butyl | H | H | H |
| 1d¹⁹⁵ | Methyl | F | CN | 3-Ethoxy butyl | H | Phenyl | H |
| 1d¹⁹⁶ | Methyl | F | CN | 4-(2-Hydroxy-ethanesulfonyl)-phenyl | H | H | H |
| 1d¹⁹⁷ | NHCOCH₃ | OMe | CN | 2-Methoxyethyl | H | Butyl | H |
| 1d¹⁹⁸ | NHCOCH₃ | OMe | CN | 3-Methoxy propyl | H | 3-Methoxy propyl | H |

-continued

| Structure | $R^{5d}/R^{7d}$ | $R^{6d}/R^{8d}$ | $R^{9d}/R^{16d}$ | $R^{11d}/R^{17d}$ | $R^{12d}/R^{18d}$ | $R^{13d}/R^{19d}$ | $R^{14d}/R^{20d}$ |
|---|---|---|---|---|---|---|---|
| $1d^{199}$ | NHCOCH$_3$ | OMe | CN | 3-Methoxy propyl | H | Butyl | H |
| $1d^{200}$ | NHCOCH$_3$ | OMe | CN | Butyl | Butyl | 2-Hydroxyethyl | H |
| $1d^{201}$ | NHCOCH$_3$ | OMe | CN | Isopropyl | Isopropyl | 2-Hydroxyethyl | H |
| $1d^{202}$ | NHCOCH$_3$ | OMe | CN | 2-Fluoro ethyl | H | Butyl | H |
| $1d^{203}$ | NHCOCH$_3$ | OMe | CN | 2-Chloro ethyl | H | 2-Ethylhexyl | H |
| $1d^{204}$ | NHCOCH$_3$ | OMe | CN | 3-Chloro propyl | H | 2-Ethylhexyl | H |
| $1d^{205}$ | NHCOCH$_3$ | OMe | CN | 2-(2-Hydroxyethylsulfanyl)-ethyl | H | Butyl | H |
| $1d^{206}$ | NHCOCH$_3$ | OMe | CN | 2-(2-tert-Butyl sulfanyl-ethane sulfonyl)-ethyl | H | Butyl | H |
| $1d^{207}$ | NHCOCH$_3$ | OMe | CN | 2-Hydroxy ethoxy propyl | H | Butyl | H |
| $1d^{208}$ | NHCOCH$_3$ | OMe | CN | 2-(2-Hydroxyethoxy)ethyl | H | Butyl | H |
| $1d^{209}$ | NHCOCH$_3$ | OMe | CN | H | H | 2-(2-Hydroxy ethoxy) propyl | H |
| $1d^{210}$ | NHCOCH$_3$ | OMe | CN | H | H | 2-(2-Hydroxy ethoxy)ethyl | H |
| $1d^{211}$ | NHCOCH$_3$ | OMe | CN | H | H | 3-(2-Hydroxy ethoxy)propyl | H |
| $1d^{212}$ | NHCOCH$_3$ | OMe | CN | 2-(2-Hydroxy ethoxy)ethyl | H | H | H |
| $1d^{213}$ | NHCOCH$_3$ | OMe | CN | 3-(2-Hydroxy ethoxy)propyl | H | H | H |
| $1d^{214}$ | NHCOCH$_3$ | OMe | CN | Phenyl | H | 2-(2-Hydroxy ethoxy)ethyl | H |
| $1d^{215}$ | NHCOCH$_3$ | OMe | CN | 3-(2-Phenoxy-ethoxy)-propyl | H | H | H |
| $1d^{216}$ | NHCOCH$_3$ | OMe | CN | 3-Isopropoxy-propyl | H | 3-Isopropoxy-propyl | H |
| $1d^{217}$ | NHCOCH$_3$ | OMe | CN | 3-Isopropoxy-propyl | H | H | H |
| $1d^{218}$ | NHCOCH$_3$ | OMe | CN | 3-Isopropoxy-propyl | H | Phenyl | H |
| $1d^{219}$ | NHCOCH$_3$ | OMe | CN | 3-Ethoxy-propyl | H | 3-Ethoxy-propyl | H |
| $1d^{220}$ | NHCOCH$_3$ | OMe | CN | 3-Ethoxy-propyl | H | H | H |
| $1d^{221}$ | NHCOCH$_3$ | OMe | CN | 3-Ethoxy-propyl | H | Phenyl | H |
| $1d^{222}$ | NHCOCH$_3$ | OMe | CN | 3-Ethoxy butyl | H | 3-Ethoxy butyl | H |
| $1d^{223}$ | NHCOCH$_3$ | OMe | CN | 3-Ethoxy butyl | H | H | H |
| $1d^{224}$ | NHCOCH$_3$ | OMe | CN | 3-Ethoxy butyl | H | Phenyl | H |
| $1d^{225}$ | NHCOCH$_3$ | OMe | CN | 3-Methoxy propyl | H | Butyl | H |
| $1d^{226}$ | NHCOCH$_3$ | OMe | CN | Butyl | Butyl | 2-Hydroxy ethyl | H |
| $1d^{227}$ | NHCOCH$_3$ | OMe | CN | Isopropyl | Isopropyl | 2-Hydroxy ethyl | H |
| $1d^{228}$ | NHCOCH$_3$ | OMe | CN | 2-Fluoro ethyl | H | Butyl | H |
| $1d^{229}$ | NHCOCH$_3$ | OMe | CN | 2-Chloro ethyl | H | 2-Ethyl hexyl | H |
| $1d^{230}$ | NHCOCH$_3$ | OMe | CN | 2-Chloro propyl | H | 2-Ethyl hexyl | H |
| $1d^{231}$ | NHCOCH$_3$ | OMe | CN | 2-(2-Hydroxyethylsulfanyl)-ethyl | H | Butyl | H |
| $1d^{232}$ | NHCOCH$_3$ | OMe | CN | 2-(2-tert-Butyl sulfanyl-ethane sulfonyl)-ethyl | H | Butyl | H |
| $1d^{233}$ | NHCOCH$_3$ | OMe | CN | 2-Hydroxy ethoxy propyl | H | Butyl | H |
| $1d^{234}$ | NHCOCH$_3$ | OMe | CN | 2-Hydroxy ethoxyethyl | H | Butyl | H |
| $1d^{235}$ | NHCOCH$_3$ | OMe | CN | 2-(Ethyl sulfonyl) ethanol | H | Butyl | H |
| $1d^{236}$ | NHCOCH$_3$ | OMe | CN | H | H | (2-Hydroxy ethoxy) propyl | H |
| $1d^{237}$ | NHCOCH$_3$ | OMe | CN | H | H | 2-(2-Hydroxy ethoxy)ethyl | H |
| $1d^{238}$ | NHCOCH$_3$ | OMe | CN | H | H | 3-(2-Hydroxy ethoxy)propyl | H |
| $1d^{239}$ | NHCOCH$_3$ | OMe | CN | 2-(2-Hydroxy ethoxy)ethyl | H | H | H |
| $1d^{240}$ | NHCOCH$_3$ | OMe | CN | 3-(2-Hydroxy ethoxy)propyl | H | H | H |
| $1d^{241}$ | NHCOCH$_3$ | OMe | CN | H | H | (2-Hydroxy ethoxy)ethyl | H |
| $1d^{242}$ | NHCOCH$_3$ | OMe | CN | Phenyl | H | (2-Hydroxy ethoxy)ethyl | H |
| $1d^{243}$ | NHCOCH$_3$ | OMe | CN | 3-(2-Phenoxy-ethoxy)-propyl | H | H | H |
| $1d^{244}$ | NHCOCH$_3$ | OMe | CN | 3-Isopropoxy-propyl | H | 3-Isopropoxy-propyl | H |
| $1d^{245}$ | NHCOCH$_3$ | OMe | CN | 3-Isopropoxy-propyl | H | H | H |
| $1d^{246}$ | NHCOCH$_3$ | OMe | CN | 3-Isopropoxy-propyl | H | Phenyl | H |
| $1d^{247}$ | NHCOCH$_3$ | OMe | CN | 3-Ethoxy-propyl | H | 3-Ethoxy-propyl | H |
| $1d^{248}$ | NHCOCH$_3$ | OMe | CN | 3-Ethoxy-propyl | H | H | H |
| $1d^{249}$ | NHCOCH$_3$ | OMe | CN | 3-Ethoxy-propyl | H | Phenyl | H |
| $1d^{250}$ | NHCOCH$_3$ | OMe | CN | 3-Ethoxy butyl | H | 3-Ethoxy butyl | H |
| $1d^{251}$ | NHCOCH$_3$ | OMe | CN | 3-Ethoxy butyl | H | H | H |

-continued

| Structure | $R^{5d}/R^{7d}$ | $R^{6d}/R^{8d}$ | $R^{9d}/R^{16d}$ | $R^{11d}/R^{17d}$ | $R^{12d}/R^{18d}$ | $R^{13d}/R^{19d}$ | $R^{14d}/R^{20d}$ |
|---|---|---|---|---|---|---|---|
| $1d^{252}$ | NHCOCH$_3$ | OMe | CN | 3-Ethoxy butyl | H | Phenyl | H |
| $1d^{253}$ | NHCOCH$_3$ | OMe | CN | 4-(2-Hydroxy-ethanesulfonyl)-phenyl | H | H | H |
| $1d^{254}$ | Methyl | Methyl | CONH$_2$ | 2-Methoxyethyl | H | Butyl | H |
| $1d^{255}$ | Methyl | Methyl | CONH$_2$ | 3-Methoxy propyl | H | 3-Methoxy propyl | H |
| $1d^{256}$ | Methyl | Methyl | CONH$_2$ | 3-Methoxy propyl | H | Butyl | H |
| $1d^{257}$ | Methyl | Methyl | CONH$_2$ | Butyl | Butyl | 2-Hydroxy ethyl | H |
| $1d^{258}$ | Methyl | Methyl | CONH$_2$ | Isopropyl | Isopropyl | 2-Hydroxy ethyl | H |
| $1d^{259}$ | Methyl | Methyl | CONH$_2$ | 2-Fluoro ethyl | H | Butyl | H |
| $1d^{260}$ | Methyl | Methyl | CONH$_2$ | 2-Chloro ethyl | H | 2-Ethyl hexyl | H |
| $1d^{261}$ | Methyl | Methyl | CONH$_2$ | 3-Chloro propyl | H | 2-Ethyl hexyl | H |
| $1d^{262}$ | Methyl | Methyl | CONH$_2$ | 2-(2-Hydroxyethylsulfanyl)-ethyl | H | Butyl | H |
| $1d^{263}$ | Methyl | Methyl | CONH$_2$ | 2-(2-tert-Butyl sulfanyl-ethane sulfonyl)-ethyl | H | Butyl | H |
| $1d^{264}$ | Methyl | Methyl | CONH$_2$ | 2-Hydroxy ethoxy propyl | H | Butyl | H |
| $1d^{265}$ | Methyl | Methyl | CONH$_2$ | 2-(2-Hydroxyethoxy)ethyl | H | Butyl | H |
| $1d^{266}$ | Methyl | Methyl | CONH$_2$ | H | H | 2-(2-Hydroxy ethoxy) propyl | H |
| $1d^{267}$ | Methyl | Methyl | CONH$_2$ | H | H | 2-(2-Hydroxy ethoxy)ethyl | H |
| $1d^{268}$ | Methyl | Methyl | CONH$_2$ | H | H | 3-(2-Hydroxy ethoxy)propyl | H |
| $1d^{269}$ | Methyl | Methyl | CONH$_2$ | 2-(2-Hydroxy ethoxy)ethyl | H | H | H |
| $1d^{270}$ | Methyl | Methyl | CONH$_2$ | 3-(2-Hydroxy ethoxy)propyl | H | H | H |
| $1d^{271}$ | Methyl | Methyl | CONH$_2$ | Phenyl | H | 2-(2-Hydroxy ethoxy)ethyl | H |
| $1d^{272}$ | Methyl | Methyl | CONH$_2$ | 3-(2-Phenoxy-ethoxy)-propyl | H | H | H |
| $1d^{273}$ | Methyl | Methyl | CONH$_2$ | 3-Isopropoxy-propyl | H | 3-Isopropoxy-propyl | H |
| $1d^{274}$ | Methyl | Methyl | CONH$_2$ | 3-Isopropoxy-propyl | H | H | H |
| $1d^{275}$ | Methyl | Methyl | CONH$_2$ | 3-Isopropoxy-propyl | H | Phenyl | H |
| $1d^{276}$ | Methyl | Methyl | CONH$_2$ | 3-Ethoxy-propyl | H | 3-Ethoxy-propyl | H |
| $1d^{277}$ | Methyl | Methyl | CONH$_2$ | 3-Ethoxy-propyl | H | H | H |
| $1d^{278}$ | Methyl | Methyl | CONH$_2$ | 3-Ethoxy-propyl | H | Phenyl | H |
| $1d^{279}$ | Methyl | Methyl | CONH$_2$ | 3-Ethoxybutyl | H | 3-Ethoxybutyl | H |
| $1d^{280}$ | Methyl | Methyl | CONH$_2$ | 3-Ethoxybutyl | H | H | H |
| $1d^{281}$ | Methyl | Methyl | CONH$_2$ | 3-Ethoxybutyl | H | Phenyl | H |
| $1d^{282}$ | Methyl | Methyl | CONH$_2$ | 4-(2-Hydroxy-ethanesulfonyl)-phenyl | H | H | H |
| $1d^{283}$ | Methyl | F | CONH$_2$ | 2-Methoxyethyl | H | Butyl | H |
| $1d^{284}$ | Methyl | F | CONH$_2$ | 3-Methoxy propyl | H | 3-Methoxy propyl | H |
| $1d^{285}$ | Methyl | F | CONH$_2$ | 3-Methoxy propyl | H | Butyl | H |
| $1d^{286}$ | Methyl | F | CONH$_2$ | Butyl | Butyl | 2-Hydroxy ethyl | H |
| $1d^{287}$ | Methyl | F | CONH$_2$ | Isopropyl | Isopropyl | 2-Hydroxy ethyl | H |
| $1d^{288}$ | Methyl | F | CONH$_2$ | 2-Fluoro ethyl | H | Butyl | H |
| $1d^{289}$ | Methyl | F | CONH$_2$ | 2-Chloro ethyl | H | 2-Ethyl hexyl | H |
| $1d^{290}$ | Methyl | F | CONH$_2$ | 3-Chloro propyl | H | 2-Ethyl hexyl | H |
| $1d^{291}$ | Methyl | F | CONH$_2$ | 2-(2-Hydroxyethylsulfanyl)-ethyl | H | Butyl | H |
| $1d^{292}$ | Methyl | F | CONH$_2$ | 2-(2-tert-Butyl sulfanyl-ethane sulfonyl)-ethyl | H | Butyl | H |
| $1d^{293}$ | Methyl | F | CONH$_2$ | 2-Hydroxy ethoxy propyl | H | Butyl | H |
| $1d^{294}$ | Methyl | F | CONH$_2$ | 2-(2-Hydroxyethoxy)ethyl | H | Butyl | H |
| $1d^{295}$ | Methyl | F | CONH$_2$ | H | H | 2-(2-Hydroxy ethoxy) propyl | H |
| $1d^{296}$ | Methyl | F | CONH$_2$ | H | H | 2-(2-Hydroxy ethoxy)ethyl | H |
| $1d^{297}$ | Methyl | F | CONH$_2$ | H | H | 3-(2-Hydroxy ethoxy)ethyl | H |
| $1d^{298}$ | Methyl | F | CONH$_2$ | 2-(2-Hydroxy ethoxy)ethyl | H | H | H |
| $1d^{299}$ | Methyl | F | CONH$_2$ | 3-(2-Hydroxy ethoxy)ethyl | H | H | H |
| $1d^{300}$ | Methyl | F | CONH$_2$ | Phenyl | H | 2-(2-Hydroxy ethoxy)ethyl | H |
| $1d^{301}$ | Methyl | F | CONH$_2$ | 3-(2-Phenoxy-ethoxy)-propyl | H | H | H |
| $1d^{302}$ | Methyl | F | CONH$_2$ | 3-Isopropoxy-propyl | H | 3-Isopropoxy-propyl | H |
| $1d^{303}$ | Methyl | F | CONH$_2$ | 3-Isopropoxy-propyl | H | H | H |

-continued

| Structure | $R^{5d}/R^{7d}$ | $R^{6d}/R^{8d}$ | $R^{9d}/R^{16d}$ | $R^{11d}/R^{17d}$ | $R^{12d}/R^{18d}$ | $R^{13d}/R^{19d}$ | $R^{14d}/R^{20d}$ |
|---|---|---|---|---|---|---|---|
| 1d304 | Methyl | F | CONH2 | 3-Isopropoxy-propyl | H | Phenyl | H |
| 1d305 | Methyl | F | CONH2 | 3-Ethoxy-propyl | H | 3-Ethoxy-propyl | H |
| 1d306 | Methyl | F | CONH2 | 3-Ethoxy-propyl | H | H | H |
| 1d307 | Methyl | F | CONH2 | 3-Ethoxy-propyl | H | Phenyl | H |
| 1d308 | Methyl | F | CONH2 | 3-Ethoxy butyl | H | 3-Ethoxybutyl | H |
| 1d309 | Methyl | F | CONH2 | 3-Ethoxy butyl | H | H | H |
| 1d310 | Methyl | F | CONH2 | 3-Ethoxy butyl | H | Phenyl | H |
| 1d311 | Methyl | F | CONH2 | 4-(2-Hydroxy-ethanesulfonyl)-phenyl | H | H | H |
| 1d312 | NHCOCH3 | OMe | CONH2 | 2-Methoxyethyl | H | Butyl | H |
| 1d313 | NHCOCH3 | OMe | CONH2 | 3-Methoxy propyl | H | 3-Methoxy propyl | H |
| 1d314 | NHCOCH3 | OMe | CONH2 | 3-Methoxy propyl | H | Butyl | H |
| 1d315 | NHCOCH3 | OMe | CONH2 | Butyl | Butyl | 2-Hydroxy ethyl | H |
| 1d316 | NHCOCH3 | OMe | CONH2 | Isopropyl | Isopropyl | 2-Hydroxy ethyl | H |
| 1d317 | NHCOCH3 | OMe | CONH2 | 2-Fluoro ethyl | H | Butyl | H |
| 1d318 | NHCOCH3 | OMe | CONH2 | 2-Chloro ethyl | H | 2-Ethyl hexyl | H |
| 1d319 | NHCOCH3 | OMe | CONH2 | 3-Chloro propyl | H | 2-Ethyl hexyl | H |
| 1d320 | NHCOCH3 | OMe | CONH2 | 2-(2-Hydroxyethylsulfanyl)-ethyl | H | Butyl | H |
| 1d321 | NHCOCH3 | OMe | CONH2 | 2-(2-tert-Butyl sulfanyl-ethane sulfonyl)-ethyl | H | Butyl | H |
| 1d322 | NHCOCH3 | OMe | CONH2 | 2-Hydroxy ethoxy propyl | H | Butyl | H |
| 1d323 | NHCOCH3 | OMe | CONH2 | 2-(2-Hydroxyethoxy)ethyl | H | Butyl | H |
| 1d324 | NHCOCH3 | OMe | CONH2 | H | H | 2-(2-Hydroxy ethoxy) propyl | H |
| 1d325 | NHCOCH3 | OMe | CONH2 | H | H | 2-(2-Hydroxy ethoxy)ethyl | H |
| 1d326 | NHCOCH3 | OMe | CONH2 | H | H | 3-(2-Hydroxy ethoxy)propyl | H |
| 1d327 | NHCOCH3 | OMe | CONH2 | 2-(2-Hydroxy ethoxy)ethyl | H | H | H |
| 1d328 | NHCOCH3 | OMe | CONH2 | 3-(2-Hydroxy ethoxy)propyl | H | H | H |
| 1d329 | NHCOCH3 | OMe | CONH2 | Phenyl | H | 2-(2-Hydroxy ethoxy)ethyl | H |
| 1d330 | NHCOCH3 | OMe | CONH2 | 3-(2-Phenoxy-ethoxy)-propyl | H | H | H |
| 1d331 | NHCOCH3 | OMe | CONH2 | 3-Isopropoxy-propyl | H | 3-Isopropoxy-propyl | H |
| 1d332 | NHCOCH3 | OMe | CONH2 | 3-Isopropoxy-propyl | H | H | H |
| 1d333 | NHCOCH3 | OMe | CONH2 | 3-Isopropoxy-propyl | H | Phenyl | H |
| 1d334 | NHCOCH3 | OMe | CONH2 | 3-Ethoxy-propyl | H | 3-Ethoxy-propyl | H |
| 1d335 | NHCOCH3 | OMe | CONH2 | 3-Ethoxy-propyl | H | H | H |
| 1d336 | NHCOCH3 | OMe | CONH2 | 3-Ethoxy-propyl | H | Phenyl | H |
| 1d337 | NHCOCH3 | OMe | CONH2 | 3-Ethoxy butyl | H | 3-Ethoxy butyl | H |
| 1d338 | NHCOCH3 | OMe | CONH2 | 3-Ethoxy butyl | H | H | H |
| 1d339 | NHCOCH3 | OMe | CONH2 | 3-Ethoxy butyl | H | Phenyl | H |
| 1d340 | NHCOCH3 | OMe | CONH2 | 3-Methoxy propyl | H | Butyl | H |
| 1d341 | NHCOCH3 | OMe | CONH2 | Butyl | Butyl | 2-Hydroxy ethyl | H |
| 1d342 | NHCOCH3 | OMe | CONH2 | Isopropyl | Isopropyl | 2-Hydroxy ethyl | H |
| 1d343 | NHCOCH3 | OMe | CONH2 | 2-Fluoro ethyl | H | Butyl | H |
| 1d344 | NHCOCH3 | OMe | CONH2 | 2-Chloro ethyl | H | 2-Ethyl hexyl | H |
| 1d345 | NHCOCH3 | OMe | CONH2 | 3-Chloro propyl | H | 2-Ethyl hexyl | H |
| 1d346 | NHCOCH3 | OMe | CONH2 | 2-(2-Hydroxyethylsulfanyl)-ethyl | H | Butyl | H |
| 1d347 | NHCOCH3 | OMe | CONH2 | 2-(2-tert-Butyl sulfanyl-ethane sulfonyl)-ethyl | H | Butyl | H |
| 1d348 | NHCOCH3 | OMe | CONH2 | 2-Hydroxy ethoxy propyl | H | Butyl | H |
| 1d349 | NHCOCH3 | OMe | CONH2 | 2-Hydroxy ethoxyethyl | H | Butyl | H |
| 1d350 | NHCOCH3 | OMe | CONH2 | 2-(Ethyl sulfonyl) ethanol | H | Butyl | H |
| 1d351 | NHCOCH3 | OMe | CONH2 | H | H | 3-(2-Hydroxy ethoxy) propyl | H |
| 1d352 | NHCOCH3 | OMe | CONH2 | H | H | 2-(2-Hydroxy ethoxy)ethyl | H |
| 1d353 | NHCOCH3 | OMe | CONH2 | Phenyl | H | 2-(2-Hydroxy ethoxy)ethyl | H |
| 1d354 | NHCOCH3 | OMe | CONH2 | 3-(2-Phenoxy-ethoxy)-propyl | H | H | H |
| 1d355 | NHCOCH3 | OMe | CONH2 | 3-Isopropoxy-propyl | H | 3-Isopropoxy-propyl | H |
| 1d356 | NHCOCH3 | OMe | CONH2 | 3-Isopropoxy-propyl | H | H | H |
| 1d357 | NHCOCH3 | OMe | CONH2 | 3-Isopropoxy-propyl | H | Phenyl | H |
| 1d358 | NHCOCH3 | OMe | CONH2 | 3-Ethoxy-propyl | H | 3-Ethoxy-propyl | H |
| 1d359 | NHCOCH3 | OMe | CONH2 | 3-Ethoxy-propyl | H | H | H |

-continued

| Structure | $R^{5d}/R^{7d}$ | $R^{6d}/R^{8d}$ | $R^{9d}/R^{16d}$ | $R^{11d}/R^{17d}$ | $R^{12d}/R^{18d}$ | $R^{13d}/R^{19d}$ | $R^{14d}/R^{20d}$ |
|---|---|---|---|---|---|---|---|
| 1d³⁶⁰ | NHCOCH₃ | OMe | CONH₂ | 3-Ethoxy-propyl | H | Phenyl | H |
| 1d³⁶¹ | NHCOCH₃ | OMe | CONH₂ | 3-Ethoxy butyl | H | 3-Ethoxy butyl | H |
| 1d³⁶² | NHCOCH₃ | OMe | CONH₂ | 3-Ethoxy butyl | H | H | H |
| 1d³⁶³ | NHCOCH₃ | OMe | CONH₂ | 3-Ethoxy butyl | H | Phenyl | H |
| 1d³⁶⁴ | NHCOCH₃ | OMe | CONH₂ | 4-(2-Hydroxy-ethanesulfonyl)-phenyl | H | H | H |

The present invention also provides a process for the preparation of dyes of formula (1) and mixtures thereof as discribed above comprising the steps a) diazotization of a compound of formula (2)

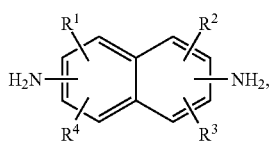

(2)

wherein $R^1$ to $R^4$ are defined as given above, b) reacting the diazonium salt obtained in step a) with stoichiometric amounts of compounds of formula (3) and (4)

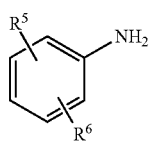

(3)

(4)

wherein $R^9$ to $R^{12}$ are defined as given above, to yield an intermediate of formula (5)

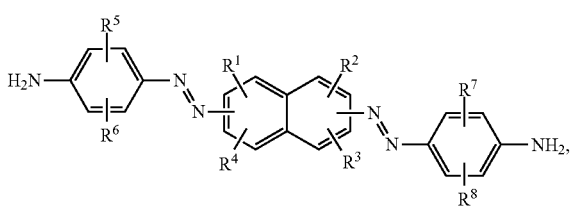

(5)

c) diazotization of the compound of formula (5), d) reacting the diazonium salt obtained in step c) with the compounds of formula (6), (7), (8) and (9) or mixtures thereof

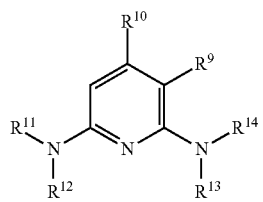

(6)

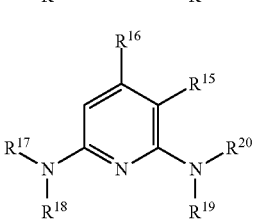

(7)

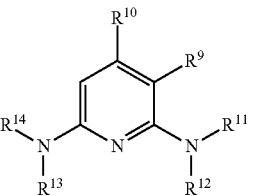

(8)

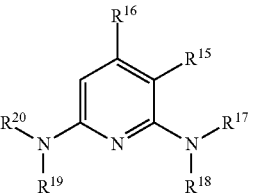

(9)

wherein $R^9$ to $R^{20}$ are defined as given above.

The diazotization of the compound of the formula (2) and (5), respectively can be performed by means of diazotization methods that are known to a person skilled in the art, preferably by using sodium nitrite or nitrosylsulfuric acid in acidic medium using inorganic acids such as hydrochloric acid, sulfuric acid or phosphoric acid or mixtures thereof or organic acids such as acetic acid or propionic acid or mixtures thereof. Also mixtures of inorganic acid with organic acids can be advantageously used.

The coupling reaction of the diazonium salts obtained by diazotization of the compound of formula (2) onto the compounds of formulae (3) and (4) as well as the coupling reaction of the diazonium salts obtained by diazotization of the compound of formula (5) onto the compounds of formulae (6), (7), (8) and (9) can likewise be performed by known methods.

The compounds of formula (2) are known and commercially available or can be synthesised by means of common chemical reactions known to a person skilled in the art such as the methods dosclosed in DE79780, DE72665, DE61174 and U.S. Pat. No. 4,801,694 A1.

The pyridines of formula (6), (7), (8) and (9) in which $R^{13}$ and $R^{19}$ represent cyano are commercially available or can be synthesized via methods disclosed in the literature such as DE2230392. Through analogy, all the diamino pyridines that are used in this patent can be synthesized with the protocol. The obtained pyridines can be further derivatized by reactions known to persons skilled in the art, such as hydrolysis to form pyridines of formula (6), (7), (8) and (9) in which $R^{13}$ and $R^{19}$ represent carbonamide or by hydrolysis and further esterification to form pyridines of formula (10), (11), (12) and (13) in which $R^{13}$ and $R^{19}$ are alkoxycarbonyl.

The above-mentioned derivatization reactions can be carried out in alkaline or acidic media, preferably in acidic media using strong inorganic acids such as sulfuric acid or hydrochloric acid gaseous or solution, acidic resins or chlorotrimethylsilane or other suitable acid catalyst in the presence of the corresponding alkohol. The reactions are advantageously carried out under inert atmosphere at temperatures in the range from 40° C. to 150° C.

Alternatively, the above mentioned derivatization reactions can be undertaken as a final step after the synthesis of the corresponding dyes with pyridine nitriles.

The dyes of the present invention can be used alone or as a mixture with other dyes according to the present invention and/or other substances.

Thus a chemical composition comprising one or more dye(s) as described above is also an aspect of the present invention.

A chemical composition consisting of two or more dyes as described above forms another preferred aspect of the present invention.

Also an aqueous solution for dying comprising one or more dye(s) as described above forms an aspect of the present invention.

The dyes of the present invention are suitable for dyeing and printing of natural, manufactured, regenerated, modified or synthetic hydroxyl- amino-, and/or carboxamido-containing fiber materials and their blends by the application methods numerously described in the art for acid dyes.

Therefore, the present invention also is directed to a Process for dyeing or printing carboxamido- and/or hydroxyl-containing material, comprising contacting the carboxamido- and/or hydroxyl-containing material with a dye as described above.

The use of a dye as described above, a chemical composition as described above or of an aqueous solution as described above for dying fibers, as well as blends of such fibres selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers and Lyocell fibers forms another aspect of the present invention.

Still another aspect of the present invention is/are: Fiber and blends containing such fiber selected from the group consisting of: synthetic fiber materials, nylon materials, nylon-6, nylon-6,6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers comprising one or more dye(s) of the present invention either in chemically and/or physically bound form.

The above-mentioned substrates to be dyed can be present in various forms such as but not limited to yarn, woven fabric, loop-formingly knitted fabric or carpet. For instance in the form of sheetlike structures, such as paper and leather, in the form of films, such as nylon films, or in the form of a bulk mass, for example composed of polyamide and polyurethane, in particular in the form of fibers, for example cellulose fibers. The fibers are preferably textile fibers, for example in the form of woven fabrics or yarns or in the form of hanks or wound packages.

The dyes of the present invention and their salts and/or mixtures can be used as a single dyeing colorant in dyeing or printing processes or can be part of a di-, tri- or multi-component combination colorant in dyeing or in printing compositions. The di-, tri- or multi-component shade dyeings show similar fastness level as compared to dyeing performed with a single colorant component.

Dyes of the present invention and their salts or mixtures are highly compatible with other known and/or commercially available acid dyes and they can be used together with such dyes of related chromophores and similar technical performance to obtain specific hues. Similar technical performance includes: comparable build-up, comparable fastness properties and comparable exhaustion rates during dyeings.

The dyes according to the invention can be applied to the materials mentioned, especially the fiber materials mentioned, by the application techniques known for water-soluble dyes. This applies to both, dyeing and printing processes.

It applies in particular to the production of dyeings on fiber materials composed of wool or other natural polyamides or of synthetic polyamides and their mixtures with other fiber material. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in a sealed dyeing apparatus at temperatures of up to 106° C.

Since the water solubility of the dyes according to the invention is very good, they can also be used with advantage in customary continuous dyeing processes.

The dyes of the present invention can also be used in digital printing processes, in particular in digital textile printing. For this the dyes of the present invention need to be formulated in aqueous inks.

An Ink for digital textile printing, comprising a dye of the present invention is another aspect of the present invention.

The inks of the present invention comprise the dye of the present invention in amounts which preferably range from 0.1 to 50% by weight, more preferably from 0.5 to 30% by weight and most preferably from 1 to 15% by weight, based on the total weight of the ink.

If desired the inks may contain further dyes used in digital printing in addition to the one or more dyes of the present invention.

For the inks of the present invention to be used in the continuous flow process, a conductivity of 0.5 to 25 mS/m can be set by adding an electrolyte. Useful electrolytes include for example lithium nitrate and potassium nitrate. The inks of the present invention may include organic solvents at a total level of 1 to 50% by weight and preferably 5 to 30% by weight. Suitable organic solvents are for example alcohols, for example methanol, ethanol, 1-propanol, isopropanol, 1-butanol, tert-butanol, pentyl alcohol, polyhydric alcohols for example: 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, for example: polyethylene glycol, polypropylene glycol, alkylene glycols having 1 to 8 alkylene groups, for example: monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, low alkyl ethers of polyhydric alcohols, for example: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as for example: polyethylene glycol monomethyl ether, polypropylene glycol glycerol ether, polyethylene glycol tridecyl ether, polyethylene glycol nonylphenyl ether, amines, such as for example: methylamine, ethylamine, triethylamine, diethylamine, dimethylamine, trimethylamine, dibutylamine, diethanolamine, triethanolamine, N-acetylethanolamine, N-formylethanolamine, ethylenediamine, urea derivatives, such as for example: urea, thiourea, N-methylurea, N,N'-epsilon dimethylurea, ethyleneurea, 1,1,3,3-tetramethylurea, amides, such as for example: dimethylformamide, dimethylacetamide, acetamide, ketones or keto alcohols, such as for example: acetone, diacetone alcohol, cyclic ethers, such as for example: tetrahydrofuran, trimethylolethane, trimethylolpropane, 2-butoxyethanol, benzyl alcohol, 2-butoxyethanol, gamma butyrolactone, epsilon-caprolactam, further sulfolane, dimethylsulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, butyrolactone, trimethylpropane, 1,2-dimethoxypropane, dioxane, ethyl acetate, ethylenediaminetetraacetate ethyl pentyl ether, 1,2-dimethoxypropane and trimethylpropane.

The inks of the present invention may further include customary additives, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas.

Useful viscosity moderators include rheological additives, for example: polyvinylcaprolactam, polyvinylpyrrolidone and their copolymers polyetherpolyol, associative thickeners, polyurea, polyurethane, sodium alginates, modified galactomannans, polyetherurea, polyurethane, nonionic cellulose ethers.

As further additives the inks of the invention may include surface-active substances to set surface tensions of 20 to 65 mN/m, which are adapted if necessary as a function of the process used (thermal or piezo technology). Useful surface-active substances include for example: all surfactants, preferably nonionic surfactants, butyldiglycol, 1,2-hexanediol.

The inks of the present invention may further comprise customary additives, for example substances to inhibit fungal and bacterial growth in amounts from 0.01 to 1% by weight based on the total weight of the ink.

The inks may be prepared in a conventional manner by mixing the components in water.

The inks of the invention are particularly useful in inkjet printing processes for printing a wide variety of pretreated materials, such as silk, leather, wool, polyamide fibers and polyurethanes, and cellulosic fiber materials of any kind. Blend fabrics, for example blends of cotton, silk, wool with polyester fibers or polyamide fibers can similarly be printed.

In contrast to conventional textile printing, where the printing ink already contains all necessary chemicals, in digital or inkjet printing the auxiliaries have to be applied to the textile substrate in a separate pretreatment step.

The pretreatment of the textile substrate, for example cellulose and regenerated cellulose fibers and also silk and wool, is effected with an aqueous alkaline liquor prior to printing. In addition there is a need for thickeners to prevent flowing of the motives when the printing ink is applied, for example sodium alginates, modified polyacrylates or highly etherified galactomannans.

These pretreatment reagents are uniformly applied to the textile substrate in a defined amount using suitable applicators, for example using a 2- or 3-roll pad, contactless spraying technologies, by means of foam application or using appropriately adapted inkjet technologies, and subsequently dried.

The examples below serve to illustrate the invention. Parts and percentages are by weigh unless noted otherwise. The relationship between parts by weight and parts by volume is that of the kilogram to the liter.

EXAMPLE 1

7.96 g of 3,7-Diamino-naphthalene-1,5-disulfonic acid were first dissolved in water at slightly acidic pH to give a complete solution. Ice was added to the solution and when the temperature reached 10 to 15° C., 10.6 ml of 5N of sodium nitrite solution were added dropwise. The reaction mixture was further cooled down to 0 to 8° C. when the mixture was added dropwise into 12.38 g of concentrated HCl with 12 g of ice. Yellow suspension was formed and the reaction mixture was completed within an hour.

6.30 g of 2,5-Dimethyl-phenylamine were added directly into the diazo suspension and stirred. A violet precipitate was observed upon addition. The intermediate precipitate, 3,7-Bis-(4-amino-2,5-dimethyl-phenylazo)-naphthalene-1,5-disulfonic acid obtained was filtered off with suction, washed with organic solvent and dried.

15.22 g of the dried intermediate, 3,7-Bis-(4-amino-2,5-dimethyl-phenylazo)-naphthalene-1,5-disulfonic acid, was then dissolved in water at slightly acidic pH to give a complete reddish orange solution. Ice was added to the solution and when the temperature reached 10 to 15° C., 10.1 ml of 5N of sodium nitrite solution were added dropwise. The reaction mixture was further cooled down to 0 to 8° C. when the mixture was added dropwise into concentrated HCl with ice. Violet suspension was formed and the reaction mixture was completed in 90 mins.

The obtained reaction mixture was used in the next step as described below: 14.62 g of 2,6-Bis-(3-methoxy-propylamino)-4-methyl-nicotinonitrile were stirred in methanol and adjusted to slightly acidic. The reaction mixture was added dropwise into the methanol solution and stirred. Brilliant orange precipitate was observed upon addition. The precipitate obtained was filtered off with suction and washed with brine giving the product of the formula $1a^{52}$. The analytic data are consistent with the assigned structure for product $1a^{52}$. The product dyes the targeted fibre materials in brilliant red to reddish violet shades.

Through analogy, all the dyes of formulae (1) can be synthesized according to the method described above.

DYEING EXAMPLE 1

1 part of the dye $1a^{52}$ of this invention was dissolved in 2000 parts of water and 1 part of levelling assistant (based on condensation product of a higher aliphatic amine and ethylene oxide) and 6 parts of sodium acetate were added. The pH was then adjusted to 5 using acetic acid (80%). The dyebath was heated to 50° C. for 10 minutes and then entered with 100 parts of a woven polyamide-6 fabric. The temperature was raised to 98° C. over the course of 50 minutes and than dyeing was carried out at this temperature for 60 minutes. This was followed by cooling to 60° C. and removal of the dyed material. The polyamide-6 fabric was washed with hot and cold water, soaped and then spun and dried. The dyeing obtained gave dark red shade and has very good light and wet fastness and also good levelness in the fibre.

DYEING EXAMPLE 2

1 part of the dye $1a^{52}$ of this invention was dissolved in 2000 parts of water and 1 part of levelling assistant (based on condensation product of a higher aliphatic amine and ethylene oxide) and 6 parts of sodium acetate were added. The pH was then adjusted to 5.5 using acetic acid (80%). The dyebath was heated to 50° C. for 10 minutes and then entered with 100 parts of a woven polyamide-6,6 fabric. The temperature was raised to 120° C. over the course of 50 minutes and then dyeing was carried out at this temperature for 60 minutes. This was followed by cooling to 60° C. and removal of the dyed material. The polyamide-6,6 fabric was washed with hot and cold water, soaped and then spun and dried.

The dyeing obtained gave dark red shade and has very good light and wet fastness and also good levelness in the fibre.

DYEING EXAMPLE 3

100 parts of polyamide-6 material were padded with a 1000 parts 50° C. liquor solution that consisted of 40 parts of the dye $1 m^{52}$, 100 parts of urea, 20 parts of a non ionic solubilizer based on butyldiglycol, 20 parts of acetic acid to adjust the pH to 4.0, 10 parts of levelling assistant (based on ethoxylated aminopropyl fatty acid amide) and 815 parts of water. The material was rolled up and placed into a steaming chamber at 85 to 98° C. for 3 to 6 hours. After fixation, the fabric was washed with hot and cold water, soaped and then spun and dried.

The dyeing obtained gave dark red shade and has very good light and wet fastness and also good levelness in the fibre.

DYEING EXAMPLE 4

1 part of the dye $1a^{52}$ of this invention was dissolved in 2000 parts of water and 5 parts of sodium sulphate, and 1 part of levelling assistant (based on condensation product of a higher aliphatic amine and ethylene oxide) and 5 parts of sodium acetate were added. The pH was then adjusted to 4.5 using acetic acid (80%). The dyebath was heated to 50° C. for 10 minutes and then entered with 100 parts of a woven wool fabric. The temperature was raised to 100° C. over the course of 50 minutes and then dyeing was carried out at this temperature for 60 minutes. This was followed by cooling to 90° C. and removal of the dyed material. The wool fabric was washed with hot and cold water, soaped and then spun and dried.

The dyeing obtained gave dark red shade and has very good light and wet fastness and also good levelness in the fibre.

DYEING EXAMPLE 5

1 part of the dye $1a^{52}$ of this invention was dissolved in 1000 parts of soft water and 7.5 parts of sodium sulphate, and 1 part of a wetting agent (anionic) was added. 100 parts of bleached cotton knitted fabric were added to this solution. The dye bath was then heated up to 98° C. with a gradient of 2° C./min then dyeing was carried out at this temperature for 60 minutes. This was followed by cooling down to 80° C. At 80° C. the dyeing was continued for another 20 minutes. The dyed material was then removed and was washed with hot and cold water, soaped and then spun and dried. The dyeings obtained gave dark red shade and has very good light and wet fastness and also good levelness in the fibre.

DYEING EXAMPLE 6

3 parts of the dye $1a^{52}$ of this invention dissolved in 82 parts of deionized water is added into the dyebath with 15 parts of diethylene glycol at 60° C. On cooling, a red printing ink is obtained. The red printing ink can be used for ink jet printing on paper, polyamide or wool textiles.

DYEING EXAMPLE 7

4 parts of chemically bleached (pine wood) sulphite pulp is mixed up with 100 parts of 55° C. water. 1 part of the dye $1a^{52}$ of this invention is dissolved in 100 parts of hot water. 80 parts of this solution is given to the mixed-up pulp and mixed for 2 minutes. After that the mixture is sized with resin size in a conventional manner and mixed for another 2 minutes. 55 parts of this solution is then diluted with 2000 parts of cold water and the paper is produced out of this solution. The red paper produced from the mixture has good wet fastnesses.

The invention claimed is:
1. A dye of formula (1)

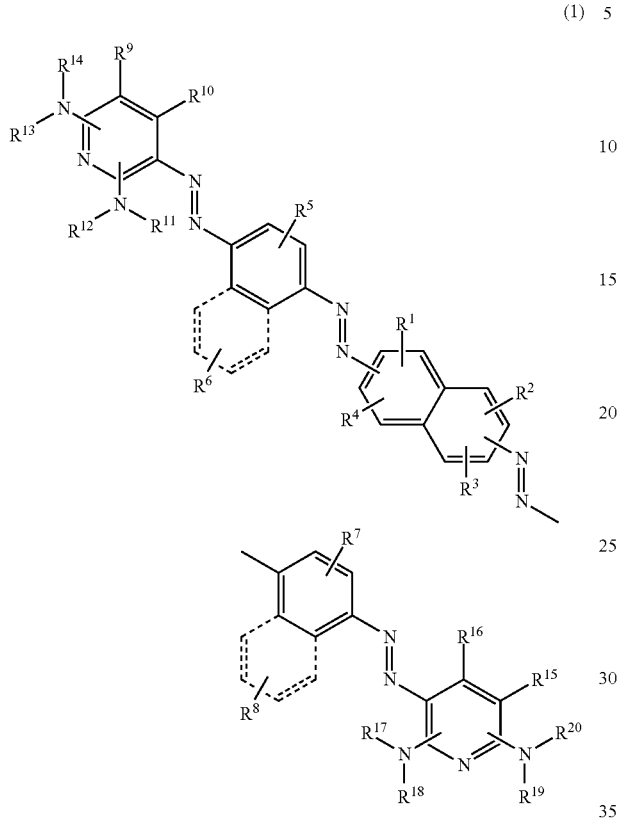

wherein
$R^1$, $R^2$, $R^3$ and $R^4$ independent of each other is hydrogen, alkyl, alkoxy, halogen, trifluoromethyl or $SO_3M$— whereby at least two of them are $SO_3M$,
$R^5$, $R^6$, $R^7$ and $R^8$ independent of each other is hydrogen, alkyl, substituted alkyl, alkyl chain interrupted by one or two heteroatoms, alkoxy, substituted alkoxy, halogen, trifluoromethyl, cycloalkyl, heterocycloalkyl, cyano, acyloxy, alkylcarbonyl, acylamino, alkylsulfonylamino, amino, monoalkyl-amino, monocycloalkyl-amino, dialkyl-amino, di(cyclo)alkyl-amino, alkylthio, alkylsulfonyl, alkoxycarbonyl, carbamoyl, sulfamoyl, ureido, —$SO_3M$ or alkylureido,
$R^9$ and $R^{15}$ independent of each other is cyano, carbamoyl, carbamoyl substituted, alkoxycarbonyl, trifluoromethyl, carbonyltrifluoromethyl or halogen,
$R^{10}$ and $R^{16}$ independent of each other is hydrogen, alkyl, cycloalkyl, trifluoromethyl, alkoxy, cyano, carbamoyl, alkoxycarbonyl, COOM, amino, hydroxyl, monocycloalkyl-amino, monoalkyl-amino, di(cyclo)alkyl-amino, dialkyl-amino, monoaryl-amino, diaryl-amino, monocycloalkylmonoarylamino, monoalkyl monoaryl amino, alkylthio, or arylthio,
or
is alkyl substituted by one or more substituents selected from the group consisting of hydroxy, cycloalkyl, heteroaryl, heterocycloalkyl, aryl, aryloxy, alkoxy, alkylthio, arylthio, halogen, cyano, COOM, alkoxycarbonyl, acyloxy, carbamoyl, nitro, amino, acylamino, arylcarbonylamino, alkylsulfonylamino, arylsulfonylamino, ureido, alkyl-ureido and phenylureido, $R^{11}$, $R^{12}$, $R^{13}$, $R^{14}$, $R^{17}$, $R^{18}$, $R^{19}$, $R^{20}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylaminoalkyl, thioalkoxyalkyl-aminoalkyl, aminoalkyloxyalkyl, aminoalkylthioxyalkyl, cycloalkylalkyl, aryloxyalkyl, arylthioxyakyl, heteroarylalkyl, or heterocycloalkylalkyl,
or
alkyl interrupted by one or more heteroatoms selected from the group consisting of oxygen and sulfur,
or
alkyl substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocyclo-alkyl-amino, N,N-dicycloalkyl-amino, N-monoalkyl-monocycloalkyl-amino, N,N-mono-aryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbarnoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamo-yl and $SO_3M$
or
alkyl interrupted by one or more heteroatoms selected from the group consisting of oxygen and sulfur, and substituted by one or more substituents selected from the group consisting of hydroxy, aryl, cycloalkyl, alkoxy, thioalkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocloalkyl-amino, N,N-monoaryl-monocycloalkyl-amino, N-acylamino, N-alkylsulfonyl-amino, ureido, alkylureido, phenylureido, halogen, cyano, COOM, nitro, acyl, thioacyl, alkylsulfonyl, aryloyl, trifluoromethyl, heteroaryl, heterocycloalkyl, alkoxycarbonyl, alkoxythiocarbonyl, acyloxy, aryloyloxy, carbamoyl, N-monocycloalkyl-carbamoyl, N-monoalkyl-carbamoyl, N,N-dicycloalkyl-carbamoyl, N,N-dialkyl-carbamoyl, N-monoaryl-carbamoyl, N,N-diaryl-carbamoyl, N-monocycloalkyl-N-monoarylcarbamoyl, N-monoalkyl-N-monoaryl-carbamoyl, sulfamoyl, N-monocycloalkyl-sulfamoyl, N-monoalkyl-sulfamoyl, N,N-dicycloalkyl-sulfamoyl, N,N-dialkyl-sulfamoyl, N-monoaryl-sulfamoyl, N,N-diaryl-sulfamoyl, N-monocycloalkyl-N-monoarylsulfamoyl, N-monoalkyl-N-monoarylsulfamoyl and $SO_3M$,
M is hydrogen, an alkali metal, ammonium, one equivalent of an alkali earth metal or a monovalent organic cation,
the dyes of formula (1) have two to six sulfonic acid groups, and
whereby the bonds with unfixed attachment points on the pyridine couplers mean that the amino rests bearing the substituents $R^{11}$ and $R^{12}$, and $R^{13}$ and $R^{14}$, respectively can be positioned ortho or para to $R^9$, meaning that when the amino rest bearing the substituents $R^{11}$ and $R^{12}$ is positioned ortho to $R^9$, the amino rest bearing the substituents $R^{13}$ and $R^{14}$ is positioned para to $R^9$, and vice versa;

and the same applies to the amino rests bearing the substituents $R^{17}$ and $R^{18}$, and $R^{19}$ to $R^{20}$, respectively that can be positioned ortho or para to $R^{15}$, meaning that when the amino rest bearing the substituents $R^{17}$ and $R^{18}$ is positioned ortho to $R^{15}$, the amino rest bearing the substituents $R^{19}$ to $R^{20}$ is positioned para to $R^{15}$, and vice versa.

2. The dye according to claim 1, having formula (1a)

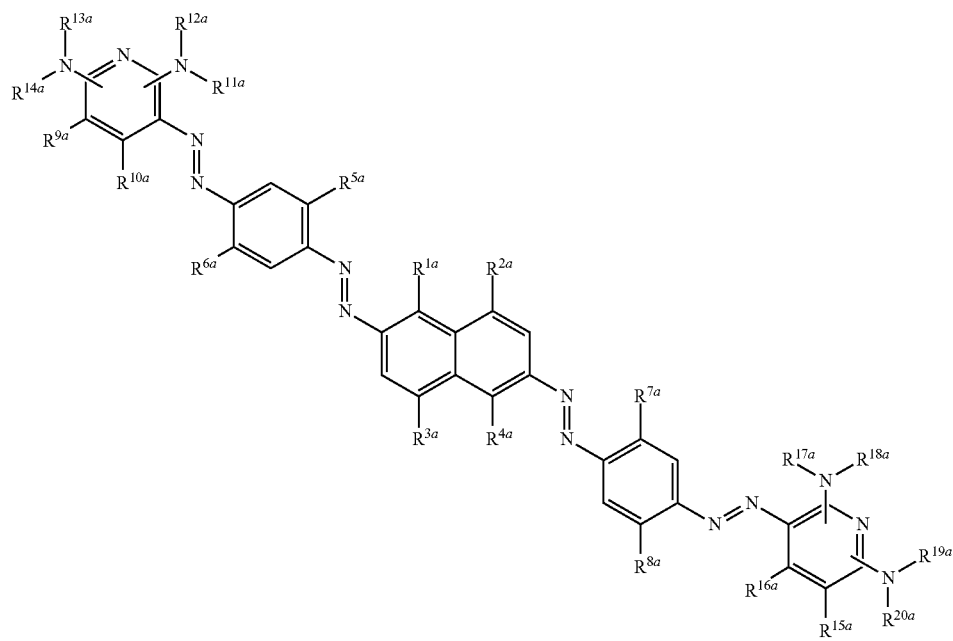

(1a)

wherein $R^{1a}$, $R^{2a}$, $R^{3a}$ and $R^{4a}$ independent of each other is hydrogen, alkyl, alkoxy, halogen, trifluoromethyl or $SO_3M$, whereby at least two of them are $SO_3M$, $R^{5a}$, $R^{6a}$, $R^{7a}$ and $R^{8a}$ independent of each other is hydrogen, $(C_1-C_4)$-alkyl, $(C_1-C_4)$-alkoxy, halogen, trifluoromethyl, —$SO_3M$ or $(C_1-C_4)$-acylamino, $R^{9a}$ and $R^{15a}$ independent of one another is cyano, carbamoyl, substituted carbamoyl, sulfonylalkyl or alkoxycarbonyl, $R^{10a}$ and $R^{16a}$ independent of each other is unsubstituted, linear or branched $(C_1-C_4)$-alkyl, unsubstiuted $(C_5-C_7)$-cycloalkyl or substituted $(C_5-C_7)$-cycloalkyl with one or more substituents, $R^{11a}$, $R^{12a}$ $R^{13a}$, $R^{14a}$, $R^{17a}$, $R^{18a}$, $R^{19a}$ and $R^{20a}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylaminoalkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, or heterocycloalkylalkyl, or alkyl interrupted by one or more heteroatoms selected from the group consisting of oxygen and sulfur, or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-mono-cycloalkyl-amino, N-acylamino, N-alkylsulfonyl-amino, ureido, alkylureido, phenyl-ureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ or alkyl interrupted by one or more heteroatoms selected from the group consisting of oxygen and sulfur, and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ and M is hydrogen, an alkali metal, ammonium, one equivalent of an alkali earth metal or a monovalent organic cation.

3. The dye according to claim 2, wherein $R^{1a}$, $R^{2a}$, $R^{3a}$ and $R^{4a}$ independent of each other is $SO_3M$, hydrogen, alkyl, alkoxy or halogen—whereby at least two of them are $SO_3M$, $R^{5a}$, $R^{6a}$, $R^{7a}$ and $R^{8a}$ independent of each other is hydrogen, methyl, halogen, —$SO_3M$ or acetylamino, $R^{9a}$ and $R^{15a}$ independent of each other is cyano or carbamoyl, $R^{10a}$ and $R^{16a}$ is methyl, $R^{11a}$, $R^{12a}$ $R^{13a}$, $R^{14a}$, $R^{17a}$, $R^{18a}$, $R^{19a}$ and $R^{20a}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, allyl, 2-methoxyethyl, 3-methoxypropyl, 2-cyanoethyl, 2-(methylthio)ethyl, 2-fluoroethyl, 2-chloroethyl, 3-chloropropyl, tetrahydrofurfuryl, 2-furan-2-yl-ethyl, 4-(2-hydroxy-ethanesulfonyl)-phenyl, 2-(2-tertbutylsulfanylethanesulfonyl)-ethyl, 2-(2-hydroxyethoxypropyl), 2-(2-hydroxy-ethoxy)ethyl, 3-(4-hydroxyetlaoxy)propyl, 3-(2-phenoxy-ethoxy)-propyl, 3-isopropoxy-propyl, 3-ethoxy-propyl, 3-ethoxybutyl, alkyl substituted by $SO_3M$ or alkyl substituted by COOM
and
M is hydrogen, sodium, potassium, lithium or ammonium.

4. The dye according to claim 1, having formula (1b)

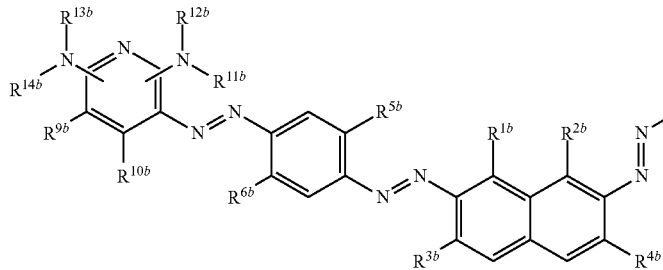
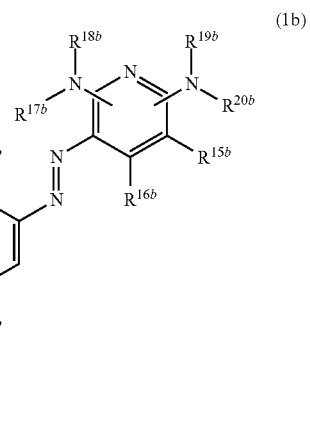

(1b)

wherein $R^{1b}$, $R^{2b}$, $R^{3b}$ and $R^{4b}$ independent of each other is hydrogen, alkyl, alkoxy, halogen, trifluoromethyl or $SO_3M$, whereby at least two of them are $SO_3M$, $R^{5b}$, $R^{6b}$, $R^{7b}$ and $R^{8b}$ independent of each other is hydrogen, $(C_1-C_4)$-alkyl, $(C_1-C_4)$-alkoxy, halogen, trifluoromethyl, —$SO_3M$ or $(C_1-C_4)$-acylamino, $R^{9b}$ and $R^{15b}$ independent of each other is cyano, carbamoyl, carbamoyl substituted, sulfonylalkyl or alkoxycarbonyl, $R^{10b}$ and $R^{16b}$ independent of each other is unsubstituted, linear or branched $(C_1-C_4)$-alkyl, unsubstiuted $(C_5-C_7)$-cycloalkyl or substituted $(C_5-C_7)$-cycloalkyl with one or more substituents, $R^{11b}$, $R^{12b}$ $R^{13b}$, $R^{14b}$, $R^{17b}$, $R^{18b}$, $R^{19b}$ and $R^{20b}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylaminoalkyl, thioalkoxyalkylaminoalkyl, aminoalkyloxyalkyl, aminoalkylthioxyalkyl, cycloalkylalkyl, aryloxyalkyl, arylthioxyalkyl, heteroarylalkyl, or heterocycloalkylalkyl, or alkyl interrupted by one or more heteroatoms selected from the group consisting of oxygen and sulfur, or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-mono-cycloalkyl-amino, N-acylamino, N-alkylsulfonyl-amino, ureido, alkylureido, phenyl-ureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ or alkyl interrupted by one or more heteroatoms selected from the group consisting of oxygen and sulfur and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ and M is hydrogen, an alkali metal, ammonium, one equivalent of an alkali earth metal or a monovalent organic cation.

5. The dye according to claim 4, wherein $R^{3b}$ and $R^{4b}$ is $SO_3M$, $R^{1b}$ and $R^{2b}$ is hydrogen, $R^{5b}$, $R^{6b}$, $R^{7b}$ and $R^{8b}$ independent of each other is hydrogen, methyl, halogen, —$SO_3M$ or acetylamino, $R^{9b}$ and $R^{15b}$ independent of each other is cyano or carbamoyl, $R^{10b}$ and $R^{16b}$ is methyl, $R_{11b}$, $R^{12b}$ $R_{13b}$, $R^{14b}$, $R^{17b}$, $R^{18b}$, $R^{19b}$ and $R^{20b}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, 2-methoxyethyl, 3-methoxypropyl, 2-fluoroethyl, 2-chloroethyl, 3-chloropropyl, 4-(2-hydroxy-ethanesulfonyl)-phenyl, 2-(2-tertbutylsulfanylethanesulfonyl)-ethyl, 2-(2-hydroxyethoxypropyl), 2-(2-hydroxyethoxy)ethyl, 3-(4-hydroxyethoxy)propyl, 3-(2-phenoxy-ethoxy)-propyl, 3-isopropoxy-propyl, 3-ethoxy-propyl or 3-ethoxybutyl, alkyl substituted by $SO_3M$ or alkyl substituted by COOM and M is hydrogen, sodium, potassium, lithium or ammonium.

6. The dye according to claim 1, having formula (1c)

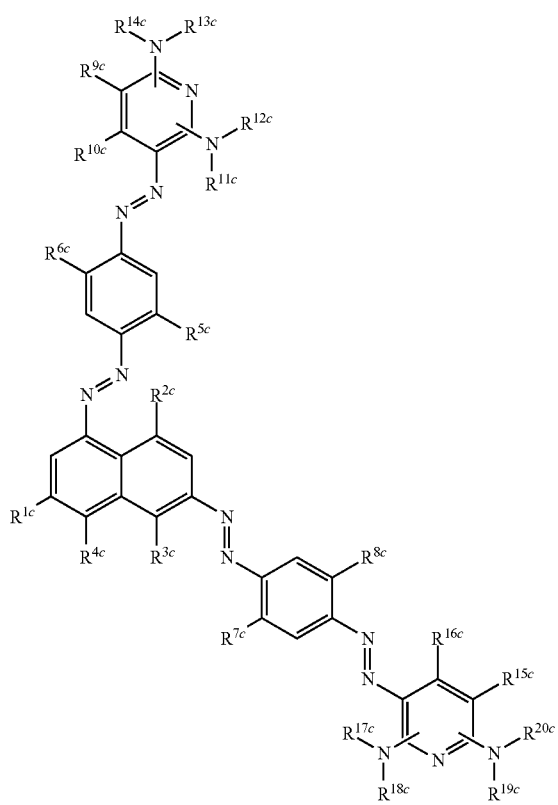

(1c)

wherein $R^{1c}$, $R_{2c}$, $R^{3c}$ and $R^{4c}$ independent of each other is hydrogen, alkyl, alkoxy, halogen, trifluoromethyl or $SO_3M$, whereby at least two of them are $SO_3M$, $R^{5c}$, $R^{6c}$, $R^{7c}$ and $R^{8c}$ independent of each other is hydrogen, $(C_1-C_4)$-alkyl, $(C_1-C_4)$-alkoxy, halogen, trifluoromethyl, —$SO_3M$ or $(C_1-C_4)$-acylamino, $R^{9c}$ and $R^{15c}$ independent of each other is cyano, carbamoyl, substituted carbamoyl, sulfonylalkyl or alkoxycarbonyl, $R^{10c}$ and $R^{16c}$ independent of each other is unsubstituted, linear or branched $(C_1-C_4)$-alkyl, unsubstiuted $(C_5-C_7)$-cycloalkyl or substituted $(C_5-C_7)$-cycloalkyl with one or more substituents, $R^{11c}$, $R^{12c}$ $R^{13c}$, $R^{14c}$, $R^{17c}$, $R^{18c}$, $R^{19c}$ and $R^{20c}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, amino alkyl, amino-hydroxy-alkyl, alkoxyalkylaminoalkyl, thioalkoxyalkylaminoalkyl, aminoalkyloxyalkyl, aminoalkylthioxyalkyl, cycloalkylalkyl, aryloxyalkyl, arylthioxyalkyl, heteroarylalkyl, or heterocycloalkylalkyl, or alkyl interrupted by one or more heteroatoms selected from the group consisting of oxygen and sulfur, or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ or alkyl interrupted by one or more heteroatoms selected from the group consisting of oxygen and sulfur, and substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and $SO_3M$ and M is hydrogen, an alkali metal, ammonium, one equivalent of an alkali earth metal or a monovalent organic cation.

7. The dye according to claim 6, wherein $R^{2c}$ and $R^{4c}$ is $SO_3M$, $R^{1c}$ and $R^{2c}$ is hydrogen, $R^{5c}$, $R^{6c}$, $R^{7c}$ and $R^{8c}$ independent of each other is hydrogen, methyl, halogen, —$SO_3M$ or acetylamino, $R^{9c}$ and $R^{15c}$ independent of each other is cyano or carbamoyl, $R^{10c}$ and $R^{16c}$ is methyl, $R^{11c}$, $R^{12c}$ $R^{13c}$, $R^{14c}$, $R^{17c}$, $R^{18c}$, $R^{19c}$ and $R^{20c}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, 2-methoxyethyl, 3-methoxypropyl, 2-fluoroethyl, 2-chloroethyl, 3-chloropropyl, 4-(2-hydroxy-ethanesulfonyl)-phenyl, 2-(2-tertbutylsulfanylethanesulfonyl)-ethyl, 2-(2-hydroxyethoxypropyl), 2-(2- hydroxyethoxy)ethyl, 3-(4-hydroxyethoxy)propyl, 3-(2-phenoxy-ethoxy)-propyl, 3-isopropoxy-propyl, 3-ethoxy-propyl or 3-ethoxybutyl, alkyl substituted by SO$_3$M or alkyl substituted by COOM
and
M is hydrogen, sodium, potassium, lithium or ammonium.

8. The dye according to claim 1, having formula (1d)

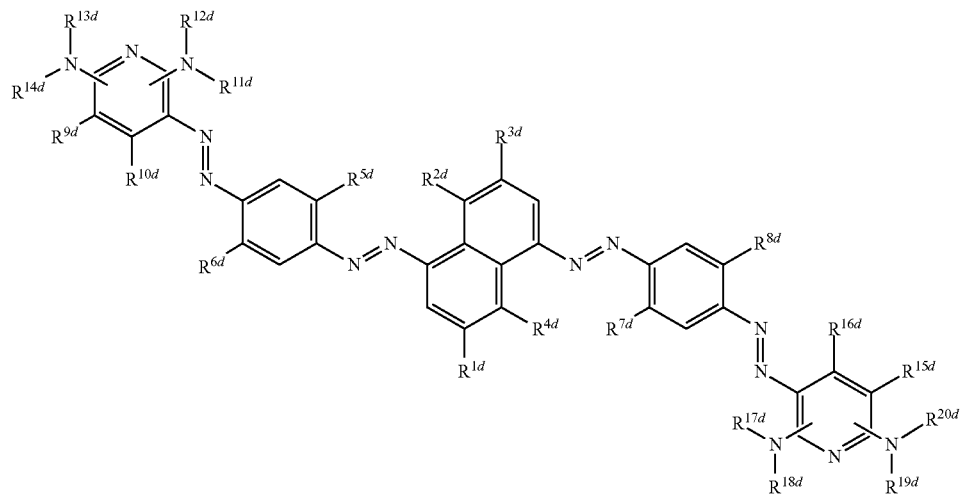

(1d)

wherein

R$^{1d}$, R$^{2d}$, R$^{3d}$ and R$^{4d}$ independent of each other is hydrogen, alkyl, alkoxy, halogen, trifluoromethyl or SO$_3$M whereby at least two of them are SO$_3$M, R$^{5d}$, R$^{6d}$, R$^{7d}$ and R$^{8d}$ independent of each other is hydrogen, (C$_1$-C$_4$)-alkyl, (C$_1$-C$_4$)-alkoxy, halogen, trifluoromethyl, —SO$_3$M or (C$_1$-C$_4$)-acylamino, R$^{9d}$ and R$^{15d}$ independent of each other is cyano, carbamoyl, carbamoyl substituted, sulfonylalkyl or alkoxycarbonyl, R$^{10d}$ and R$^{16d}$ independent of each other is unsubstituted, linear or branched (C$_1$-C$_4$)-alkyl, unsubstiuted (C$_5$-C$_7$)-cycloalkyl or substituted (C$_5$-C$_7$)-cycloalkyl with one or more substituents, R$^{11d}$, R$^{12d}$ R$^{14d}$, R$^{17d}$, R$^{18d}$, R$^{19d}$ and R$^{20d}$ independent of each other is hydrogen, alkyl, hydroxyalkyl, alkoxy, alkenyl, cycloalkyl, aryl, heteroaryl, heterocycloalkyl, carbamoyl, alkylureido, phenylureido, hydroxyalkylsulfonylalkyl, aminoalkyl, amino-hydroxy-alkyl, alkoxyalkylaminoalkyl, thioalkoxyalkyl-aminoalkyl, aminoalkyloxyalkyl, aminoalkylthioxyalkyl, cycloalkylalkyl, aryloxyalkyl, arylthioxyalkyl, heteroarylalkyl, or heterocycloalkylalkyl, or alkyl interrupted by one or more heteroatoms selected from the group consisting of oxygen and sulfur, or alkyl substituted by one or more substituents selected from the group consisting of hydroxy, aryl, cycloalkyl, alkoxy, amino, N-monoalkyl-amino, N,N-dialkyl-amino, N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and SO$_3$M or alkyl interrupted by one or more heteroatoms selected from the group consisting of oxygen and sulfur and substituted by one or more substituents selected from the group consisting of hydroxy, aryl, cycloalkyl, alkoxy, amino, N-monoalkyl-amino, N,N-dialkyl-amino N-monoaryl-amino, N,N-diaryl-amino, N-alkyl-N-aryl-amino, N-monocycloalkyl-amino, N,N-dicycloalkyl-amino, N-monoalkyl-monocycloalkyl-amino, N,N-monoaryl-monocycloalkyl-amino, N-acylamino, N-alkylsulfonyl-amino, ureido, alkylureido, phenylureido, halogen, cyano, COOM, nitro, acyl, alkylsulfonyl, aryloyl, trifluoromethyl, heteroaryl, heterocycloalkyl, alkoxycarbonyl, acyloxy, aryloyloxy, carbamoyl, sulfamoyl and SO$_3$M and M is hydrogen, an alkali metal, ammonium, one equivalent of an alkali earth metal or a monovalent organic cation.

9. The dye according to claim 8, wherein

R$^{1d}$ and R$^{3d}$ is SO$_3$M,

R$^{2d}$ and R$^{4d}$ is hydrogen,

R$^{5d}$, R$^{6d}$, R$^{7d}$ R$^{8d}$ independent of each other is hydrogen, methyl, halogen, —SO$_3$M or acetylamino, R$^{9d}$ and R$^{15d}$ independent of each other is cyano or carbamoyl, R$^{10d}$ R$^{16d}$ is methyl, R$^{11d}$, R$^{12d}$ R$^{13d}$, R$^{14d}$, R$^{17d}$, R$^{18d}$, R$^{19d}$ and R$^{20d}$ independent of each other is hydrogen, methyl, ethyl, n-propyl, n-butyl, n-pentyl, n-hexyl, cyclobutyl, cyclopentyl, cyclohexyl, 2-methylcyclohexyl, 3-methylcyclohexyl, isopropyl, sec-butyl, 2-methylbutyl, 1-ethylpropyl, 1,2-dimethylpropyl, tert-butyl, 3-methylbutyl, pentan-2-yl, 2-ethylhexyl, 2,2-dimethylpropyl, phenyl, benzyl, 2-hydroxyethyl, 2-methoxyethyl, 3-methoxypropyl, 2-fluoroethyl, 2-chloroethyl, 3-chloropropyl, 4-(2-hydroxy-ethanesulfonyl)-phenyl, 2-(2-tertbutylsulfanylethanesulfonyl)-ethyl, 2-(2-hydroxyethoxypropyl), 2-(2-hydroxyethoxy)ethyl, 3-(4-hydroxyethoxy)propyl, 3-(2-phenoxy-ethoxy)-propyl, 3-isopropoxy-propyl, 3-ethoxy-propyl or 3-ethoxybutyl, alkyl substituted by SO$_3$M or alkyl substituted by COOM
and
M is hydrogen, sodium, potassium, lithium or ammonium.

10. A process for the preparation of the dye according to claim 1 and mixtures thereof comprising the steps
a) diazotization of a compound of formula (2)

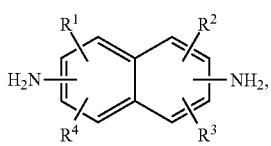
(2)

wherein R$^1$ to R$^4$ are defined as in claim 1,
b) reacting the diazonium salt obtained in step a) with stoichiometric amounts of compounds of formula (3) and (4)

(3)

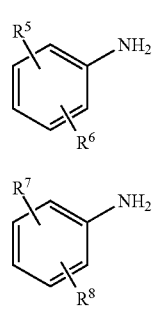
(4)

wherein R$^5$ to R$^8$ are defined as in claim 1, to yield an intermediate of formula (5)

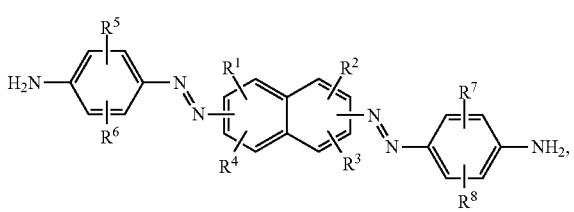
(5)

c) diazotization of the compound of formula (5),
d) reacting the diazonium salt obtained in step c) with the compounds of formula (6), (7), (8) and (9) or mixtures thereof

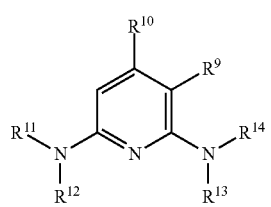
(6)

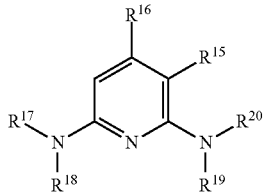
(7)

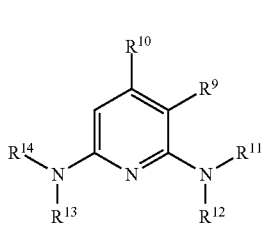
(8)

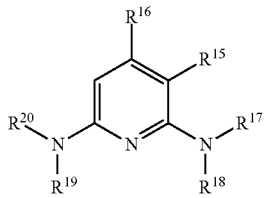
(9)

wherein R$^{11}$ to R$^{20}$ are defined as in claim 1.

11. A chemical composition comprising one or more dye(s) according to claim 1.

12. A chemical composition consisting essentially of two or more dyes according to claim 1.

13. An aqueous solution for dying comprising one or more dyes according to claim 1.

14. A process for dyeing or printing carboxamido- and/or hydroxyl-containing material, comprising contacting the carboxamido- and/or hydroxyl-containing material with the dye according to claim 1.

15. An ink for digital textile printing comprising the dye according to claim 1.

16. A fiber and blend containing the fiber selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers comprising one or more dye(s) according to claim 1 either in chemically and/or physically bound form.

* * * * *